(12) United States Patent
Nogami et al.

(10) Patent No.: US 9,337,981 B2
(45) Date of Patent: May 10, 2016

(54) TERMINAL, BASE STATION, COMMUNICATION SYSTEM, AND COMMUNICATION METHOD

(75) Inventors: Toshizo Nogami, Osaka (JP); Tatsushi Aiba, Osaka (JP); Daiichiro Nakashima, Osaka (JP); Kazuyuki Shimezawa, Osaka (JP); Kimihiko Imamura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 157 days.

(21) Appl. No.: 14/238,432

(22) PCT Filed: Jul. 19, 2012

(86) PCT No.: PCT/JP2012/068340
§ 371 (c)(1),
(2), (4) Date: Feb. 11, 2014

(87) PCT Pub. No.: WO2013/024660
PCT Pub. Date: Feb. 21, 2013

(65) Prior Publication Data
US 2014/0211732 A1    Jul. 31, 2014

(30) Foreign Application Priority Data
Aug. 12, 2011 (JP) ................................. 2011-176625

(51) Int. Cl.
*H04L 5/00* (2006.01)
*H04L 1/18* (2006.01)
(Continued)

(52) U.S. Cl.
CPC ........... *H04L 5/0053* (2013.01); *H04J 13/0003* (2013.01); *H04L 1/1854* (2013.01); *H04L 1/1861* (2013.01); *H04L 5/001* (2013.01); *H04L 5/0055* (2013.01); *H04L 27/2602* (2013.01)

(58) Field of Classification Search
CPC ... H04L 5/0035; H04L 5/0055; H04L 5/0057; H04L 12/2869; H04L 12/5695; H04L 47/00; H04L 47/70; H04L 47/78; H04L 47/821; H04L 47/827; H04W 72/04
See application file for complete search history.

(56) References Cited

U.S. PATENT DOCUMENTS

| 2011/0075624 A1* | 3/2011 | Papasakellariou .... H04L 5/0053 370/329 |
| 2011/0216733 A1* | 9/2011 | Han ........................ H04L 5/003 370/329 |

(Continued)

FOREIGN PATENT DOCUMENTS

| JP | 2012-235353 A | 11/2012 |
| JP | 2013-529016 A | 7/2013 |
| WO | WO 2010/053984 A2 | 5/2010 |

OTHER PUBLICATIONS

3GPP TSG RAN WG1#49, R1-072348, Kobe, Japan, May 7-11, 2007, 7.13.2, LG Electronics, Allocation of UL ACK/NACK index, Discussion & Decision, (http://www.3gpp.org/ftp/tsg_ran/WG1_RL1/TSGR1_49/Docs/R1-072348.zip), pp. 1-4.

(Continued)

*Primary Examiner* — Jung-Jen Liu
(74) *Attorney, Agent, or Firm* — Birch, Stewart, Kolasch & Birch, LLP

(57) ABSTRACT

In a terminal that communicates with a base station, in the case where a physical downlink control channel or an enhanced physical downlink control channel, which is associated with a physical downlink shared channel on a first cell, and an enhanced physical downlink control channel associated with a physical downlink shared channel on a second cell are detected, one physical uplink control channel resource is selected from a physical uplink control channel resource configured for the physical downlink shared channel on the first cell and a physical uplink control channel resource configured for the physical downlink shared channel on the second cell.

12 Claims, 29 Drawing Sheets

(51) Int. Cl.
H04L 27/26 (2006.01)
H04J 13/00 (2011.01)

(56) References Cited

U.S. PATENT DOCUMENTS

| | | | |
|---|---|---|---|
| 2011/0249633 A1* | 10/2011 | Hong | H04L 5/0053 370/329 |
| 2011/0274066 A1* | 11/2011 | Tee | H04L 5/001 370/329 |
| 2013/0039284 A1* | 2/2013 | Marinier | H04L 5/001 370/329 |
| 2013/0039307 A1 | 2/2013 | Han et al. | |
| 2013/0064172 A1* | 3/2013 | Park | H04L 1/1861 370/315 |
| 2013/0114556 A1* | 5/2013 | Yang | H04L 1/0027 370/329 |
| 2014/0086189 A1 | 3/2014 | Takeda et al. | |

OTHER PUBLICATIONS

3rd Generation Partnership Project; Technical Specification Group Radio Access Network; Evolved Universal Terrestrial Radio Access (E-UTRA); Physical Channels and Modulation (Release 10), Jun. 2011, 3GPP TS 36.211 V10.2.0 (Jun. 2011).

3rd Generation Partnership Project; Technical Specification Group Radio Access Network; Evolved Universal Terrestrial Radio Access (E-UTRA); Physical layer procedures (Release 10), Jun. 2011, 3GPP TS 36.213 V10.2.0 (Jun. 2011).

Ericsson et al.: "Correction the search space and RNTI for CQI and SRS request flag", 3GPP Draft; R1-111809, 3rd Generation Partnership Project (3GPP), Mobile Competence Centre; 650. Route Des Lucioles; F-06921 Sophia-Antipolis Cedex; France, vol. RAN WG1. no. Barcelona. Spain; May 9, 2011. May 5, 2011, 4 pages.

Hua Wei et al.: "HARQ-ACK resource allocation for TDD mode a", 3GPP Draft; R1-111804. 3rd Generation Partnership Project (3GPP). Mobile Competence Centre; 650. Route Des Lucioles; F-06921 Sophia-Antipolis Cedex ; France, vol. RAN WG1. no. Barcelona. Spain; May 9, 2011. May 16, 2011, 2 pages.

LG Electronics: "Correction to table for TDD mode b with M=2", 3GPP Draft; R1-111617 Mode B Table Correction, 3rd Generation Partnership Project (3GPP), Mobile Competence Centre; 650. Route Des Lucioles; F-06921 Sophia-Antipolis Cedex; France, vol. RAN WG1. no. Barcelona. Spain; May 9, 2011. May 3, 2011, 7 pages.

Qualcomm Inc: "Miscellaneous corrections to 36.213"., 3GPP Draft; R1-111680 Draft Cr Misc Ca Corrections to 36.213, 3rd Generation Partnership Project (3GPP), Mobile Competence Centre ; 650. Route Des Lucioles; F-06921 Sophia-Antipolis Cedex; France, vol. RAN WG1. no. Barcelona. Spain; May 9, 2011. May 3, 2011, 13 pages.

Samsung: "PUCCH format 3 Fallback procedure in TDD", 3GPP Draft; R1-111978 Cr Ts36213 10.1.3.2.2., 3rd Generation Partnership Project (3GPP). Mobile Competence Centre; 650. Route Des Lucioles; F-06921 Sophia-Antipolis Cedex; France. vol. RAN WG1, no. Barcelona. Spain; May 9, 2011. May 16, 2011, 3 pages.

Huawei, HiSilicon, Remaining details of FDD ACK/NACK channel selection [online], 3GPP TSG RAN WG1 #64 Meeting #64 R1-110897, Internet,<URL:http://www.3gpp.org/ftp/tsg_ran/WG1_RL1/TSGR1_64/Docs/R1-110897.zip>, Feb. 21-25, 2011 (4 pages).

* cited by examiner

FIG. 7

UPLINK CONTROL CHANNEL LOGICAL RESOURCES

| $n_{PUCCH}$ | ORTHOGONAL CODE | CYCLIC SHIFT | m |
|---|---|---|---|
| 0 | OC0 | CS0 | $N_{F2}$ |
| 1 | OC1 | CS0 | $N_{F2}$ |
| 2 | OC2 | CS0 | $N_{F2}$ |
| 3 | OC0 | CS2 | $N_{F2}$ |
| 4 | OC1 | CS2 | $N_{F2}$ |
| 5 | OC2 | CS2 | $N_{F2}$ |
| ⋮ | ⋮ | ⋮ | ⋮ |
| 15 | OC0 | CS10 | $N_{F2}$ |
| 16 | OC1 | CS10 | $N_{F2}$ |
| 17 | OC2 | CS10 | $N_{F2}$ |
| 18 | OC0 | CS0 | $N_{F2}+1$ |
| 19 | OC1 | CS0 | $N_{F2}+1$ |
| 20 | OC2 | CS0 | $N_{F2}+1$ |
| ⋮ | ⋮ | ⋮ | ⋮ |

FIG. 16

| RESPONSE INFORMATION IN RESPONSE TO TB IN CELL 0 | RESPONSE INFORMATION IN RESPONSE TO TB IN CELL 1 | PUCCH RESOURCE | BIT SEQUENCE |
|---|---|---|---|
| Ack | Ack | PUCCH RESOURCE 1 | 1, 1 |
| Ack | Nack/DTX | PUCCH RESOURCE 0 | 1, 1 |
| Nack/DTX | Ack | PUCCH RESOURCE 1 | 0, 0 |
| Nack | Nack/DTX | PUCCH RESOURCE 0 | 0, 0 |
| DTX | Nack/DTX | NO TRANSMISSION | |

FIG. 17

| RESPONSE INFORMATION IN RESPONSE TO TB 1 IN CELL 0 | RESPONSE INFORMATION IN RESPONSE TO TB 2 IN CELL 0 | RESPONSE INFORMATION IN RESPONSE TO TB IN CELL 1 | PUCCH RESOURCE | BIT SEQUENCE |
|---|---|---|---|---|
| Ack | Ack | Ack | PUCCH RESOURCE 1 | 1, 1 |
| Ack | Nack/DTX | Ack | PUCCH RESOURCE 1 | 1, 0 |
| Nack/DTX | Ack | Ack | PUCCH RESOURCE 1 | 0, 1 |
| Nack/DTX | Nack/DTX | Ack | PUCCH RESOURCE 2 | 1, 1 |
| Ack | Ack | Nack/DTX | PUCCH RESOURCE 0 | 1, 1 |
| Ack | Nack/DTX | Nack/DTX | PUCCH RESOURCE 0 | 1, 0 |
| Nack/DTX | Ack | Nack/DTX | PUCCH RESOURCE 0 | 0, 1 |
| Nack/DTX | Nack/DTX | Nack | PUCCH RESOURCE 2 | 0, 0 |
| Nack | Nack/DTX | DTX | PUCCH RESOURCE 0 | 0, 0 |
| Nack/DTX | Nack | DTX | PUCCH RESOURCE 0 | 0, 0 |
| DTX | DTX | DTX | NO TRANSMISSION | |

FIG. 20

| INDEX | BIT SEQUENCE | $n^1_{PUCCH,RRC}$ |
|---|---|---|
| 0 | 00 | A |
| 1 | 01 | B |
| 2 | 10 | C |
| 3 | 11 | D |

TERMINAL, BASE STATION, COMMUNICATION SYSTEM, AND COMMUNICATION METHOD

TECHNICAL FIELD

The present invention relates to a terminal, a base station, a communication system, and a communication method.

BACKGROUND ART

In wireless communication systems such as LTE (Long Term Evolution) and LTE-A (LTE-Advanced) proposed by 3GPP (Third Generation Partnership Project), and Wireless LAN and WiMAX (Worldwide Interoperability for Microwave Access) proposed by IEEE (The Institute of Electrical and Electronics engineers), a base station (a base station device, a downlink transmitter, an uplink receiver, and eNodeB) and a terminal (a terminal device, a mobile station device, a downlink receiver, an uplink transmitter, and UE) have a plurality of transmit/receive antennas, and, with the use of MIMO (Multi Input Multi Output) technology, data signals are spatially multiplexed, thereby realizing high-speed data communication. In addition, high frequency usage efficiency is particularly realized in LTE and LTE-A by using the OFDM (Orthogonal Frequency Division Multiplexing) scheme in downlink, and peak power is suppressed by using the SC-FDMA (Single Carrier-Frequency Division Multiple Access) scheme in uplink. Further, HARQ (Hybrid ARQ), which is a combination of automatic repeat request ARQ (Automatic Repeat reQuest) and error correction code, is adopted.

FIG. 29 is a diagram illustrating the configuration of an LTE communication system that performs HARQ. In FIG. 29, a base station 2901 delivers to a terminal 2902 control information regarding downlink transmit data 2904 via a physical downlink control channel (PDCCH: Physical Downlink Control Channel) 2903. The terminal 2902 first detects the control information. In the case where the control information is detected, the terminal 2902 extracts the downlink transmit data 2904 using the detected control information. The terminal 2902, which has detected the control information, reports to the base station 2901 HARQ response information indicating whether extraction of the downlink transmit data 2904 has been successful via a physical uplink control channel (PUCCH: Physical Uplink Control Channel) 2905. At this time, a resource of the PUCCH 2905 (PUCCH resource) available for the terminal 2902 is configured to be uniquely determined in an implicit/suggestive manner from a resource of the PDCCH 2903 where the control information has been allocated. Accordingly, at the time the terminal 2902 reports HARQ response information, a dynamically allocated PUCCH resource can be used. In addition, no PUCCH resource can be made to be available for two terminals (see NPL 1 and NPL 2).

CITATION LIST

Non Patent Literature

NPL 1: 3rd Generation Partnership Project; Technical Specification Group Radio Access Network; Evolved Universal Terrestrial Radio Access (E-UTRA); Physical Channels and Modulation (Release 10), June 2011, 3GPP TS 36.211 V10.2.0 (2011-06).

NPL 2: 3rd Generation Partnership Project; Technical Specification Group Radio Access Network; Evolved Universal Terrestrial Radio Access (E-UTRA); Physical layer procedures (Release 10), June 2011, 3GPP TS 36.213 V10.2.0 (2011-06).

SUMMARY OF INVENTION

Technical Problem

However, in a wireless communication system that can perform HARQ, it can be considered to use not only a physical downlink control channel but also an enhanced physical downlink control channel in order to increase the number of terminals that can be accommodated by one base station. Thus, in a conventional method of specifying a physical uplink control channel resource, in the case where a base station transmits control information via an enhanced physical downlink control channel, specification of a physical uplink control channel resource cannot be performed between the base station and a terminal, which becomes a factor for prevention of improvement of transmission efficiency.

In view of the aforementioned problem, an object of the present invention is to provide, in a wireless communication system in which a base station and a terminal communicate with each other, even in the case where the base station delivers control information for the terminal not only via a physical downlink control channel but also via an enhanced physical downlink control channel, the base station, the terminal, the communication system, and a communication method which can efficiently specify a physical uplink control channel resource.

Solution to Problem (1) A terminal according to an aspect of the present invention is a terminal that communicates with a base station, including: a downlink control channel detection unit that monitors a physical downlink control channel arranged in a physical downlink control channel region and an enhanced physical downlink control channel arranged in a physical downlink shared channel region different from the physical downlink control channel region; a data extraction unit that extracts, in a case where the downlink control channel detection unit detects the physical downlink control channel or the enhanced physical downlink control channel related to a physical downlink shared channel on a first cell and the enhanced physical downlink control channel related to a physical downlink shared channel on a second cell, transmit data in the physical downlink shared channel on the first cell and transmit data in the physical downlink shared channel on the second cell; a response information generation unit that generates response information in response to each of the extracted transmit data; a channel selection unit that selects, based on the response information, one physical uplink control channel resource from a physical uplink control channel resource configured for the physical downlink shared channel on the first cell and a physical uplink control channel resource configured for the physical downlink shared channel on the second cell; an uplink control channel generation unit that generates a physical uplink control channel, based on the response information; and a response transmission unit that transmits the physical uplink control channel generated by the uplink control channel generation unit, using the physical uplink control channel resource selected by the channel selection unit.

(2) In addition, a terminal according to an aspect of the present invention is the above-described terminal, wherein the channel selection unit uses, as the physical uplink control channel resource configured for the physical downlink shared channel on the first cell, a physical uplink control channel resource determined based on a number of an enhanced physical downlink control channel resource where the enhanced physical downlink control channel associated with the physical downlink shared channel on the first cell has been detected.

(3) In addition, a terminal according to an aspect of the present invention is the above-described terminal, wherein the channel selection unit uses, as the physical uplink control channel resource configured for the physical downlink shared channel on the second cell, a physical uplink control channel resource determined based on a number of an enhanced physical downlink control channel resource where the enhanced physical downlink control channel associated with the physical downlink shared channel on the second cell has been detected.

(4) In addition, a terminal according to an aspect of the present invention is the above-described terminal, wherein the channel selection unit uses, as the physical uplink control channel resource configured for the physical downlink shared channel on the first cell, a physical uplink control channel resource configured by the base station using RRC signaling.

(5) In addition, a terminal according to an aspect of the present invention is the above-described terminal, wherein the channel selection unit uses, as the physical uplink control channel resource configured for the physical downlink shared channel on the second cell, a physical uplink control channel resource configured by the base station using RRC signaling.

(6) In addition, a terminal according to an aspect of the present invention is the above-described terminal, wherein the channel selection unit uses, as the physical uplink control channel resource configured for the physical downlink shared channel on the first cell, a physical uplink control channel resource specified by the enhanced physical downlink control channel associated with the physical downlink shared channel on the first cell, among physical uplink control channel resource candidates configured by the base station using RRC signaling.

(7) In addition, a terminal according to an aspect of the present invention is the above-described terminal, wherein the channel selection unit uses, as the physical uplink control channel resource configured for the physical downlink shared channel on the second cell, a physical uplink control channel resource indicated by the enhanced physical downlink control channel associated with the physical downlink shared channel on the second cell, among physical uplink control channel resource candidates configured by the base station using RRC signaling.

(8) In addition, a base station according to an aspect of the present invention is a base station that communicates with a terminal, including: a physical control information delivering unit that delivers, to the terminal, a physical downlink control channel associated with a physical downlink shared channel on a first cell arranged in a physical downlink control channel or an enhanced physical downlink control channel associated with the physical downlink shared channel on the first cell arranged in a physical downlink shared channel region, and an enhanced physical downlink control channel associated with a physical downlink shared channel on a second cell arranged in the physical downlink shared channel region; and a response information reception unit that monitors a physical uplink control channel resource configured for the physical downlink shared channel on the first cell and a physical uplink control channel resource configured for the physical downlink shared channel on the second cell, and extracts response information in response to transmit data in the physical downlink shared channel on the first cell and response information in response to transmit data in the physical downlink shared channel on the second cell.

(9) In addition, a base station according to an aspect of the present invention is the above-described base station, wherein the response information reception unit monitors, as the physical uplink control channel resource configured for the physical downlink shared channel on the first cell, a physical uplink control channel resource determined based on a number of an enhanced physical downlink control channel resource where the enhanced physical downlink control channel associated with the physical downlink shared channel on the first cell is arranged.

(10) In addition, a base station according to an aspect of the present invention is the above-described base station, wherein the response information reception unit monitors, as the physical uplink control channel resource configured for the physical downlink shared channel on the second cell, a physical uplink control channel resource determined based on a number of an enhanced physical downlink control channel resource where the enhanced physical downlink control channel associated with the physical downlink shared channel on the first cell is arranged.

(11) In addition, a base station according to an aspect of the present invention is the above-described base station, wherein the response information reception unit monitors, as the physical uplink control channel resource configured for the physical downlink shared channel on the first cell, a physical uplink control channel resource configured for the terminal by using RRC signaling.

(12) In addition, a base station according to an aspect of the present invention is the above-described base station, wherein the response information reception unit monitors, as the physical uplink control channel resource configured for the physical downlink shared channel on the second cell, a physical uplink control channel resource configured for the terminal by using RRC signaling.

(13) In addition, a base station according to an aspect of the present invention is the above-described base station, wherein the response information reception unit monitors, as the physical uplink control channel resource configured for the physical downlink shared channel on the first cell, a physical uplink control channel resource indicated using the enhanced physical downlink control channel associated with the physical downlink shared channel on the first cell, among physical uplink control channel resource candidates configured for the terminal by using RRC signaling.

(14) In addition, a base station according to an aspect of the present invention is the above-described base station, wherein the response information reception unit monitors, as the physical uplink control channel resource configured for the physical downlink shared channel on the second cell, a physical uplink control channel resource indicated using the enhanced physical downlink control channel associated with the physical downlink shared channel on the first cell, among physical uplink control channel resource candidates configured for the terminal by using RRC signaling.

(15) In addition, a communication system according to an aspect of the present invention is a communication system that performs communication between a base station and a terminal, wherein the terminal comprises: a downlink control channel detection unit that monitors a physical downlink control channel arranged in a physical downlink control channel region and an enhanced physical downlink control channel arranged in a physical downlink shared channel region different from the physical downlink control channel region;

a data extraction unit that extracts, in a case where the downlink control channel detection unit detects the physical downlink control channel or the enhanced physical downlink control channel associated with a physical downlink shared channel on a first cell and the enhanced physical downlink control channel associated with a physical downlink shared channel on a second cell, transmit data in the physical downlink shared channel on the first cell and transmit data in the physical downlink shared channel on the second cell; a response information generation unit that generates response information in response to each of the extracted transmit data; a channel selection unit that selects, based on the response information, one physical uplink control channel resource from a physical uplink control channel resource configured for the physical downlink shared channel on the first cell and a physical uplink control channel resource configured for the physical downlink shared channel on the second cell; an uplink control channel generation unit that generates a physical uplink control channel, based on the response information; and a response transmission unit that transmits the physical uplink control channel generated by the uplink control channel generation unit, using the physical uplink control channel resource selected by the channel selection unit, and wherein the base station comprises: a physical control information delivering unit that delivers, to the terminal, the physical downlink control channel or the enhanced physical downlink control channel associated with the physical downlink shared channel on the first cell, and the enhanced physical downlink control channel associated with the physical downlink shared channel on the second cell; and a response information reception unit that monitors a physical uplink control channel resource configured for the physical downlink shared channel on the first cell and a physical uplink control channel resource configured for the physical downlink shared channel on the second cell, and extracts response information in response to transmit data in the physical downlink shared channel on the first cell and response information in response to transmit data in the physical downlink shared channel on the second cell.

(16) In addition, a communication method according to an aspect of the present invention is a communication method performed by a terminal that communicates with a base station, including: a step of monitoring a physical downlink control channel arranged in a physical downlink control channel region and an enhanced physical downlink control channel arranged in a physical downlink shared channel region different from the physical downlink control channel region; a step of extracting, in a case where the physical downlink control channel or the enhanced physical downlink control channel associated with a physical downlink shared channel on a first cell and the enhanced physical downlink control channel associated with a physical downlink shared channel on a second cell are detected, transmit data in the physical downlink shared channel on the first cell and transmit data in the physical downlink shared channel on the second cell; a step of generating response information in response to each of the extracted transmit data; a step of selecting, based on the response information, one physical uplink control channel resource from a physical uplink control channel resource configured for the physical downlink shared channel on the first cell and a physical uplink control channel resource configured for the physical downlink shared channel on the second cell; a step of generating a physical uplink control channel, based on the response information; and a step of transmitting the generated physical uplink control channel using the selected physical uplink control channel resource.

(17) In addition, a communication method according to an aspect of the present invention is a communication method performed by a base station that communicates with a terminal, including: a step of delivering, to the terminal, a physical downlink control channel associated with a physical downlink shared channel on a first cell arranged in a physical downlink control channel or an enhanced physical downlink control channel associated with the physical downlink shared channel on the first cell arranged in a physical downlink shared channel region, and an enhanced physical downlink control channel associated with a physical downlink shared channel on a second cell arranged in the physical downlink shared channel region; and a step of monitoring a physical uplink control channel resource configured for the physical downlink shared channel on the first cell and a physical uplink control channel resource configured for the physical downlink shared channel on the second cell, and extracting response information in response to transmit data in the physical downlink shared channel on the first cell and response information in response to transmit data in the physical downlink shared channel on the second cell.

Advantageous Effects of Invention

According to the present invention, in a wireless communication system in which a base station and a terminal communicate with each other, even in the case where the base station reports control information for the terminal not only via a physical downlink control channel but also via an enhanced physical downlink control channel, a physical uplink control channel resource can be efficiently specified.

BRIEF DESCRIPTION OF DRAWINGS

FIG. 7 is a correspondence table representing uplink control channel logical resources according to the first embodiment.

FIG. 16 is a diagram illustrating a table representing the relationship between response information and a PUCCH resource according to the first embodiment.

FIG. 17 is a diagram illustrating a table representing the relationship between response information and a PUCCH resource according to the first embodiment.

FIG. 20 is a diagram illustrating an example of the configuration of PUCCH resource candidates according to the first embodiment.

DESCRIPTION OF EMBODIMENTS (First Embodiment)

Hereinafter, a first embodiment of the present invention will be described. A communication system in the first embodiment includes a base station (a base station device, a downlink transmitter, an uplink receiver, and eNodeB) and a terminal (a terminal device, a mobile station device, a downlink receiver, an uplink transmitter, and UE).

Figure 1:
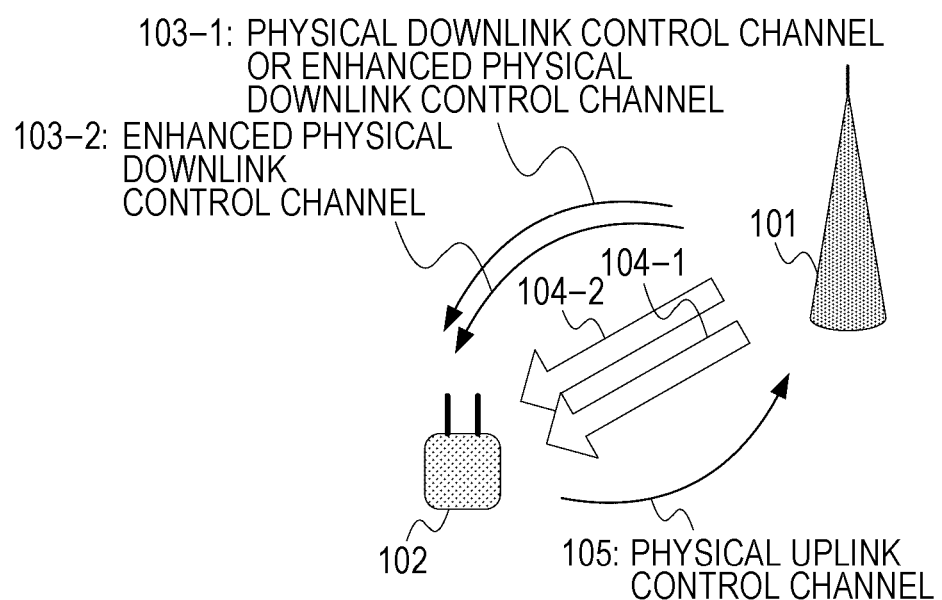
FIG. 1 is a diagram illustrating an example of the configuration of a communication system according to a first embodiment of the present invention.

FIG. 1 is a diagram illustrating an example of the configuration of the communication system according to the first embodiment. In FIG. 1, a base station 101 delivers to a terminal 102 control information regarding downlink transmit data 104-1 and 104-2 via a PDCCH and/or an enhanced physical downlink control channel (E-PDCCH: Enhanced-PDCCH) 103-1 and an E-PDCCH 103-2, which are control channels used for dynamical signaling. Here, the downlink transmit data 104-1 and 104-2 are arranged in physical downlink shared channels (PDSCH; Physical Downlink Shared CHannel) in accommodation cells (a primary cell (PCell) and a secondary cell (SCell)) that have different downlink component carriers. Note that the downlink transmit data 104-1 may be arranged in the PDSCH in the PCell, and the downlink transmit data 104-2 may be arranged in the PDSCH in the SCell. Alternatively, the downlink transmit data 104-1 may be arranged in the PDSCH in the SCell, and the downlink transmit data 104-2 may be arranged in the PDSCH in the PCell. The terminal 102 first detects the control information. In the case where the control information is detected, the terminal 102 extracts the downlink transmit data 104-1 or 104-1 using the detected control information. The terminal 102, which has detected the control information, reports to the base station 101 HARQ response information (may also be referred to as "Ack/Nack") indicating whether extraction of the downlink transmit data 104-1 has been successful and HARQ response information indicating whether extraction of the downlink transmit data 104-1 has been successful via either of a PUCCH resource for the downlink transmit data 104-1 and a PUCCH resource for the downlink transmit data 104-2.

At this time, in the case where the terminal 102 has detected the control information in the PDCCH 103-1, a resource of a physical uplink control channel (PUCCH) 105 available for the terminal 102 as the PUCCH resource for the downlink transmit data 104-1 is configured to be uniquely determined in an implicit/suggestive manner from a resource of the PDCCH where the control information has been allocated. In addition, in the case where the terminal 102 has detected the control information in the E-PDCCH 103-1 or 103-2, a resource of the PUCCH 105 available for the terminal 102 as the PUCCH resource for the downlink transmit data 104-1 or 104-2 is configured to be uniquely determined in an implicit/suggestive manner from a resource of the E-PDCCH 103 where the control information has been allocated. Alternatively, in the case where the terminal 102 has detected the control information in the E-PDCCH 103-1 or 103-2, a resource of the PUCCH 105 available for the terminal 102 as the PUCCH resource for the downlink transmit data 104-1 or 104-2 is explicitly indicated (configured and reported) in advance by the base station 101. Note that the terminal 102 selects either the PUCCH resource for the downlink transmit data 104-1 or the PUCCH resource for the downlink transmit data 104-2 to be used. This operation is referred to as channel selection. The details of channel selection will be described later.

Figure 2:
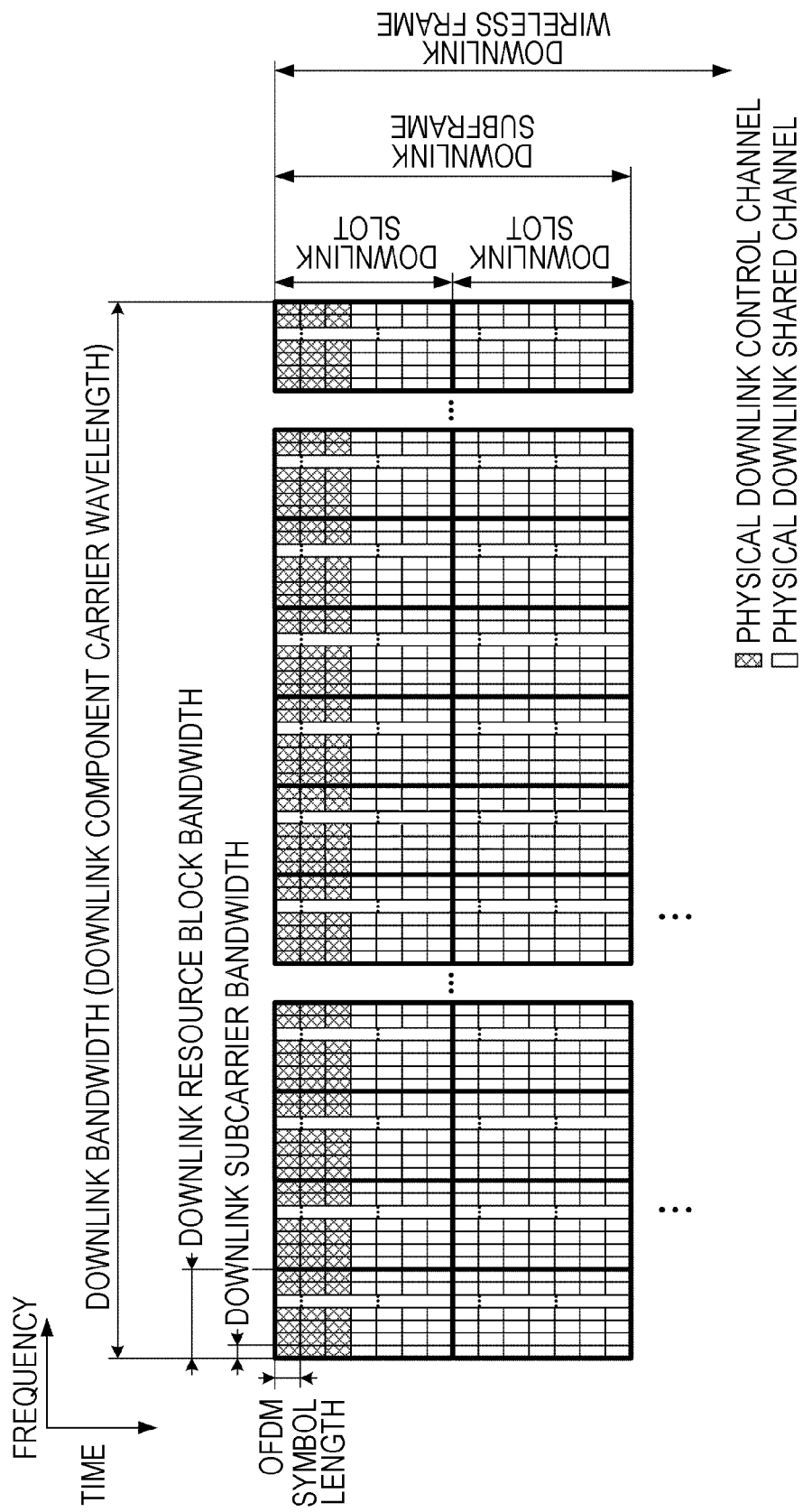
FIG. 2 is a diagram illustrating an example of the configuration of a downlink wireless frame according to the first embodiment.

FIG. 2 is a diagram illustrating an example of the configuration of a downlink wireless frame according to this embodiment. For downlink, the OFDM access scheme is used. In downlink, a PDCCH, a PDSCH, and the like are allocated. A downlink wireless frame is constituted of pairs of resource blocks (RB; Resource Block) of downlink. These downlink RB pairs are units for allocating wireless resources of downlink and the like, and each have a frequency band (RB bandwidth) with a prescribed width and a time period with a prescribed with (two slots=one subframe). One downlink RB pair is constituted of two downlink RBs contiguous in the time domain (RB bandwidth×slots). One downlink RB is constituted of twelve subcarriers in the frequency domain, and is constituted of seven OFDM symbols in the time domain. A resource element defined by one subcarrier in the frequency domain and one OFDM symbol in the time domain is referred to as a resource element (RE; Resource Element). A physical downlink control channel is a physical channel through which downlink control information is transmitted, such as a terminal device identifier, scheduling information of a physical downlink shared channel, scheduling information of a physical uplink shared channel, a modulation scheme, a coding rate, and a retransmission parameter. Although the downlink subframe in one component carrier (CC; Component Carrier) is described here, a downlink subframe is defined for each CC, and downlink subframes are almost synchronized with one another among CCs.

Figure 3:
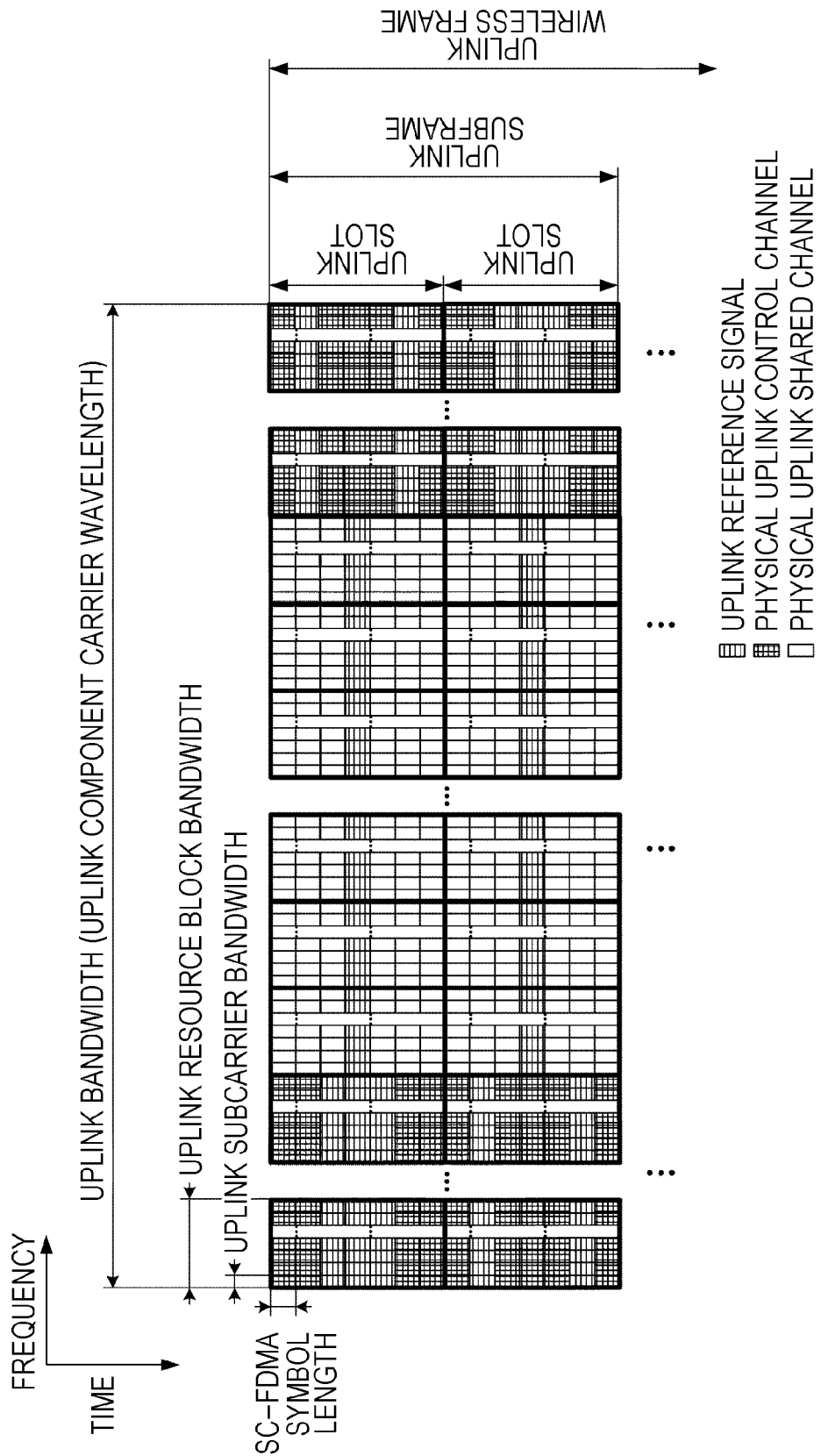
FIG. 3 is a diagram illustrating an example of the configuration of an uplink wireless frame according to the first embodiment.

FIG. 3 is a diagram illustrating an example of the configuration of an uplink wireless frame according to this embodiment. For uplink, the SC-FDMA scheme is used. In uplink, a physical uplink shared channel (Physical Uplink Shared Channel; PUSCH), a PUCCH, and the like are allocated. In addition, an uplink reference signal is allocated to part of a PUSCH and a PUCCH. An uplink wireless frame is constituted of RB pairs of uplink. These uplink RB pairs are units for allocating wireless resources of uplink and the like, and each have a frequency band (RB bandwidth) with a prescribed width and a time period with a prescribed width (two slots=one subframe). One uplink RB pair is constituted of two uplink RBs contiguous in the time domain (RB bandwidth× slots). One uplink RB is constituted of twelve subcarriers in the frequency domain, and is constituted of seven SC-OFDM symbols in the time domain. Although the uplink subframe in one CC is described here, an uplink subframe is defined for each CC.

Here, carrier aggregation (CA) will be described. Carrier aggregation is technology that aggregates multiple different frequency bands (component carriers) and handles these as if they were one frequency band. For example, in the case where five component carriers, each having a frequency bandwidth of 20 MHz, are aggregated by carrier aggregation, the terminal device can access these component carriers as a frequency bandwidth of 100 MHz and access this frequency bandwidth. Note that component carriers to be aggregated may be contiguous frequencies, or all or some of component carriers to be aggregated may be non-contiguous. For example, in the case where usable frequencies are the 800 MHz band, the 2.4 GHz band, and the 3.4 GHz band, a certain component carrier may be transmitted in the 800 MHz band, another component carrier may be transmitted in the 2 GHz band, and yet another component carrier may be transmitted in the 3.4 GHz band.

In addition, it is possible to aggregate contiguous or non-contiguous component carriers in the same frequency band, such as the 2.4 GHz band. The frequency bandwidth of each component carrier may be a frequency bandwidth narrower than 20 MHz, and the individual frequency bandwidths may be different. The base station device can increase or decrease the number of uplink or downlink component carriers to be allocated to the terminal device on the basis of various factors, such as reports on the amount of buffered data accumulated and the reception quality of the terminal device, a load in each cell, and QoS. Note that the number of uplink component carriers to be allocated is preferably the same as or fewer than the number of downlink component carriers. The base station device configures one cell by combining one downlink component carrier and one uplink component carrier.

The corresponding relationship between the frequency for uplink and the frequency for downlink is explicitly indicated as frequency information in report information. In the case where the corresponding relationship is not explicitly indicated, the corresponding relationship is implicitly indicated by using information on a defined frequency difference between uplink and downlink, which is uniquely determined for each operating frequency. The method of indicating the corresponding relationship is not limited to these methods, and the corresponding relationship may be indicated using a method other than these methods as long as it is possible to indicate the corresponding relationship between the frequency for uplink and the frequency for downlink for each cell.

Figure 4:
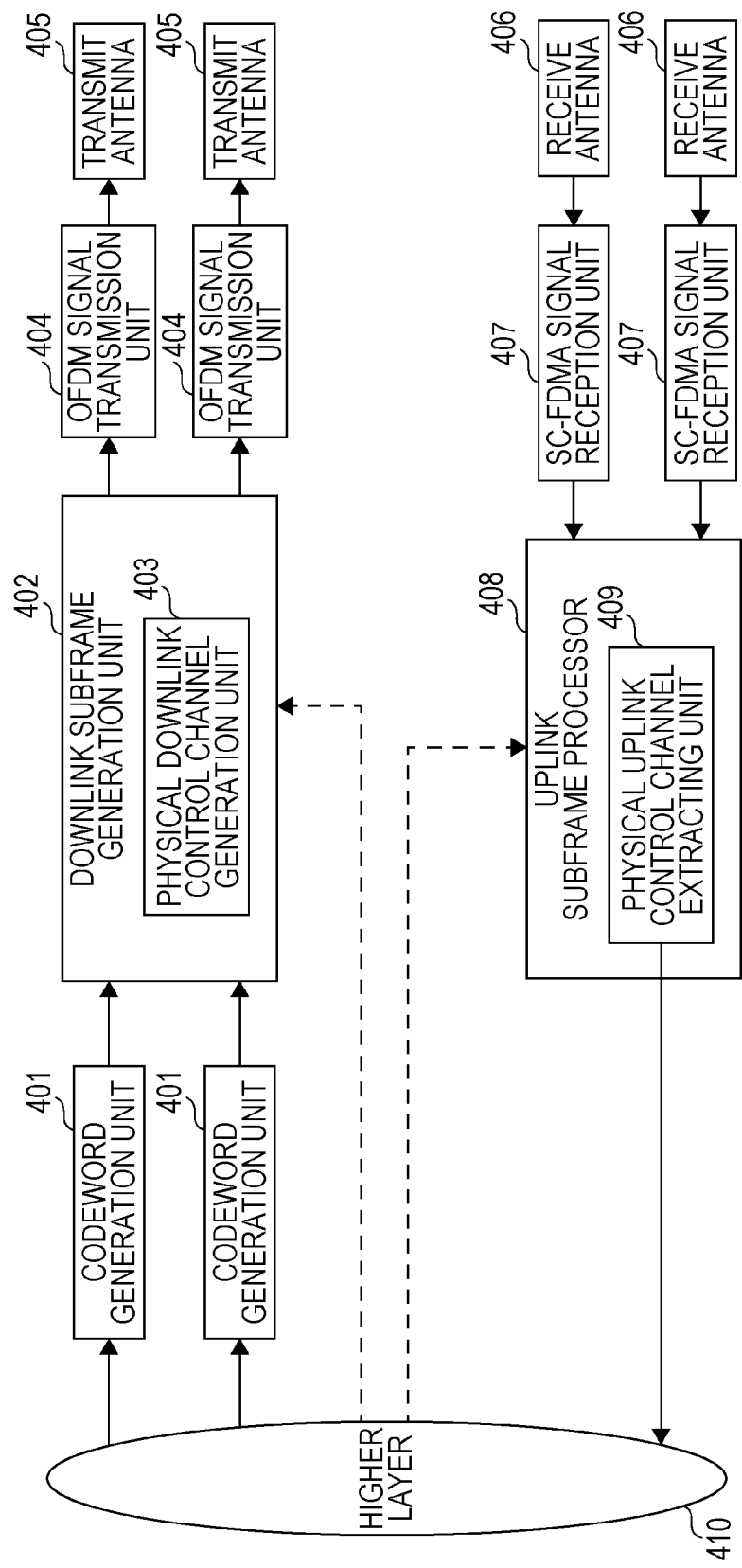
FIG. 4 is a schematic diagram illustrating an example of the block configuration of a base station according to the first embodiment.

FIG. 4 is a schematic diagram illustrating an example of the block configuration of the base station 101 according to this embodiment. The base station 101 includes a codeword generation unit 401, a downlink subframe generation unit 402, an OFDM signal transmission unit (physical control information delivering unit) 404, a transmit antenna (base station transmit antenna) 405, a receive antenna (base station receive antenna) 406, an SC-FDMA signal reception unit (response information reception unit) 407, an uplink subframe processing unit 408, and a higher layer (higher layer control information delivering unit) 410. The downlink subframe generation unit 402 includes a physical downlink control channel generation unit 403. In addition, the uplink subframe processing unit 408 includes a physical uplink control channel extracting unit 409.

Figure 5:
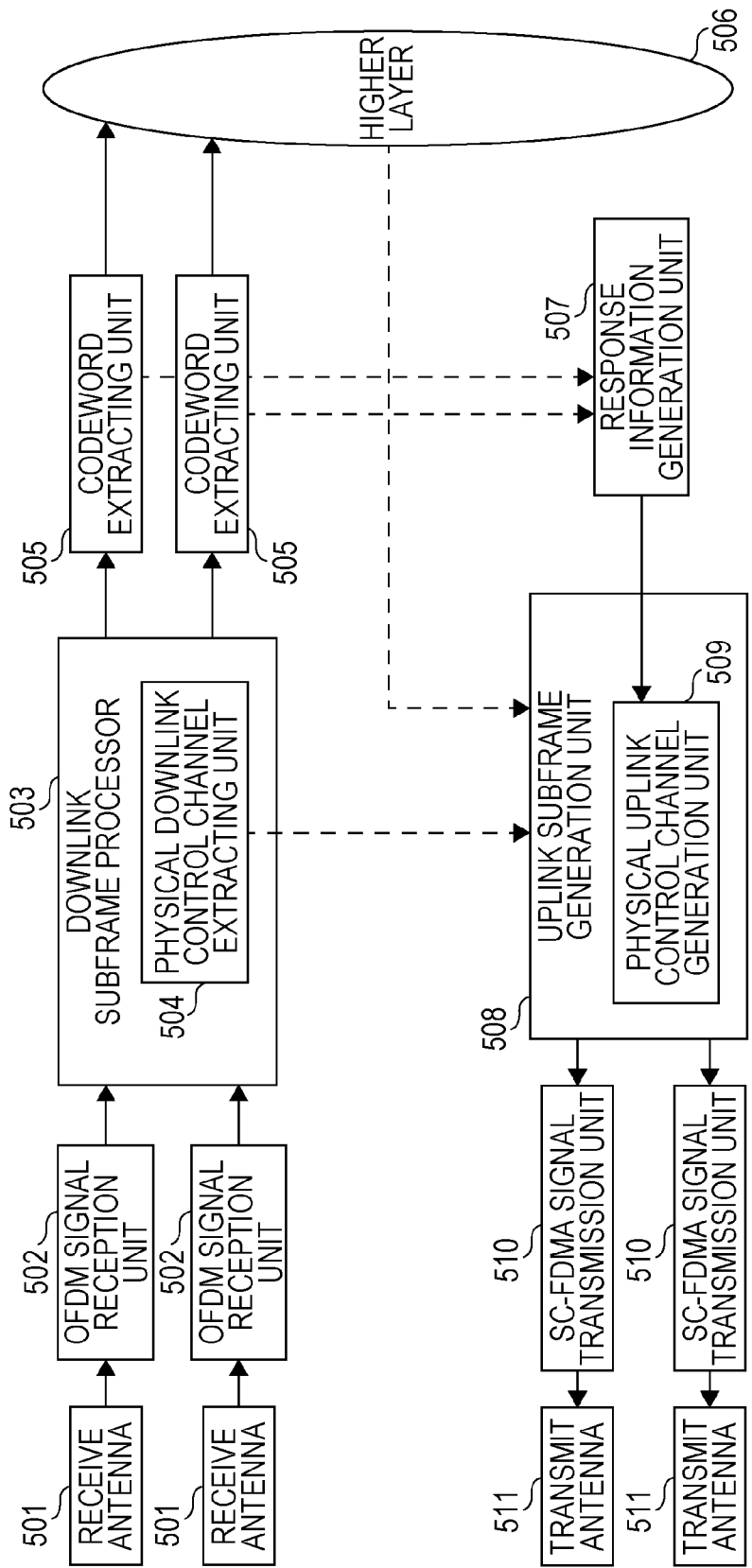
FIG. 5 is a schematic diagram illustrating an example of the block configuration of a terminal according to the first embodiment.

FIG. 5 is a schematic diagram illustrating an example of the block configuration of the terminal 102 according to this embodiment. The terminal 102 includes a receive antenna (terminal receive antenna) 501, an OFDM signal reception unit (downlink reception unit) 502, a downlink subframe processing unit 503, a codeword extracting unit (data extracting unit) 505, a higher layer (higher layer control information obtaining unit) 506, a response information generation unit 507, an uplink subframe generation unit (channel selection unit) 508, an SC-FDMA signal transmission unit (response transmission unit) 510, and a transmit antenna (terminal transmit antenna) 511. The downlink subframe processing unit 503 includes a physical downlink control channel extracting unit (downlink control channel detection unit) 504. In addition, the uplink subframe generation unit 508 includes a physical uplink control channel generation unit (uplink control channel generation unit) 509.

At first, the flow of transmission/reception of downlink data will be described using FIG. 4 and FIG. 5. In the base station 101, the codeword generation unit 401 applies processing such as error correction coding and rate matching processing to transmit data (may also be referred to as a transport block (TB: Transport Block)) transmitted from the higher layer 410, thereby generating a codeword. In one subframe in one cell, two codewords at maximum are simultaneously transmitted. In response to an instruction from the higher layer 410, the downlink subframe generation unit 402 generates a downlink subframe. Firstly, the codeword generated by the codeword generation unit 401 is converted into a modulated symbol sequence by modulation processing such as PSK (Phase Shift Keying) modulation or QAM (Quadrature Amplitude Modulation) modulation. In addition, the modulated symbol sequence is mapped to REs in some RBs and subjected to pre-coding processing, thereby generating a downlink subframe for each antenna port. Note that an RE in downlink is defined corresponding to each subcarrier on each OFDM symbol. At this time, the transmit data sequence transmitted from the higher layer 410 includes control information (higher layer control information) for RRC (Radio Resource Control) signaling, which is semi-static signaling. In addition, the physical downlink control channel generation unit 403 generates a physical downlink control channel. Here, control information (downlink control information, downlink grant) included in the physical downlink control channel includes information such as commands of MCS (Modulation and Coding Scheme) indicating a modulation scheme in downlink or the like, downlink resource allocation indicating RBs used for data transmission, HARQ control information (redundancy version, HARQ process number, and new data indicator) used for HARQ control, and PUCCH-TPC (Transmission Power Control) used for closed loop transmission power control in a PUCCH. In response to an instruction from the higher layer 410, the downlink subframe generation unit 402 maps the physical downlink control channel to REs in the downlink subframe. The downlink subframe for each antenna port, generated by the downlink subframe generation unit 402, is modulated by the OFDM signal transmission unit 404 into an OFDM signal and transmitted via the transmit antenna 405.

In the terminal 102, the OFDM signal reception unit 502 receives the OFDM signal via the receive antenna 501, and applies OFDM demodulation processing to the OFDM signal. Firstly, the downlink subframe processing unit 503 detects, by using the physical downlink control channel extracting unit 504, a PDCCH (first downlink control channel) or an E-PDCCH (second downlink control channel). More specifically, the physical downlink control channel extracting unit 504 decodes a region where a PDCCH may be arranged (first downlink control channel region) or a region where an E-PDCCH may be arranged (second downlink control channel region, potential E-PDCCH), and checks a CRC (Cyclic Redundancy Check) bit added in advance (blind decoding). That is, the physical downlink control channel extracting unit 504 monitors a PDCCH arranged in a PDCCH region and an E-PDCCH arranged in a PDSCH region different from the PDCCH region. In the case where the CRC bit matches an ID allocated by the base station in advance, the downlink subframe processing unit 503 recognizes that a PDCCH or an E-PDCCH has been detected, and extracts a PDSCH using control information included in the detected PDCCH or E-PDCCH. More specifically, RE demapping processing, demodulation processing, and the like, which correspond to RE mapping processing and modulation processing in the downlink subframe generation unit 402, are applied. The PDSCH extracted from the received downlink subframe is transmitted to the codeword extracting unit 505. The codeword extracting unit 505 applies rate matching processing, error correction decoding, and the like, which correspond to rate matching processing and error correction coding in the codeword generation unit 401, to extract a transport block, and transmits the transport block to the higher layer 506. That is, in the case where the physical downlink control channel extracting unit 504 detects a PDCCH or an E-PDCCH, the codeword extracting unit 505 extracts transmit data in a PDSCH associated with the detected PDCCH or E-PDCCH and transmits the extracted transmit data to the higher layer 506.

Next, the flow of transmission/reception of HARQ response information in response to downlink transmit data will be described. In the terminal 102, in the case where whether extraction of a transport block by the codeword extracting unit 505 has been successful or not is determined, information indicating whether the extraction has been successful or not is transmitted to the response information generation unit 507. The response information generation unit 507 generates HARQ response information and transmits the HARQ response information to the physical uplink control channel generation unit 509 in the uplink subframe generation unit 508. In the uplink subframe generation unit 508, on the basis of a parameter transmitted from the higher layer 506 and a resource where a PDCCH or an E-PDCCH has been arranged at the physical downlink control channel extracting unit 504, the physical uplink control channel generation unit 509 generates a PUCCH including the HARQ response information (uplink control information), and maps the generated PUCCH to RBs in an uplink subframe. That is, a PUCCH is generated by mapping the response information to the PUCCH resource. The SC-FDMA signal transmission unit 510 applies SC-FDMA modulation to the uplink subframe to generate an SC-FDMA signal, and transmits the SC-FDMA signal via the transmit antenna 511.

At this time, taking into consideration channel selection, the physical uplink control channel generation unit 509 in the uplink subframe generation unit 508 generates a PUCCH using the HARQ response information generated by the response information generation unit 507. In addition, taking into consideration channel selection, the uplink subframe generation unit 508 maps the PUCCH generated by the physical uplink control channel generation unit 509 to RBs in the uplink subframe.

In the base station 101, the SC-FDMA signal reception unit 407 receives the SC-FDMA signal via the receive antenna 406, and applies SC-FDMA demodulation processing to the SC-FDMA signal. In response to an instruction from the higher layer 410, the uplink subframe processing unit 408 extracts RBs where the PUCCH has been mapped, and the physical uplink control channel extracting unit 409 extracts the HARQ response information included in the PUCCH. The extracted HARQ response control information is transmitted to the higher layer 410. The HARQ response control information is used for HARQ control performed by the higher layer 410.

At this time, taking into consideration channel selection, the physical uplink control channel extracting unit 409 in the uplink subframe processing unit 408 extracts the HARQ response control information included in the PUCCH.

Next, the PUCCH resource in the uplink subframe generation unit 508 will be described. The HARQ response control information is spread in an SC-FDMA sample region by using a cyclically-shifted pseudo-CAZAC (Constant Amplitude Zero-Auto Correlation) sequence, and further this is spread among four SC-FDMA symbols in a slot by using an orthogonal cover code OCC (Orthogonal Cover Code) whose code length is four. In addition, the symbol, which has been spread by these two codes, is mapped to two RBs with different frequencies. In this manner, the PUCCH resource is defined by three elements, namely, a cyclic shift amount, an orthogonal code, and RBs to which the symbol is mapped. Note that a cyclic shift in the SC-FDMA sample region may be represented in terms of phase rotation that uniformly increases in the frequency domain.

Figure 6:
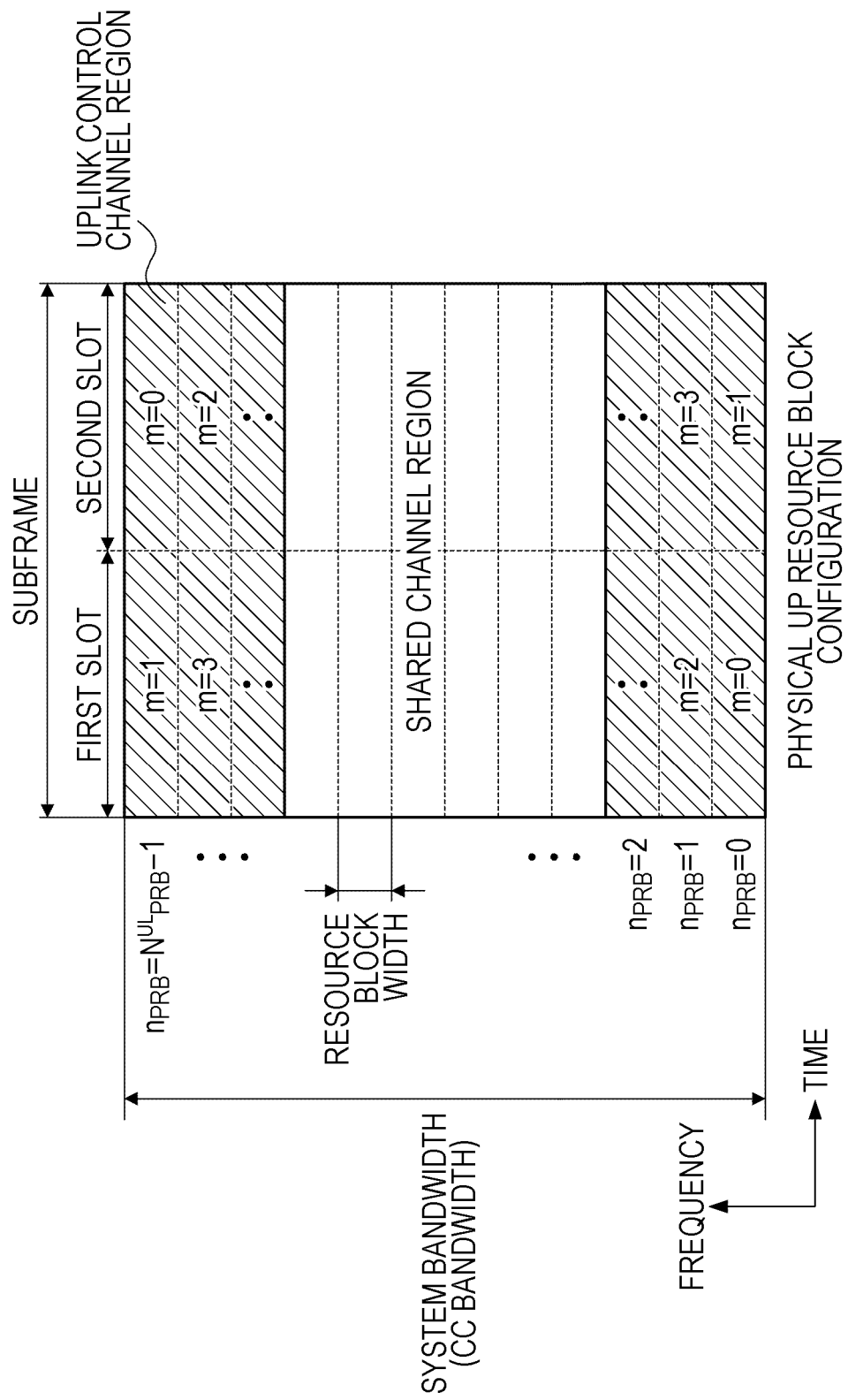
FIG. 6 is a diagram illustrating a physical up resource block configuration in an uplink control channel region where a PUCCH is allocated according to the first embodiment.

FIG. 6 is a diagram illustrating a physical up resource block configuration (uplink control channel physical resource) in an uplink control channel region where a PUCCH is allocated. Each RB pair is constituted of two RBs with different frequencies in a first slot and a second slot. One PUCCH is arranged in any of RB pairs where m=0, 1, 2, . . . .

FIG. 7 is a correspondence table representing uplink control channel logical resources. This is an example of PUCCH resources in the case where, as elements configuring a PUCCH, three orthogonal codes OC0, OC1, and OC2, six cyclic shift amounts CS0, CS2, CS4, CS6, CS8, and CS10, and m indicating a frequency resource are assumed. Corresponding to $n^1_{PUCCH}$, which is an index indicating a PUCCH resource (uplink control channel logical resource), each combination of an orthogonal code, a cyclic shift amount, and m is uniquely defined. Note that the correspondence of $n^1_{PUCCH}$ and each combination of an orthogonal code, a cyclic shift amount, and m, illustrated in FIG. 7, is only exemplary, and other correspondence may be possible. For example, correspondence may be made so that the cyclic shift amount changes or m changes between contiguous $n^1_{PUCCH}$. In addition, CS1, CS3, CS5, CS7, CS9, and CS11, which are cyclic shift amounts different from CS0, CS2, CS4, CS6, CS8, and CS10, may be used. In addition, the case in which the value of m is $N_{F2}$ or greater is indicated. A frequency resource where m is less than $N_{F2}$ is $N_{F2}$ frequency resources reserved for PUCCH transmission for the feedback of channel state information.

Figure 8:
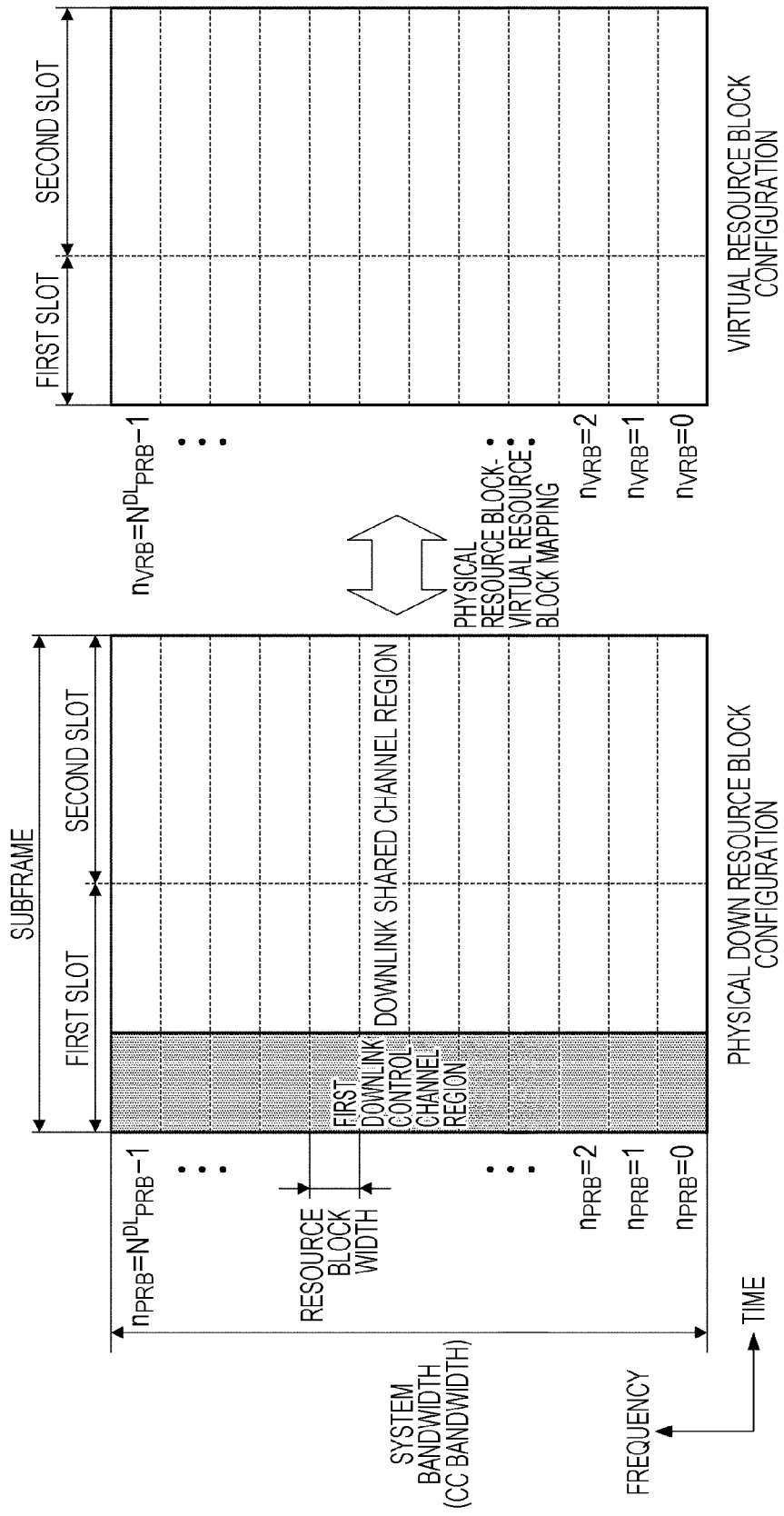
FIG. 8 is a diagram illustrating physical resource blocks PRBs and virtual resource block VRBs in a PDCCH region and a PDSCH region according to the first embodiment.

Next, a PDCCH and an E-PDCCH will be described. FIG. 8 is a diagram illustrating physical resource blocks PRBs (Physical RBs) and virtual resource blocks (Virtual RBs) in a PDCCH region and a PDSCH region. RBs on an actual subframe are referred to as PRBs. In addition, an RB that is a logical resource used for RB allocation is referred to as a VRB. $N^{DL}_{PRB}$ is the number of PRBs arranged in the frequency direction in a downlink CC. A PRB (or PRB pair) is given a number $n_{PRB}$, and $n_{PRB}$ is 0, 1, 2, ..., $N^{CL}_{PRR-1}$ in ascending order of frequency. The number of VRBs arranged in the frequency direction in a downlink CC is equal to $N^{DL}_{PRB}$. A VRB (or VRB pair) is given a number $n_{VRB}$, and $n_{VRB}$ is 0, 1, 2, ..., $N^{DL}_{PRB-1}$ in ascending order of frequency. PRBs and VRBs are explicitly or implicitly/suggestively mapped. Note that a number referred to here may also be expressed as an index.

Figure 9:
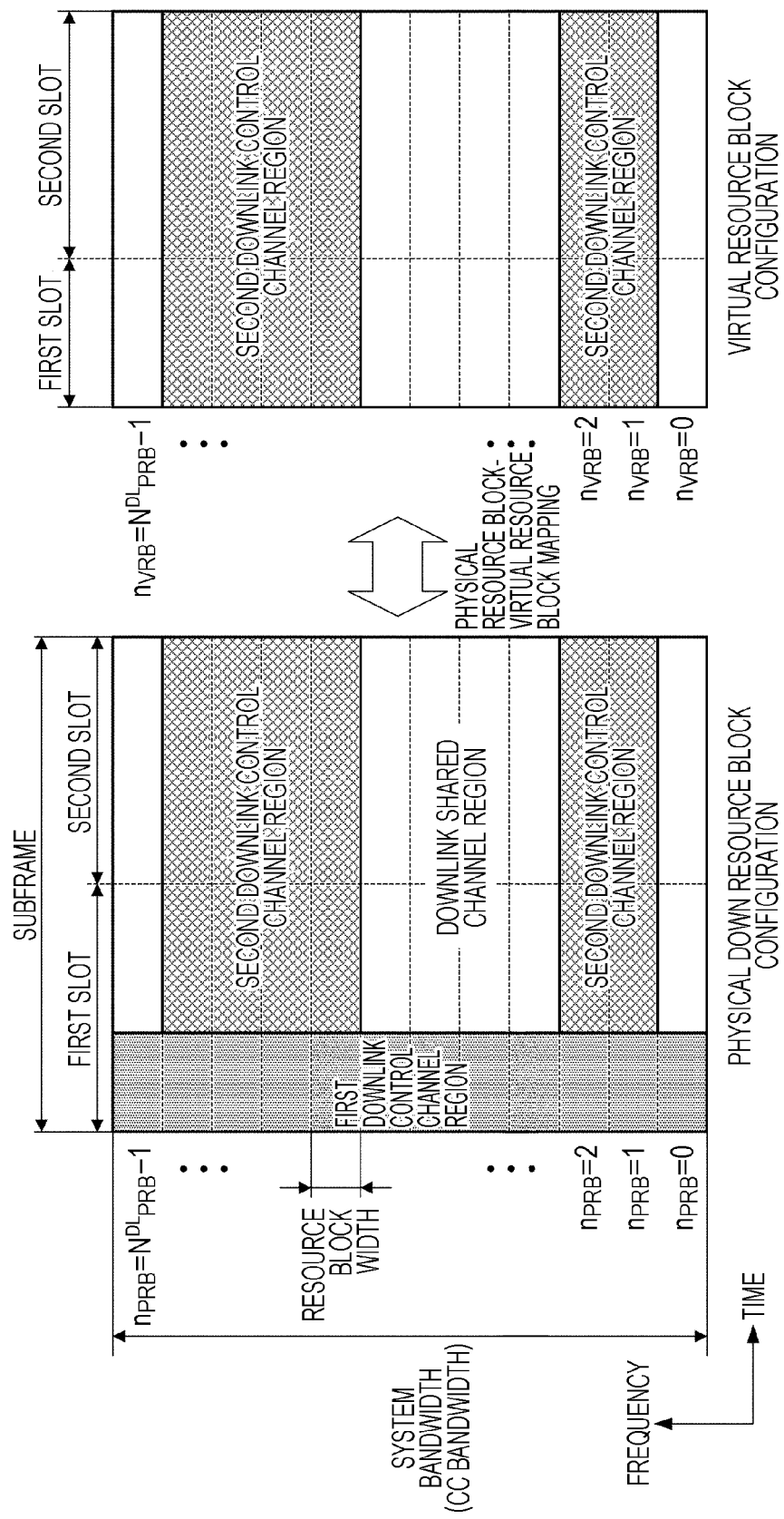
FIG. 9 is a diagram illustrating an example of PRB-VRB mapping in an E-PDCCH region and the PDSCH region according to the first embodiment.

Next, FIG. 9 is a diagram illustrating an example of PRB-VRB mapping in an E-PDCCH region and a PDSCH region. According to this PRB-VRB mapping scheme, a PRB pair and a VRB pair having the equal $n_{PRB}$ and $n_{VRB}$ are mapped to each other. In other words, transmit data or a modulated symbol of control information allocated to REs on a VRB pair with $n_{VRB}$ is mapped as it is to REs on a PRB pair with $n_{PRB}=n_{VRB}$.

Figure 10:
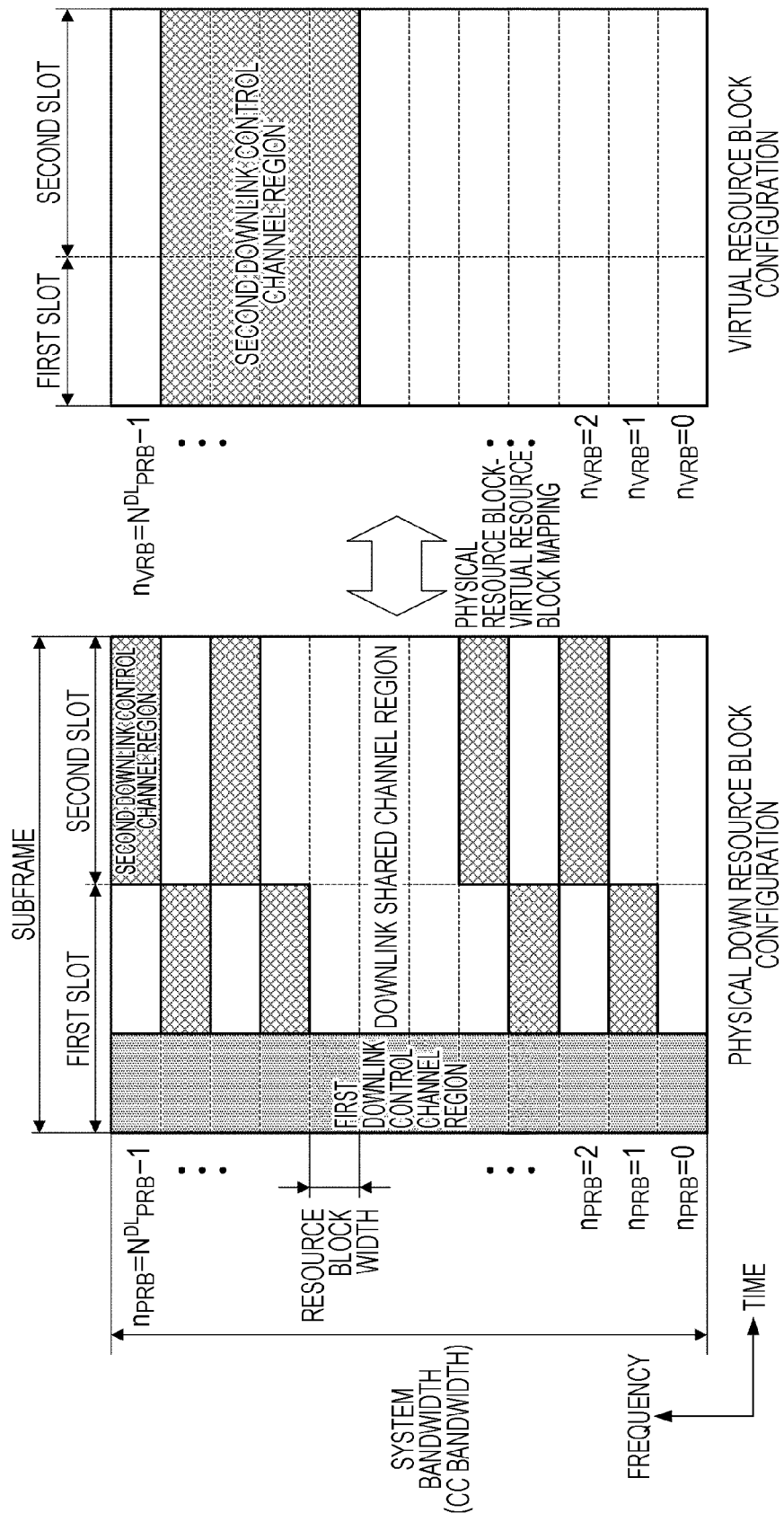
FIG. 10 is a diagram illustrating another example of PRB-VRB mapping in the E-PDCCH region and the PDSCH region according to the first embodiment.

Next, FIG. 10 is a diagram illustrating another example of PRB-VRB mapping in an E-PDCCH region and a PDSCH region. According to this PRB-VRB mapping scheme, VRBs contiguous to each other on the frequency axis are mapped to PRBs at non-contiguous positions on the frequency axis. The VRB in the first slot and the VRB in the second slot of a VRB pair having the same $n_{VRB}$ are mapped to PRBs at the same position on the frequency axis. Note that the VRB in the first slot is mapped to the PRB in the first slot, and the VRB in the second slot is mapped to the PRB in the second slot.

In this manner, some (or all) VRB pairs are configured as an E-PDCCH region (region where an E-PDCCH may potentially be arranged). Further, according to the PRB-VRB mapping scheme explicitly or implicitly/suggestively specified, substantially some (or all) PRB pairs of a PDSCH region or slot-hopped PRBs are configured as an E-PDCCH region.

Figure 11:
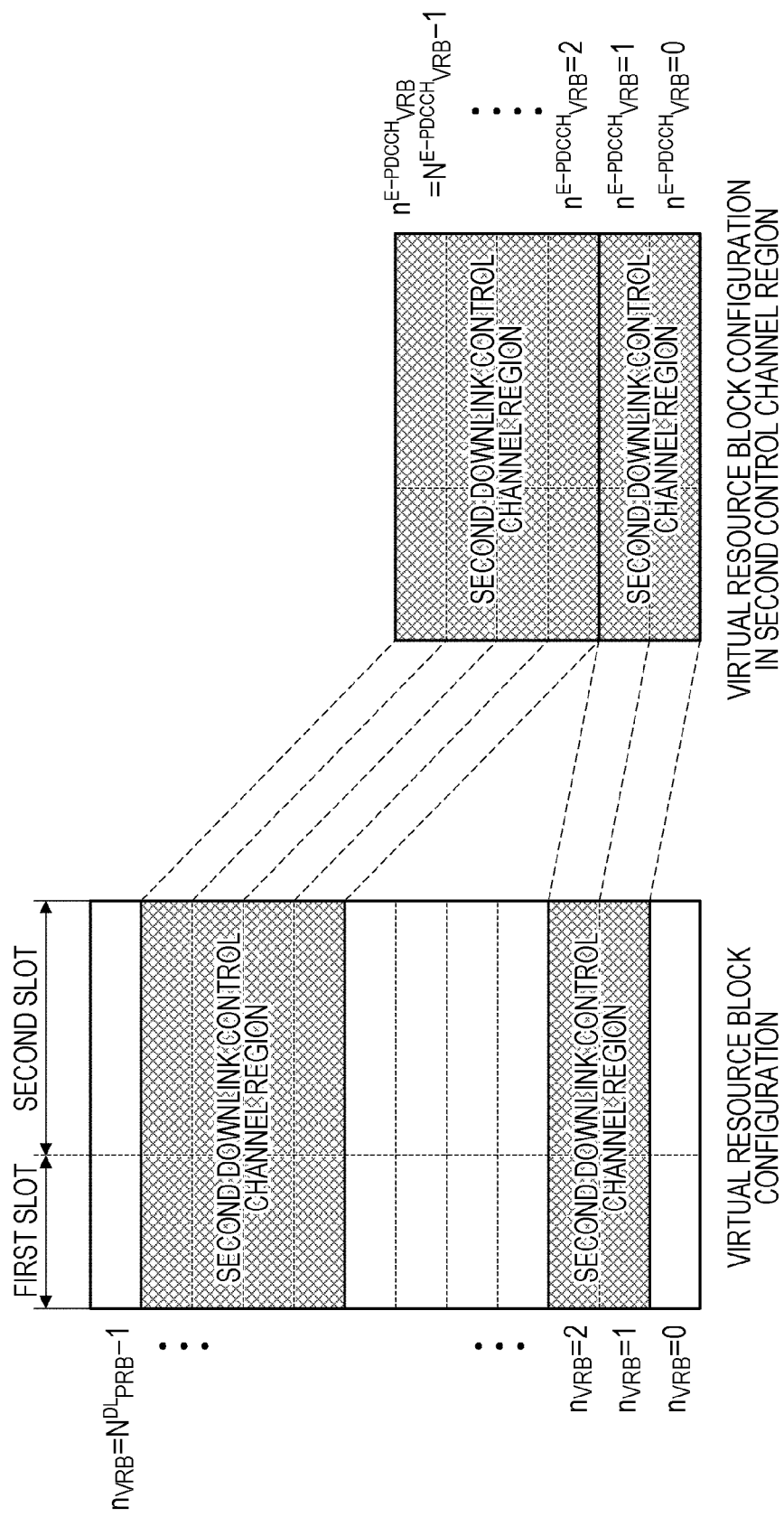
FIG. 11 is a diagram illustrating an example of numbering of VRBs in the E-PDCCH region according to the first embodiment.

FIG. 11 is a diagram illustrating an example of numbering of VRBs in an E-PDCCH region. Among $N^{DL}_{PRB}$ VRB pairs, $N^{E-PDCCH}_{VRB}$ VRB pairs configured in an E-PDCCH region are extracted and are given VRB numbers $n^{E-PDCCH}_{VRB}$ in the E-PDCCH region. The numbering starts with a VRB pair with the lowest frequency and is 0, 1, 2, ..., $N^{E-PDCCH}_{VRB}-1$. In other words, in the frequency region, in response to potential E-PDCCH transmission, $N^{E-PDCCH}_{VRB}$ VRB sets are configured by signaling of the higher layer (such as individualized signaling for each terminal or common signaling in a cell).

Figure 12:
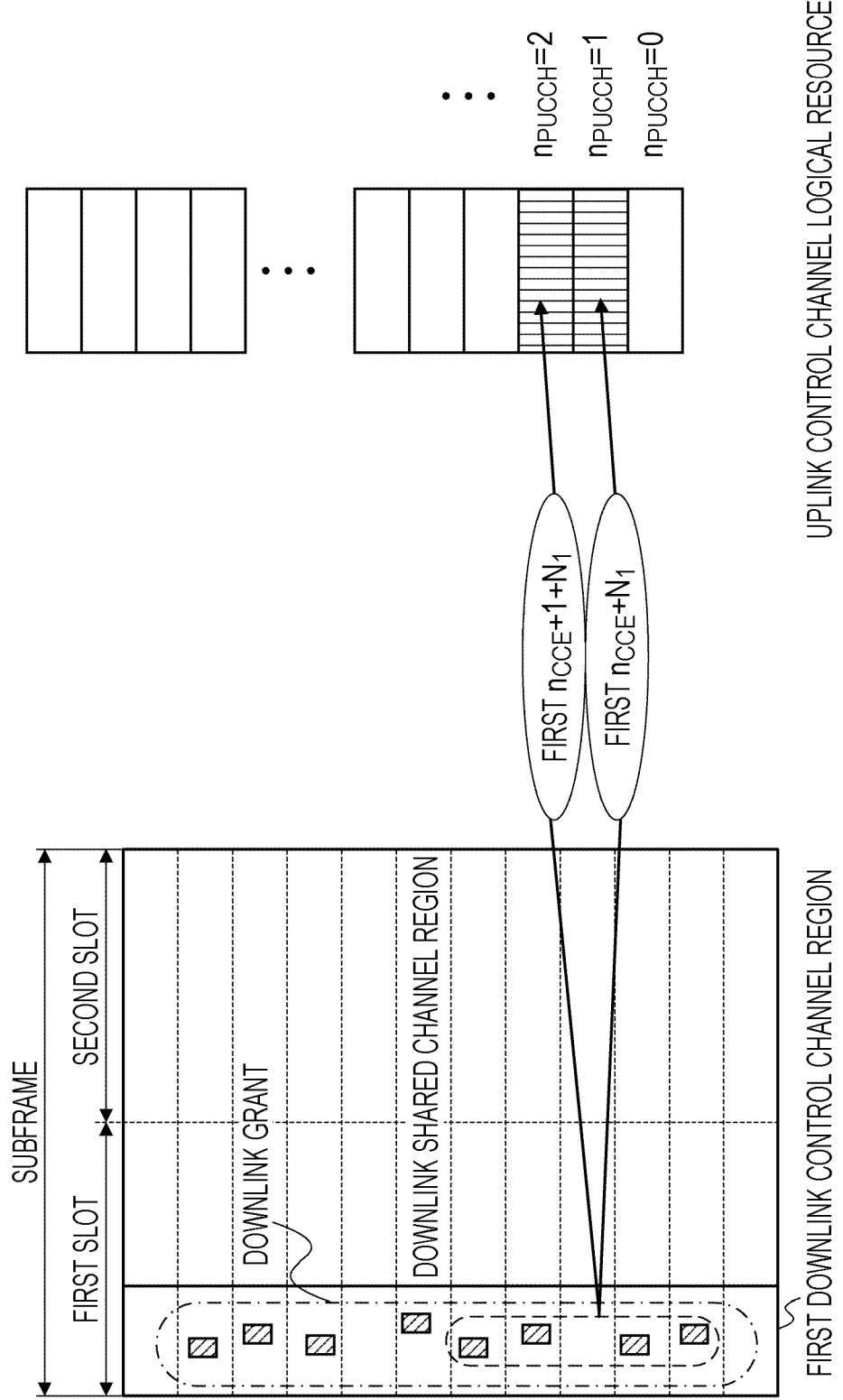
FIG. 12 is a diagram illustrating the configuration of a PDCCH and allocation of PUCCH resources according to the first embodiment.

Next, the configuration of a PDCCH and allocation of PUCCH resources will be described. FIG. 12 is a diagram illustrating the configuration of a PDCCH and allocation of PUCCH resources. A PDCCH is constituted of multiple control channel elements (CCE: Control Channel Element) in a PDCCH region. A CCE is constituted of multiple downlink resource elements (resources each defined by one OFDM symbol and one subcarrier).

The CCEs in the PDCCH region are given numbers $n_{CCE}$ for identifying the CCEs. Numbering of CCEs is performed on the basis of prescribed rules. A PDCCH is constituted of a set of multiple CCEs (CCE aggregation). The number of CCEs included in this set is referred to as a "CCE aggregation level". The CCE aggregation level configuring a PDCCH is configured by the base station 101 in accordance with the coding rate configured in the PDCCH and the number of bits of DCI (Downlink Control Information) (control information transmitted in a PDCCH or an E-PDCCH) included in the PDCCH. Note that a combination of CCE aggregation levels that may be used for the terminal is determined in advance. In addition, a set of n CCEs is referred to as the "CCE aggregation level n".

One REG (RE Group) is constituted of four REs contiguous in the frequency domain. Further, one CCE is constituted of nine different REGs dispersed in the frequency domain and the time domain within a PDCCH region. Specifically, for the entire downlink CC, interleaving is performed in units of REGs by using a block interleaver for all numbered REGs, and nine interleaved REGs with successive numbers constitute one CCE.

In each terminal, an SS (search space) that is a region (search region) where a PDCCH is searched for is configured. An SS is constituted of multiple CCEs. CCEs are numbered in advance, and multiple CCEs with successive numbers constitute an SS. The number of CCEs constituting a certain SS is determined in advance. An SS at each CCE aggregation level is constituted of a set of multiple PDCCH candidates. SSs are classified into a cell-specific search space CSS where the number of a CCE with the smallest number, among CCEs constituting each SS, is common in a cell, and a UE-specific search space (UE-specific SS) where the number of a CCE with the smallest number is specific to a terminal. In a CCS, a PDCCH where control information read by multiple terminals 102, such as system information or information regarding paging, is allocated (included), or a PDCCH where a downlink/uplink grant indicating falling back to a lower transmission scheme or random access is allocated (included) can be arranged.

The base station 101 transmits a PDCCH using one or more CCEs in an SS configured by the terminal 102. The terminal 102 decodes a reception signal using the one or more CCEs in the SS, and performs processing to detect a PDCCH addressed to the terminal 102. As has been described above, this processing is referred to as blind decoding. The terminal 102 configures a different SS for each CCE aggregation level. Thereafter, the terminal 102 performs blind decoding using a prescribed combination of CCEs in an SS that is different for each CCE aggregation level. In other words, the terminal 102 performs blind decoding on each PDCCH candidate in an SS that is different for each CCE aggregation level. This series of processes performed by the terminal 102 is referred to as PDCCH monitoring.

In response to detection of a downlink grant (one type of DCI format) in a PDCCH region, the terminal 102 reports HARQ response information of downlink transmit data (PDSCH) corresponding to the downlink grant using a PUCCH resource in accordance with the CCE number of a CCE with the lowest CCE index, among CCEs constructing a PDCCH including the downlink grant. In contrast, when arranging a PDCCH including a downlink grant, the base station 101 arranges a PDCCH in a CCE corresponding to a PUCCH resource with which HARQ response information of downlink transmit data (PDSCH) corresponding to the downlink grant is reported by the terminal 102. In addition, the base station 101 receives HARQ response information corresponding to the PDSCH transmitted to the terminal 102 via the PUCCH which it scheduled. More specifically, as illustrated in FIG. 12, a PUCCH resource with an index $n\text{-}p_{PUCCH}$ that is equal to a value obtained by adding $N_1$, which is a cell-specific parameter, to the CCE number $n_{CCE}$ of the first CCE among CCEs constituting a PDCCH including a downlink grant is a PUCCH resource allocated to HARQ response information of downlink transmit data corresponding to the downlink grant.

In addition, for example, there may be a case in which multiple PUCCH resources are necessary for one PDCCH, as in the case where there are two or more HARQ response information since downlink transmit data corresponding to a downlink grant includes two or more codewords, or the case where diversity transmission of one response information is performed using multiple PUCCH resources. At this time, among CCEs constructing a PDCCH including a downlink grant, in addition to a PUCCH resource corresponding to the CCE value of a CCE with the lowest CCE index, a PUCCH resource with an index that is greater than that of the earlier-mentioned PUCCH resource by one is used. More specifically, as illustrated in FIG. 12, a PUCCH resource with an index $n^1_{PUCCH}$ that is equal to a value obtained by adding $N_1$, which is a cell-specific parameter, to the CCE number $n_{CCE}$ of the first CCE among CCEs constituting a PDCCH including a downlink grant, and a PUCCH resource with an index $n^1_{PUCCH}$ that is equal to a value obtained by adding 1 and $N_1$, which is a cell-specific parameter, to the CCE number $n_{CCE}$ of the first CCE, are PUCCH resources allocated to HARQ response information of downlink transmit data corresponding to the downlink grant. If multiple PUCCH resources are necessary, similarly, it is only necessary to use PUCCH resources, each having an index that is greater by one.

Figure 13:
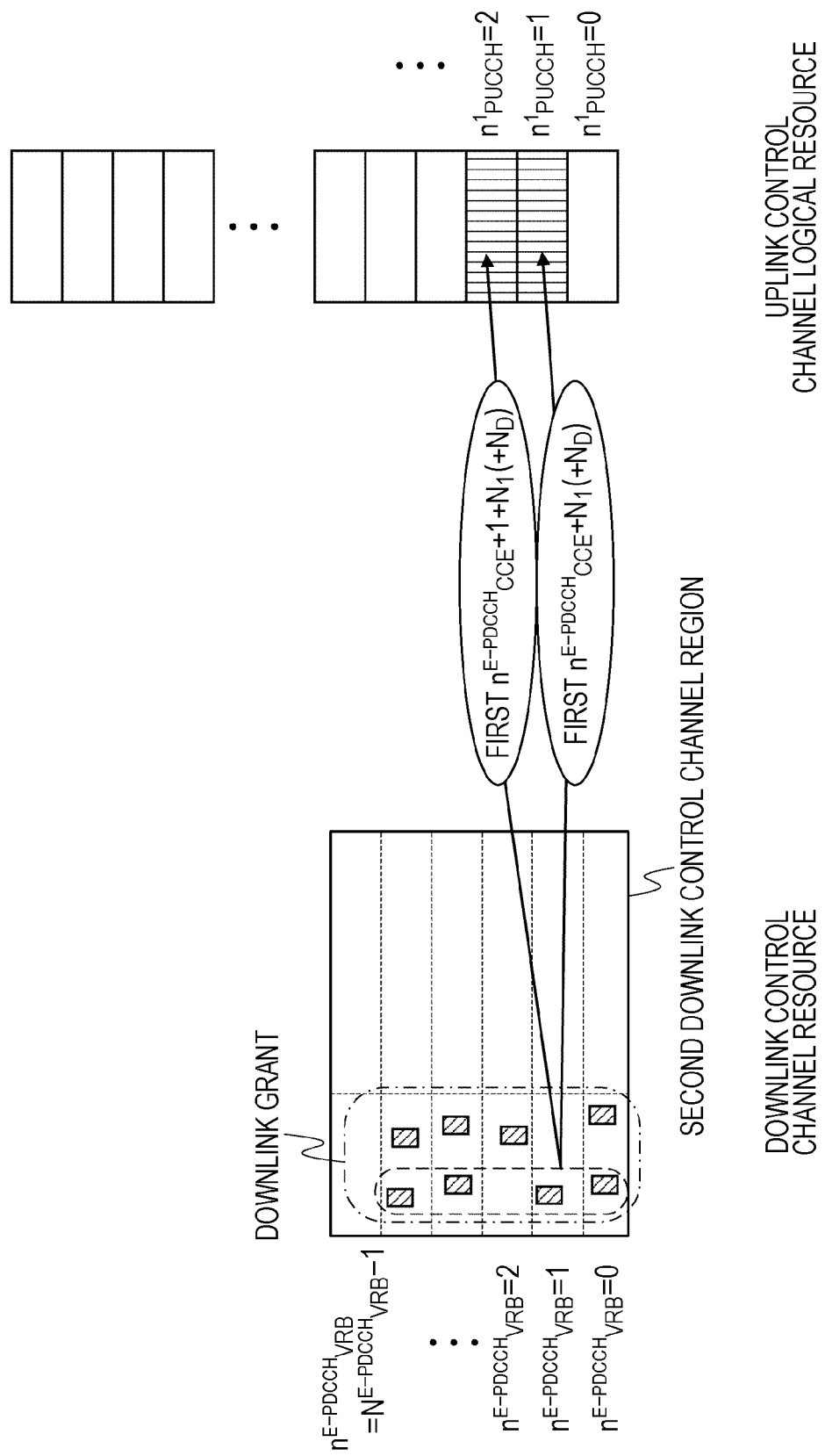
FIG. 13 is a diagram illustrating the configuration of an E-PDCCH and allocation of the PUCCH resources according to the first embodiment.

Next, the configuration of an E-PDCCH and allocation of PUCCH resources will be described. FIG. 13 is a diagram illustrating the configuration of an E-PDCCH and allocation of PUCCH resources. Note that an E-PDCCH illustrated in FIG. 13 illustrates the configuration of an E-PDCCH and allocation of PUCCH resources in the case where cross interleaving (interleaving in which individual elements constituting an E-PDCCH are arranged over multiple RBs; may also be referred to as block interleaving) is adopted. An E-PDCCH is constituted of multiple CCEs in an E-PDCCH region. Specifically, as with the case of a PDCCH, one REG is constituted of four contiguous REs in the frequency domain. Further, one CCE is constituted of nine different REGs dispersed in the frequency domain and the time domain in the E-PDCCH region. In the E-PDCCH region, individual E-PDCCHs are arranged in a first slot and a second slot.

The CCEs in the E-PDCCH region are given numbers $n^{E\text{-}PDCCH}_{CCE}$ for identifying the CCEs. In addition, regarding the CCEs in the E-PDCCH region, CCEs are separately arranged in the first slot and the second slot, and numbers for identifying the CCEs are also separately given. Here, the case in which $n^{E\text{-}PDCCH}_{CCE}$ is configured independent of $n_{CCE}$ will be described. That is, some of the values of $n^{E\text{-}PDCCH}_{CCE}$ overlap values that $n_{CCE}$ may take.

In response to detection of a downlink grant in an E-PDCCH region, the terminal 102 reports HARQ response information of downlink transmit data (PDSCH) corresponding to the downlink grant using a PUCCH resource in accordance with the CCE number of a CCE with the lowest CCE index, among CCEs constructing an E-PDCCH including the downlink grant. When arranging an E-PDCCH including a downlink grant, the base station 101 arranges an E-PDCCH in CCEs corresponding to a PUCCH resource with which HARQ response information of downlink transmit data (PDSCH) corresponding to the downlink grant is reported by the terminal 102. In addition, the base station 101 receives HARQ response information corresponding to the PDSCH transmitted to the terminal 102 via the PUCCH which it scheduled. More specifically, as illustrated in FIG. 13, a PUCCH resource with an index $n^1_{PUCCH}$ that is equal to a value obtained by adding $N_1$, which is a cell-specific parameter, (and/or $N_D$, which is a UE-specific parameter), to the CCE number $n^{E\text{-}PDCCH}_{CCE}$ of the first CCE among CCEs constituting an E-PDCCH including a downlink grant is a PUCCH resource allocated to HARQ response information of downlink transmit data corresponding to the downlink grant. Here, as has been described earlier, since the CCE number $n^{E\text{-}PDCCH}_{CCE}$ of each CCE in an E-PDCCH region and the CCE number $n_{CCE}$ of each CCE in a PDCCH region are separately numbered, when arranging one or more PDCCHs and one or more E-PDCCHs in the same subframe, the base station 101 performs scheduling that arranges the downlink grant in CCEs so that the CCE number $n_{CCE}$ of the first CCE of each PDCCH and the CCE number $n^{E\text{-}PDCCH}_{CCE}$ of the first CCE of each E-PDCCH all become different numbers.

In addition, in the case where multiple PUCCH resources are necessary for one E-PDCCH, in addition to a PUCCH resource in accordance with the CCE number of a CCE with the lowest CCE index, among CCEs constructing an E-PDCCH including a downlink grant, a PUCCH resource with an index that is greater than that of the earlier-mentioned PUCCH resource by one is used. More specifically, as illustrated in FIG. 13, a PUCCH resource with an index $n^1_{PUCCH}$ that is equal to a value obtained by adding $N_1$, which is a cell-specific parameter (and/or $N_D$, which is a UE-specific parameter), to the CCE number $n^{E\text{-}PUCCH}_{CCE}$ of the first CCE among CCEs constituting an E-PDCCH including a downlink grant, and a PUCCH resource with an index $n^{E\text{-}PDCCH}_{CCE}$ that is equal to a value obtained by adding 1 and $N_1$, which is a cell-specific parameter, to the CCE number $n^{E\text{-}PDCCH}_{CCE}$ of the first CCE, are PUCCH resources allocated to HARQ response information of downlink transmit data corresponding to the downlink grant. If multiple PUCCH resources are necessary, similarly, it is only necessary to use PUCCH resources, each having an index that is greater by one. At this time, when arranging one or more PDCCHs and one or more E-PDCCHs in the same subframe, the base station 101 performs scheduling that arranges the downlink grant in CCEs so that the CCE number $n_{CCE}$ of the first CCE and the CCE number $n^{E\text{-}PDCCH}_{CCE}$ of the next greater CCE of each PDCCH and the CCE number $n^{E\text{-}PDCCH}_{CCE}$ of the first CCE and the CCE number $n^{E\text{-}PDCCH}_{CCE}$ of the next greater CCE of each E-PDCCH all become different numbers.

Figure 14:
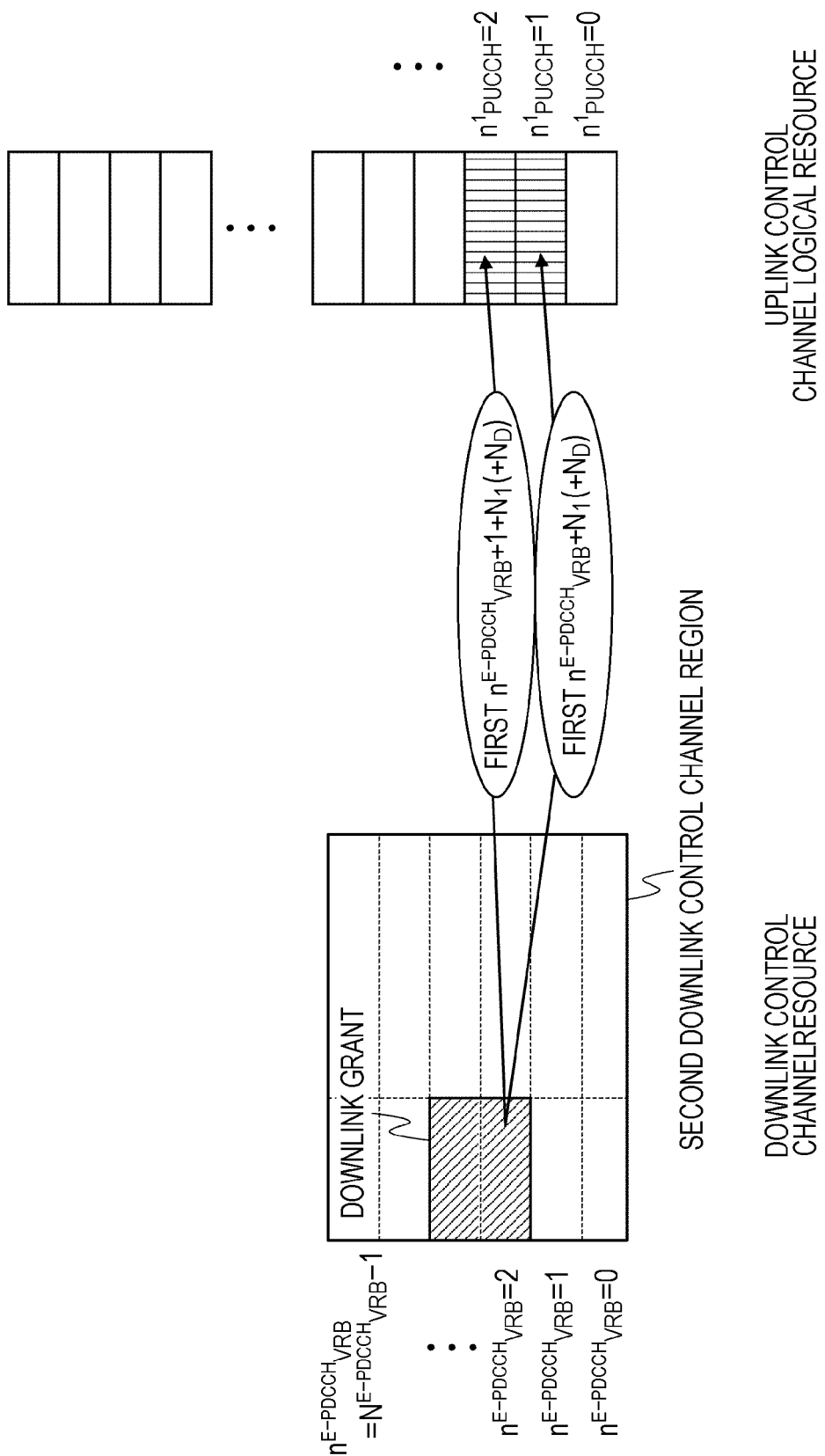
FIG. 14 is a diagram illustrating the configuration of the E-PDCCH and allocation of the PUCCH resources according to the first embodiment.

Next, another example of the configuration of an E-PDCCH and allocation of PUCCH resources will be described. FIG. 14 is a diagram illustrating the configuration of an E-PDCCH and allocation of PUCCH resources. Note that an E-PDCCH illustrated in FIG. 14 illustrates the configuration of an E-PDCCH and allocation of PUCCH resources in the case where cross interleaving is not adopted. Specifically, unlike a PDCCH, an E-PDCCH is in units of VRBs, not in units of CCEs, and is constituted as a set of one or more contiguous VRBs. The number of VRBs constituting this set is referred to as a "VRB aggregation level". That is, in an E-PDCCH region where cross interleaving is not adopted, an SS is constituted of multiple VRBs. The VRB aggregation level configuring an E-PDCCH is configured by the base station 101 in accordance with the coding rate configured in the E-PDCCH and the number of bits of DCI format included in the E-PDCCH. Note that a combination of VRB aggregation levels that may be used for the terminal 102 is determined in advance, and the terminal 102 performs blind decoding using a prescribed combination of VRBs in an SS. In the E-PDCCH region, individual E-PDCCHs are arranged in a first slot and a second slot.

The VRBs in the E-PDCCH region are given numbers $n^{E-PDCCH}_{VRB}$ for identifying the VRBs. Regarding the VRBs in the E-PDCCH region, VRBs constituting the E-PDCCH are separately arranged in the first slot and the second slot, and numbers for identifying the VRBs are also separately given. Here, the case in which $n^{E-PDCCH}_{VRB}$ is configured independent of $n_{CCE}$ will be described. That is, some of the values of $n^{E-PDCCH}_{VRB}$ overlap values that $n_{CCE}$ may take.

In response to detection of a downlink grant in an E-PDCCH region, the terminal 102 reports HARQ response information of downlink transmit data (PDSCH) corresponding to the downlink grant using a PUCCH resource in accordance with the VRB number of a VRB with the lowest VRB index, among VRBs constructing an E-PDCCH including the downlink grant. In contrast, when arranging an E-PDCCH including a downlink grant, the base station 101 arranges an E-PDCCH in VRBs corresponding to a PUCCH resource with which HARQ response information of downlink transmit data (PDSCH) corresponding to the downlink grant is reported by the terminal 102. In addition, the base station 101 receives HARQ response information corresponding to the PDSCH transmitted to the terminal 102 via the PUCCH which it scheduled. More specifically, as illustrated in FIG. 14, a PUCCH resource with an index $n_{PUCCH}$ that is equal to a value obtained by adding $N_1$, which is a cell-specific parameter, (and/or $N_D$, which is a UE-specific parameter), to the VRB number $n^{E-PDCCH}_{VRB}$ of the first VRB among VRBs constituting an E-PDCCH including a downlink grant, is a PUCCH resource allocated to HARQ response information of downlink transmit data corresponding to the downlink grant. Here, as has been described earlier, since the VRB number $n^{E-PDCCH}_{VRB}$ of each VRB in an E-PDCCH region and the CCE number $n_{CCE}$ of each CCE in a PDCCH region are separately numbered, when arranging one or more PDCCHs and one or more E-PDCCHs in the same subframe or when arranging two or more E-PDCCHs in the same subframe, the base station 101 performs scheduling that arranges the downlink grant in CCEs or VRBs so that the CCE number $n_{CCE}$ or $n^{E-PDCCH}_{CCE}$ of the first CCE of each PDCCH or E-PDCCH and the VRB number $nn^{E-PDCCH}_{VRB}$ of the first VRB of each E-PDCCH all become different numbers.

In addition, in the case where multiple PUCCH resources are necessary for one E-PDCCH, in addition to a PUCCH resource in accordance with the VRB number of a VRB with the lowest VRB index, among VRBs constructing an E-PDCCH including a downlink grant, a PUCCH resource with an index that is greater than that of the earlier-mentioned PUCCH resource by one is used. More specifically, as illustrated in FIG. 14, a PUCCH resource with an index $n^1_{PUCCH}$ that is equal to a value obtained by adding $N_1$, which is a cell-specific parameter, (and/or $N_D$, which is a UE-specific parameter), to the VRB number $n^{E-PDCCH}_{VRB}$ of the first VRB among VRBs constituting an E-PDCCH including a downlink grant, and a PUCCH resource with an index $n^1_{PUCCH}$ that is equal to a value obtained by adding 1 and $N_1$, which is a cell-specific parameter, to the VRB number $n^{E-PDCCH}_{VRB}$ of the first VRB, are PUCCH resources allocated to HARQ response information of downlink transmit data corresponding to the downlink grant. If multiple PUCCH resources are necessary, similarly, it is only necessary to use PUCCH resources, each having an index that is greater by one.

Figure 15:
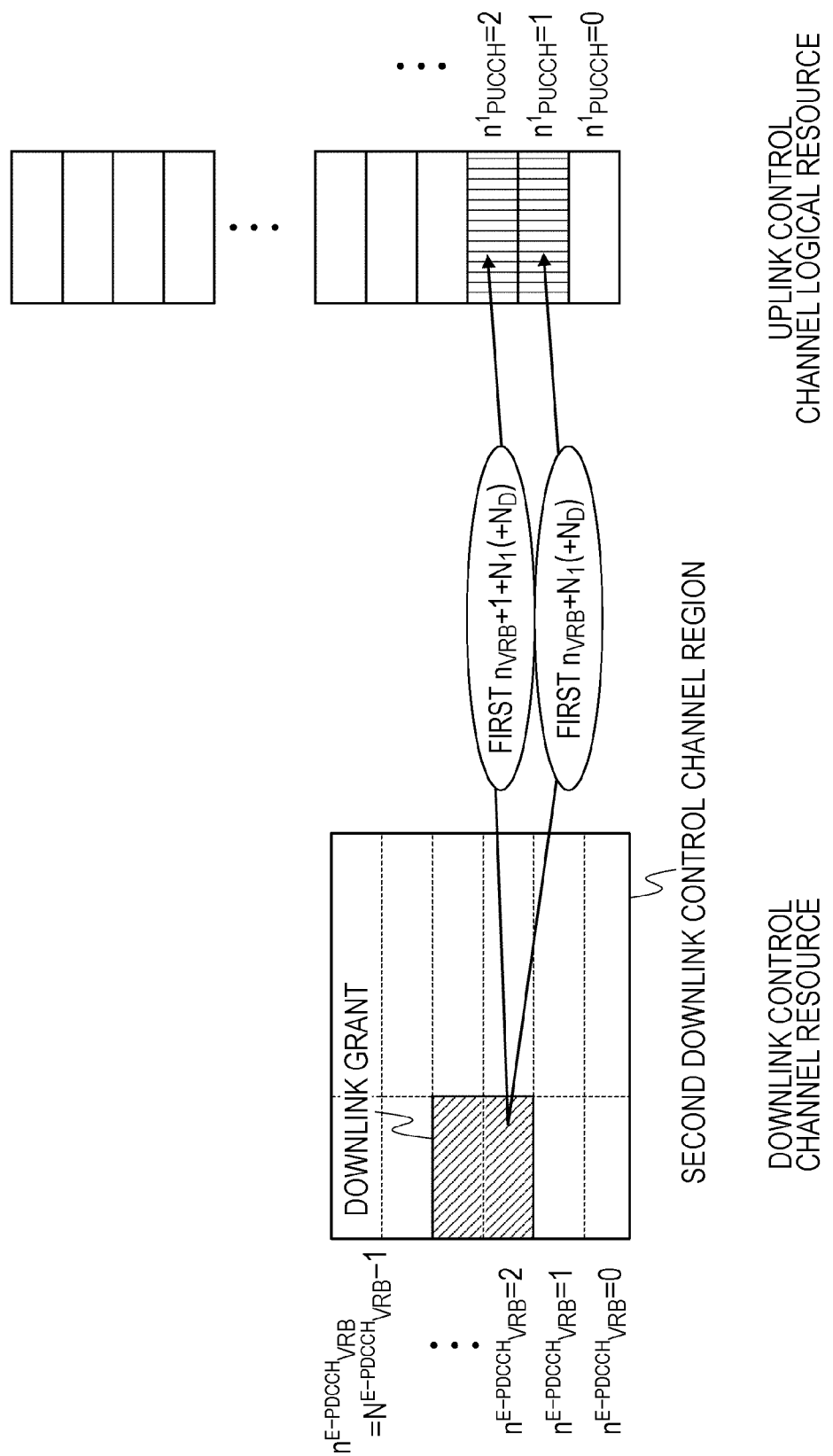
FIG. 15 is a diagram illustrating the configuration of the E-PDCCH and allocation of the PUCCH resources according to the first embodiment.

Note that, although the case in which $n^{E-PDCCH}_{VRB}$ is given again for renumbering in order from 0 has been described in FIG. 14, $n^{E-PDCCH}_{VRB}$ may be $n_{VRB}$ originally given to VRBs. Alternatively, when VRB aggregation is subjected to blind decoding, $n^{E-PDCCH}_{VRB}$ which is given again for renumbering may be used, and, in association with a PUCCH resource, $n_{VRB}$ may be used, as illustrated in FIG. 15. Mapping from an E-PDCCH resource to a PUCCH resource can be performed simply by replacing $n^{E-PDCCH}_{VRB}$ with $n_{VRB}$, and the same mapping method as that described using FIG. 14 can be used.

In the foregoing description, a mapping method has been described in which, as mapping from a PDCCH resource or an E-PDCCH resource to a PUCCH resource, a PUCCH resource is uniquely determined on the basis of a configuration parameter in an E-PDCCH region, a dynamic PDCCH resource or E-PDCCH resource, and a cell-specific parameter (and/or a UE-specific parameter).

Next, a method of using a PUCCH resource in the case where a PDSCH is allocated in multiple cells will be described. FIG. 16 is a table representing the relationship between response information and a PUCCH resource in the case where a PDSCH to which one TB is mapped is transmitted in each of two cells.

The base station 101 transmits one TB in each of a cell 0 and a cell 1 in the same downlink subframe to the terminal 102. Here, the cell 0 and the cell 1 are a PCell and an SCell, respectively. A PUCCH resource 0 is a PUCCH resource corresponding to a PDCCH or an E-PDCCH associated with a PDSCH in the cell 0. In addition, a PUCCH resource 1 is a PUCCH resource corresponding to a PDCCH or an E-PDCCH related to a PDSCH in the cell 1. Note that the TB transmitted via the cell 0 may be the TB 104-1, and a control channel related to the TB 104-1 may be the PDCCH or E-PDCCH 103-1; and the TB transmitted via the cell 1 may be the TB 104-2, and a control channel related to the TB 104-2 may be the E-PDCCH 103-2. In contrast, the TB transmitted via the cell 1 may be the TB 104-1, and a control channel related to the TB 104-1 may be the PDCCH or E-PDCCH 103-1; and the TB transmitted via the cell 0 may be the TB 104-2, and a control channel related to the TB 104-2 may be the E-PDCCH 103-2. In addition, correspondence from a PDCCH or an E-PDCCH to a PUCCH resource is the above-described correspondence. In one PUCCH resource, 2-bit information is transmitted by QPSK modulation.

An Ack indicates that detection of a TB has been successful as a result of decoding a PDSCH, and a Nack indicates that detection of a TB has been a failure (unsuccessful) as a result of decoding a PDSCH. In addition, a DTX indicates that the terminal has recognized that there has been no transmission of a PDSCH. That is, a DTX indicates that a PDCCH related to a PDSCH has not been detected, and/or a PDSCH has not been decoded.

The terminal 102 selects one PUCCH resource from the PUCCH resource 0 and the PUCCH resource 1 as described below, and transmits 2-bit information (uplink control information) using the selected PUCCH resource.

(1) When HARQ response information in the PDSCH in the cell 0 is an Ack and HARQ response information in the PDSCH in the cell 1 is an Ack, the terminal 102 selects the PUCCH resource 1, and reports the bit sequence (1, 1) using the selected PUCCH resource 1.

(2) When HARQ response information in the PDSCH in the cell 0 is an Ack and HARQ response information in the PDSCH in the cell 1 is a Nack or a DTX, the terminal 102 selects the PUCCH resource 0, and reports the bit sequence (1, 1) using the selected PUCCH resource 0.

(3) When HARQ response information in the PDSCH in the cell 0 is a Nack or a DTX and HARQ response information in the PDSCH in the cell 1 is an Ack, the terminal 102 selects the PUCCH resource 1, and reports the bit sequence (0, 0) using the selected PUCCH resource 1.

(4) When HARQ response information in the PDSCH in the cell 0 is a Nack and HARQ response information in the PDSCH in the cell 1 is a Nack or a DTX, the terminal 102 selects the PUCCH resource 0, and reports the bit sequence (0, 0) using the selected PUCCH resource 1.

(5) When HARQ response information in the PDSCH in the cell 0 is a DTX and HARQ response information in the PDSCH in the cell 1 is a Nack or a DTX, the terminal 102 transmits nothing in either of the PUCCH resources.

Meanwhile, the base station 101 monitors both of the PUCCH resources, namely, the PUCCH resource 0 and the PUCCH resource 1, as described below, and extracts (determines, recognizes) HARQ response information.

(1) When the bit sequence (1, 1) is detected in the PUCCH resource 1 (nothing is detected in the PUCCH resource 0), the base station 101 recognizes that HARQ response information in the PDSCH in the cell 0 is an Ack, and HARQ response information in the PDSCH in the cell 1 is an Ack.

(2) When the bit sequence (1, 1) is detected in the PUCCH resource 0 (nothing is detected in the PUCCH resource 1), the base station 101 recognizes that HARQ response information in the PDSCH in the cell 0 is an Ack, and HARQ response information in the PDSCH in the cell 1 is a Nack or a DTX.

(3) When the bit sequence (0, 0) is detected in the PUCCH resource 1 (nothing is detected in the PUCCH resource 0), the base station 101 recognizes that HARQ response information in the PDSCH in the cell 0 is a Nack or a DTX, and HARQ response information in the PDSCH in the cell 1 is an Ack.

(4) When the bit sequence (0, 0) is detected in the PUCCH resource 0 (nothing is detected in the PUCCH resource 0), the base station 101 recognizes that HARQ response information in the PDSCH in the cell 0 is a Nack, and HARQ response information in the PDSCH in the cell 1 is a Nack or a DTX.

(5) When nothing is detected in either of the PUCCH resource 0 and the PUCCH resource 1, the base station 101 recognizes that HARQ response information in the PDSCH in the cell 0 is a DTX, and HARQ response information in the PDSCH in the cell 1 is a Nack or a DTX.

In this manner, the terminal 102 selects one PUCCH resource 105 from a PUCCH resource corresponding to the PDCCH or E-PDCCH 103-1 and a PUCCH resource corresponding to the E-PDCCH 103-1, and reports uplink control information via the selected PUCCH resource 105. In addition, the base station 101 monitors both of the PUCCH resources, namely, the PUCCH resource corresponding to the PDCCH or E-PDCCH 103-1 and the PUCCH resource corresponding to the E-PDCCH 103-1, and extracts HARQ response information in accordance with determination in which of the PUCCH resources uplink control information has been detected. Accordingly, the transmission power of the terminal 102 can be suppressed. In addition, the peak power value of an uplink signal can be reduced. Therefore, the circuit configuration in the terminal 102 and the base station 101 can be simplified.

FIG. 17 is a table representing the relationship between response information and a PUCCH resource in the case where a PDSCH to which one TB is mapped is transmitted in a cell, and a PDSCH to which two TBs are mapped is transmitted in another cell. The base station 101 transmits two TBs via the cell 0 and one TB via the cell 1 in the same downlink subframe to the terminal 102. Here, the cell 0 and the cell 1 may be a PCell and an SCell, respectively, or may be an SCell and a PCell, respectively. Compared with the table in FIG. 16, the table in FIG. 17 has the number of TBs enhanced to three. However, the manner of correspondence of HARQ response information, a selected PUCCH resource, and a bit sequence mapped to the selected PUCCH is the same as or similar to that in FIG. 16. In addition, although the case in which the number of TBs is three at maximum has been described here, similar enhancement can be performed in the case where the number of TBs is four or greater.

Figure 18:
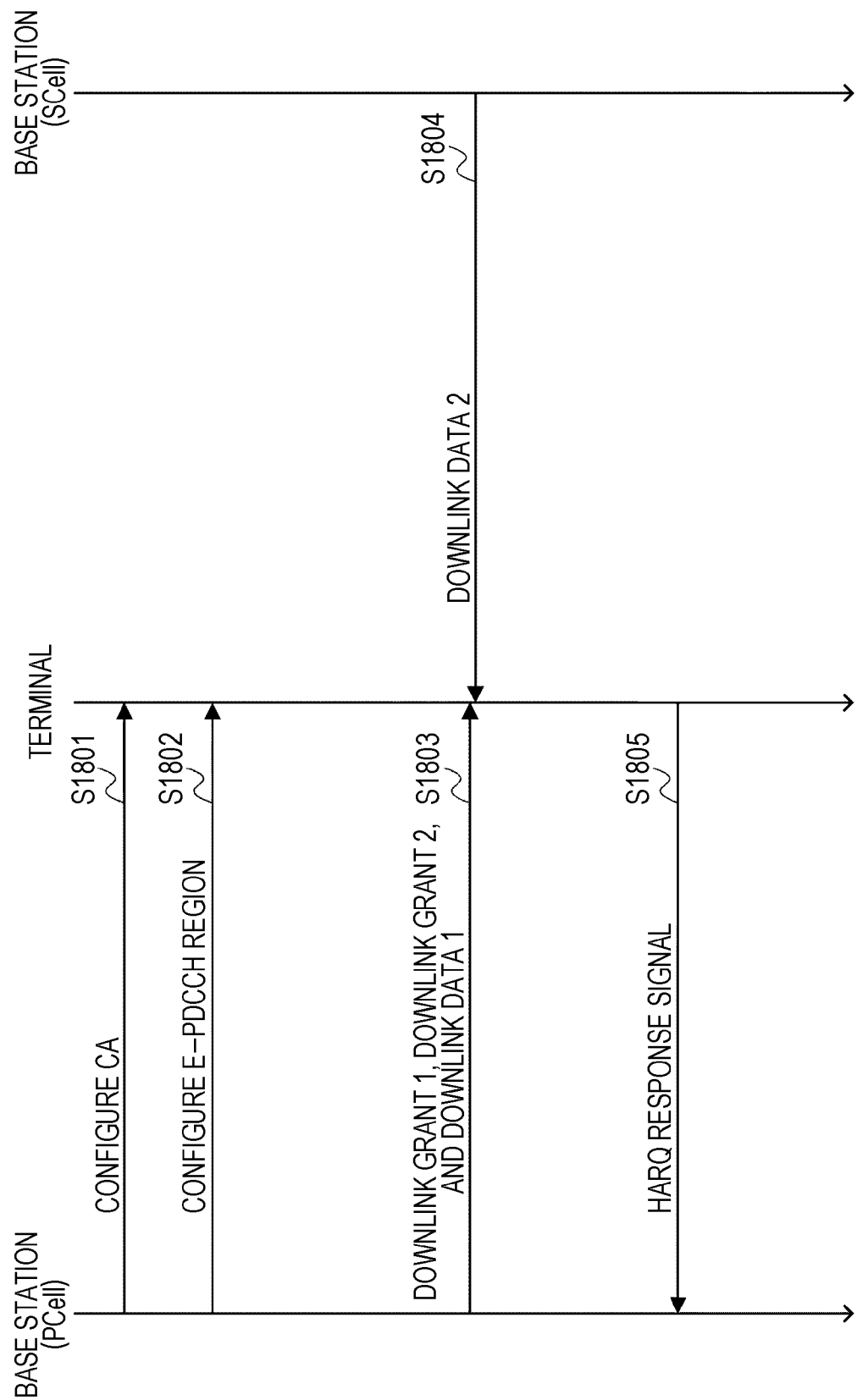
FIG. 18 is a sequence diagram illustrating an example of a procedure of reporting HARQ response information according to the first embodiment.

FIG. 18 is a sequence diagram illustrating an example of a procedure of reporting HARQ response information. At first, the base station 101 notifies the terminal 102 of control information that indicates (configures and reports) a CA by using RRC signaling, and the terminal 102 configures the CA on the basis of the control information (step S1801).

Next, the base station 101 delivers control information that indicates (configures and reports) an E-PDCCH to the terminal 102 by using RRC signaling, and the terminal 102 configures the E-PDCCH on the basis of the control information (step S1802). As a method of specifying an E-PDCCH region, as has been described earlier, the method of specifying some or all of RBs in a frequency band is used. Alternatively, in conjunction with this method, some subframes in the time domain can be specified as subframes where an E-PDCCH may be arranged. For example, a method of specifying the cycle of a subframe and an offset value from a reference subframe can be used. Alternatively, for each of subframes in a wireless frame (ten subframes) or multiple wireless frames, whether an E-PDCCH may be arranged can be represented in a bitmap format.

Note that, although an example in which the base station 101 configures an E-PDCCH region after configuring a CA has been indicated here, the procedure is not limited to this example. For example, the base station 101 may configure a CA after configuring an E-PDCCH region, or the base station 101 may configure a CA and an E-PDCCH region at the same time.

Next, the base station 101 transmits to the terminal 102 a downlink grant 1 and a downlink grant 2 using a PDCCH or an E-PDCCH in the PCell, and transmits downlink transmit data 1 corresponding to the downlink grant 1 using a PDSCH in the PCell, and the terminal 102 receives the downlink grant 1, the downlink grant 2, and the downlink transmit data 1 (step S1803). In addition, in the same subframe, the base station 101 transmits downlink transmit data 2 corresponding to the downlink grant 2 to the terminal 102 using a PDSCH in the Cell. In the same subframe, the terminal 102 receives the downlink transmit data 2 (step S1804). In addition, the terminal 102, which has received the downlink transmit data 1 and the downlink transmit data 2, generates HARQ response information in response to each of the downlink transmit data 1 and the downlink transmit data 2.

Finally, in accordance with the HARQ response information in response to the downlink transmit data 1 and the HARQ response information in response to the downlink transmit data 2, the terminal 102 selects one PUCCH resource from a PUCCH resource determined on the basis of resource information of the downlink grant 1 and a PUCCH resource determined on the basis of resource information of the downlink grant 2, and reports control information indicating the HARQ response information in response to the downlink transmit data 1 and the HARQ response information in response to the downlink transmit data 2 by using the selected PUCCH resource (step S1805).

Figure 19:
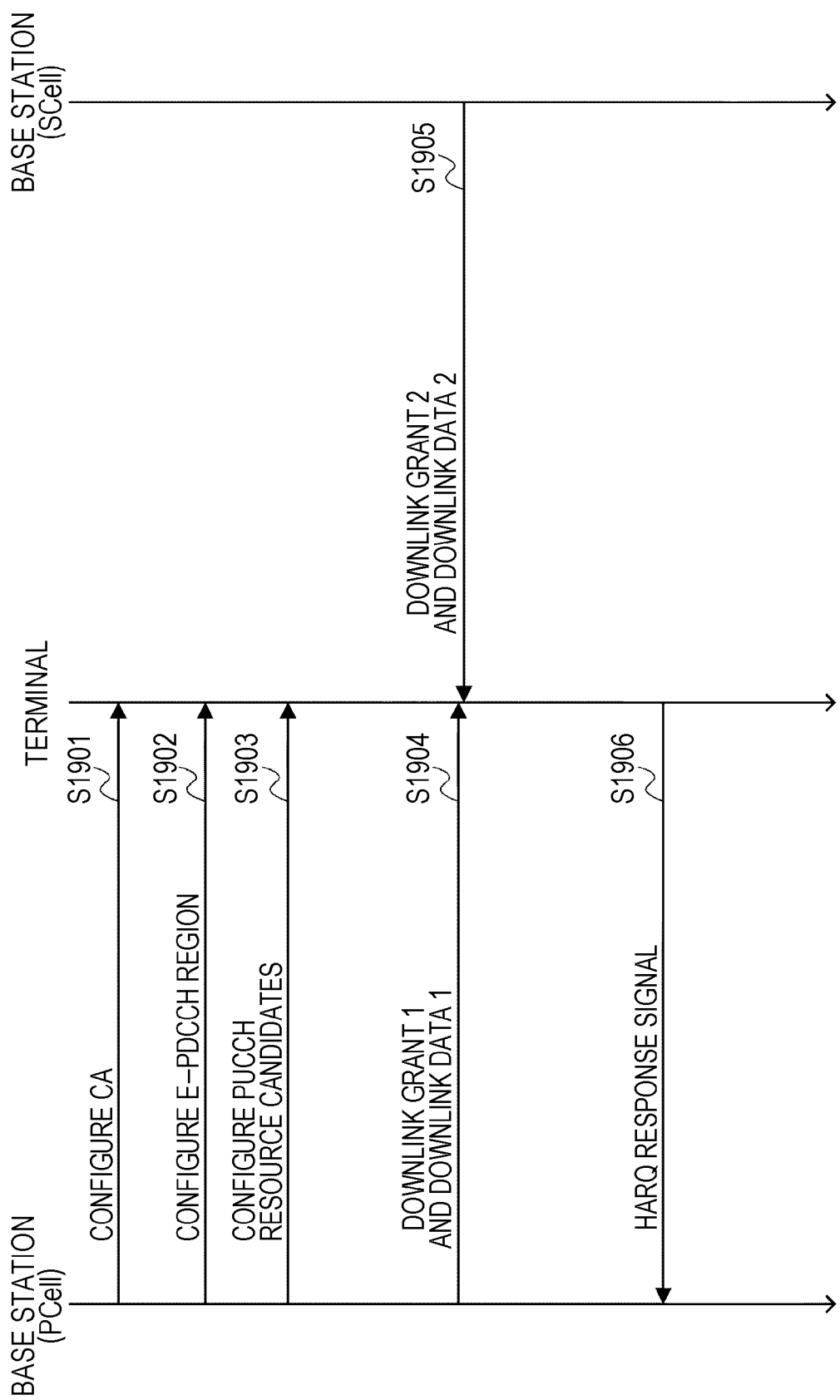
FIG. 19 is a sequence diagram illustrating another example of the procedure of reporting HARQ response information according to the first embodiment.

FIG. 19 is a sequence diagram illustrating another example of the procedure of reporting HARQ response information. At first, the base station 101 delivers control information that indicates (configures and reports) a CA to the terminal 102 by using RRC signaling, and the terminal 102 configures the CA on the basis of the control information (step S1901).

Next, the base station 101 delivers control information that indicates (configures and reports) an E-PDCCH to the terminal 102 by using RRC signaling, and the terminal 102 configures the E-PDCCH on the basis of the control information (step S1902).

In addition, the base station 101 delivers control information that indicates (configures and reports) candidates for a PUCCH resource (PUCCH resource candidates) to the terminal 102 by using RRC signaling, and the terminal 102 configures the PUCCH resource candidates on the basis of the control information (step S1903). Here, PUCCH resource candidates to be configured are a combination of multiple PUCCH resources. FIG. 20 illustrates an example of the configuration of PUCCH resource candidates. FIG. 20 illustrates PUCCH resource candidates including four PUCCH resources. Each of A, B, C, and D, which are values ($n^1_{PUCCH,RRC}$) configured corresponding to four indices, namely, index 0 to index 3, is a number ($n^1_{puccH}$) indicating a PUCCH resource. These A, B, C, and D are configured using RRC signaling. Note that, although the case in which a number indicating one PUCCH resource corresponds to index 0 to index 3 has been described here, a number indicating one set of PUCCH resources (multiple PUCCH resource numbers) may correspond to index 0 to index 3.

Note that, although an example in which the base station 101 configures an E-PDCCH region and PUCCH resource candidates after configuring a CA has been indicated here, the procedure is not limited to this example. For example, the base station 101 may configure a CA after configuring an E-PDCCH region and PUCCH resource candidates, or the base station 101 may configure a CA, an E-PDCCH region, and PUCCH resource candidates at the same time.

Next, the base station 101 transmits to the terminal 102 a downlink grant 1 using a PDCCH or an E-PDCCH in the PCell, and transmits downlink transmit data 1 corresponding to the downlink grant 1 using a PDSCH in the PCell, and the terminal 102 receives the downlink grant 1 and the downlink transmit data 1 (step S1904). In addition, in the same subframe, the base station 101 transmits to the terminal 102 a downlink grant 2 using a PDCCH or an E-PDCCH in the SCell, and transmits downlink transmit data 2 corresponding to the downlink grant 2 using a PDSCH in the SCell. In the same subframe, the terminal 102 receives the downlink grant 2 and the downlink transmit data 2 (step S1905). In addition, the terminal 102, which has received the downlink transmit data 1 and the downlink transmit data 2, generates HARQ response information in response to each of the downlink transmit data 1 and the downlink transmit data 2.

Here, in the case where the downlink grant 2 is transmitted in the PDCCH in the SCell, the base station 101 specifies one PUCCH resource among the PUCCH resource candidates by using a bit sequence indicated by a certain field (such as a TPC (Transmission Power Control) field (TPC field)) in the downlink grant 2. In the case where the downlink grant 2 has been received in the PDCCH in the SCell, the terminal 102 configures one PUCCH resource among the PUCCH resource candidates in accordance with a bit sequence indicated by a certain field (such as a TPC field) in the downlink grant 2. More specifically, the terminal 102 configures a corresponding PUCCH resource (on the same line) in accordance with which one of bit sequences in FIG. 20 the bit sequence in the certain field is. Note that, although the case in which the bit sequence in the certain field specifies one PUCCH has been described here, if uplink control information is reported by simultaneously using multiple PUCCH resources, the bit sequence in the certain field may specify one set of PUCCH resources (multiple PUCCH resources).

In the case where the downlink grant 2 is transmitted/received in the E-PDCCH in the SCell, as with the above-described case, one PUCCH resource among the PUCCH resource candidates, which is specified using a bit sequence indicated by a certain field in the downlink grant 2, may be configured. At this time, the downlink grant 2 transmitted/received in the E-PDCCH may use another field different from the field used to indicate a PUCCH resource in the above-described PDCCH (such as a dedicated field for specifying a PUCCH resource (dedicated field)), or may use the same field as the above-described PDCCH.

Alternatively, in the case where the downlink grant 2 is transmitted/received in the E-PDCCH in the SCell, a PUCCH resource determined on the basis of resource information of the downlink grant 2 may be configured.

Finally, in accordance with the HARQ response information in response to the downlink transmit data 1 and the HARQ response information in response to the downlink transmit data 2, the terminal 102 selects one PUCCH resource from a PUCCH resource determined on the basis of resource information of the downlink grant 1 and a PUCCH resource configured for a PDSCH corresponding to the downlink grant 2, and reports the HARQ response information in response to the downlink transmit data 1 and the HARQ response information in response to the downlink transmit data 2 by using the selected PUCCH resource (step S1906).

As has been described above, in relation to a downlink grant in a PDCCH region or an E-PDCCH region, when transmitting downlink transmit data in the first cell, the base station 101 allocates the downlink grant to a PDCCH resource or an E-PDCCH resource corresponding to an uplink control channel resource used to report HARQ response information corresponding to this downlink transmit data. Preferably, a certain value is added to the index of an element with the smallest index, among elements constructing a PDCCH resource or an E-PDCCH resource. A PUCCH resource with an index equivalent to a value after the addition is a PUCCH resource corresponding to this PDCCH resource or this E-PDCCH resource. In addition, in the same subframe, in relation to a downlink grant in a PDCCH region or an E-PDCCH region, the base station 101 allocates the downlink grant to a PDCCH resource or an E-PDCCH resource corresponding to an uplink control channel resource used to report HARQ response information corresponding to this downlink transmit data. Alternatively, in relation to a downlink grant in a PDCCH region or an E-PDCCH region, when transmitting downlink transmit data in the second cell, the base station 101 specifies one (one set of) uplink control channel resource(s) among uplink control channel resource candidates used to report HARQ response information by using a certain field in this downlink grant. Further, the base station 101 monitors these uplink control channel resources and extracts HARQ response information.

In addition, in the case where the terminal 102 detects a downlink grant in a PDCCH region or an E-PDCCH region, the terminal 102 configures, as a PUCCH resource used to report HARQ response information in response to downlink transmit data in the first cell related to this downlink grant, a PUCCH resource corresponding to a PDCCH resource or an E-PDCCH resource where the downlink grant has been detected. In addition, in the same subframe, in the case where the terminal 102 detects a downlink grant in a PDCCH region or an E-PDCCH region, the terminal 102 configures, as a PUCCH resource used to report HARQ response information in response to downlink transmit data in the second cell related to this downlink grant, a PUCCH resource corresponding to a PDCCH resource or an E-PDCCH resource where the downlink grant has been detected. Alternatively, in the case where the terminal 102 detects a downlink grant in a PDCCH region or an E-PDCCH region, the terminal 102 configures, as a PUCCH resource used to report HARQ response information in response to downlink transmit data in the second cell related to this downlink grant, one (one set of) uplink control channel resource(s) specified using a certain field in this downlink grant.

Further, in accordance with HARQ response information in response to downlink transmit data in the first cell and HARQ response information in response to downlink transmit data in the second cell, the terminal 102 selects one (one set of) PUCCH resource(s) from the configured two (two sets of) PUCCH resources, and reports control information indicating the HARQ response information in response to the downlink transmit data in the first cell and the HARQ response information in response to the downlink transmit data in the second cell by using the selected PUCCH resource(s).

Accordingly, even in the case where a downlink grant is transmitted/received using an E-PDCCH at the time of configuring a CA, an uplink control channel can be dynamically allocated to the terminal. Therefore, it becomes possible to efficiently use an uplink control channel.

(Second Embodiment)

In the first embodiment described above, the case in which an uplink control channel is dynamically allocated to the terminal has been described. Hereinafter, in a second embodiment of the present invention, the case in which an uplink control channel is semi-statically allocated to the terminal will be described. A communication system in this embodiment can use a configuration that is the same as or similar to that of the communication system illustrated in FIG. 1. In addition, the block configurations of the base station 101 and the terminal 102 in this embodiment can use configurations that are the same as or similar to the block configurations illustrated in FIG. 4 and FIG. 5.

Figure 21:
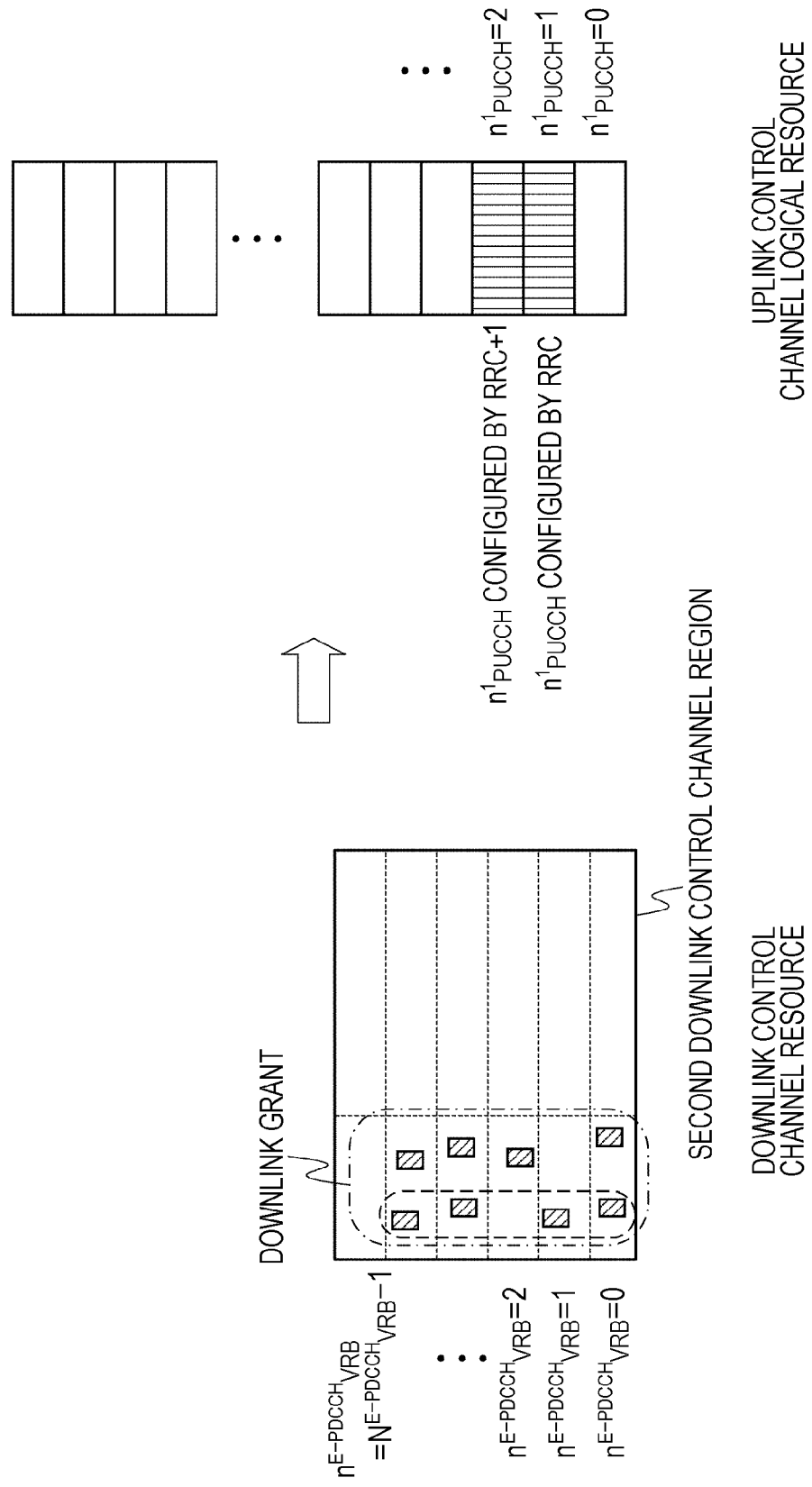
FIG. 21 is a diagram illustrating the configuration of the E-PDCCH and allocation of the PUCCH resources according to a second embodiment of the present invention.

FIG. 21 is a diagram illustrating the configuration of an E-PDCCH and allocation of PUCCH resources. An E-PDCCH illustrated in FIG. 21 illustrates the configuration of an E-PDCCH and allocation of PUCCH resources in the case where cross interleaving is adopted. The configuration of the E-PDCCH is the same as that of FIG. 13. Meanwhile, an index $n^1_{PUCCH}$ indicating a PUCCH resource allocated to HARQ response information of downlink transmit data indicated by detection of this E-PDCCH is configured in advance using RRC signaling. Note that, if multiple PUCCH resources are necessary, it is only necessary to use PUCCH resources, each having an index that is greater than the configured $n^1_{PUCCH}$ by one.

Figure 22:
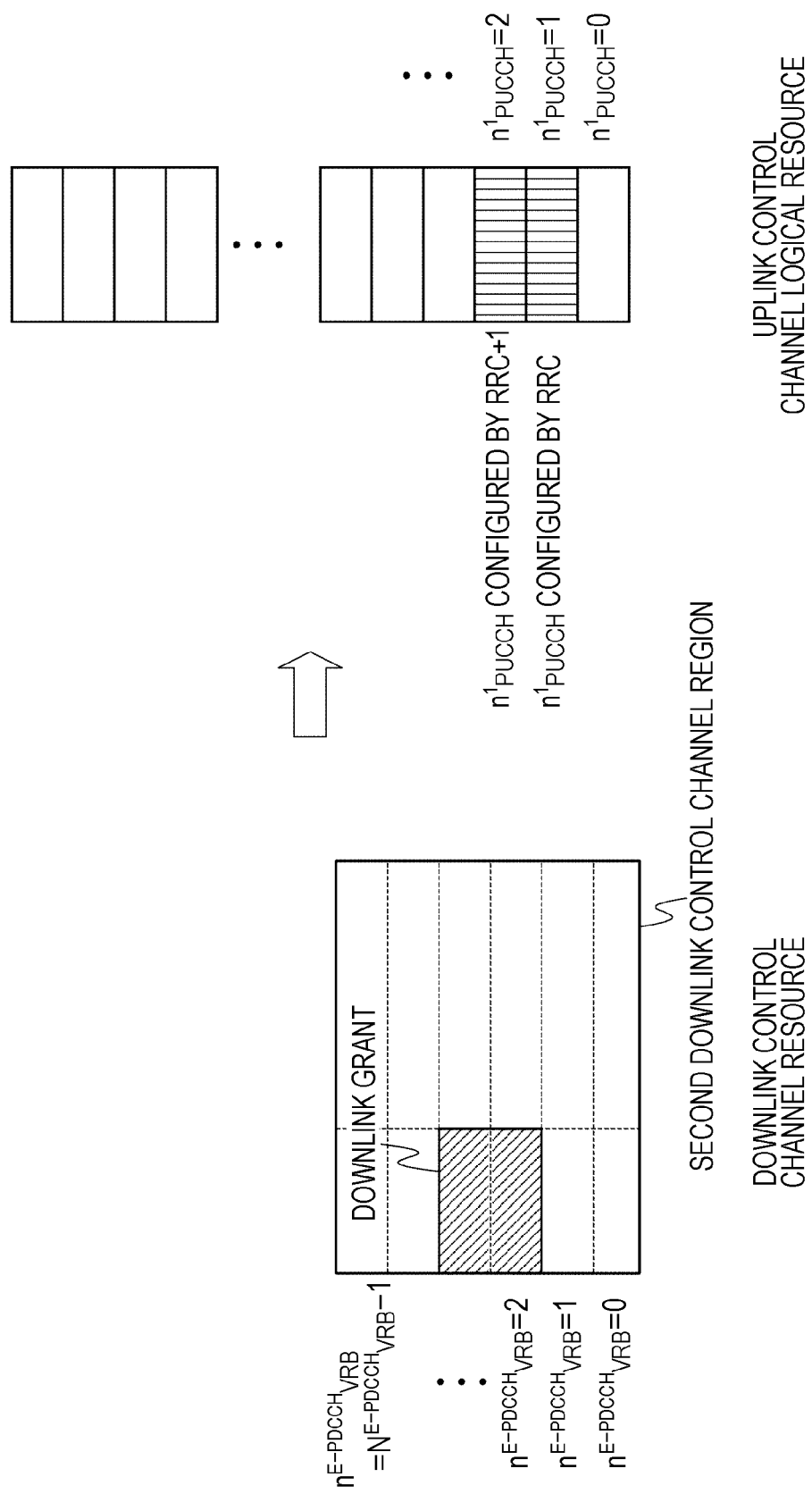
FIG. 22 is a diagram illustrating the configuration of the E-PDCCH and allocation of the PUCCH resources according to the second embodiment.

FIG. 22 is a diagram illustrating another example of the configuration of an E-PDCCH and allocation of PUCCH resources. Note that an E-PDCCH illustrated in FIG. 22 indicates the configuration of an E-PDCCH and allocation of PUCCH resources in the case where cross interleaving is not adopted. The configuration of the E-PDCCH is the same as that of FIG. 14. Meanwhile, an index $n^1_{PUCCH}$ indicating a PUCCH resource allocated to HARQ response information of downlink transmit data indicated by detection of this E-PDCCH is configured in advance using RRC signaling. Note that, if multiple PUCCH resources are necessary, it is only necessary to use PUCCH resources, each having an index that is greater than the configured $n^1_{PUCCH}$ by one.

Figure 23:
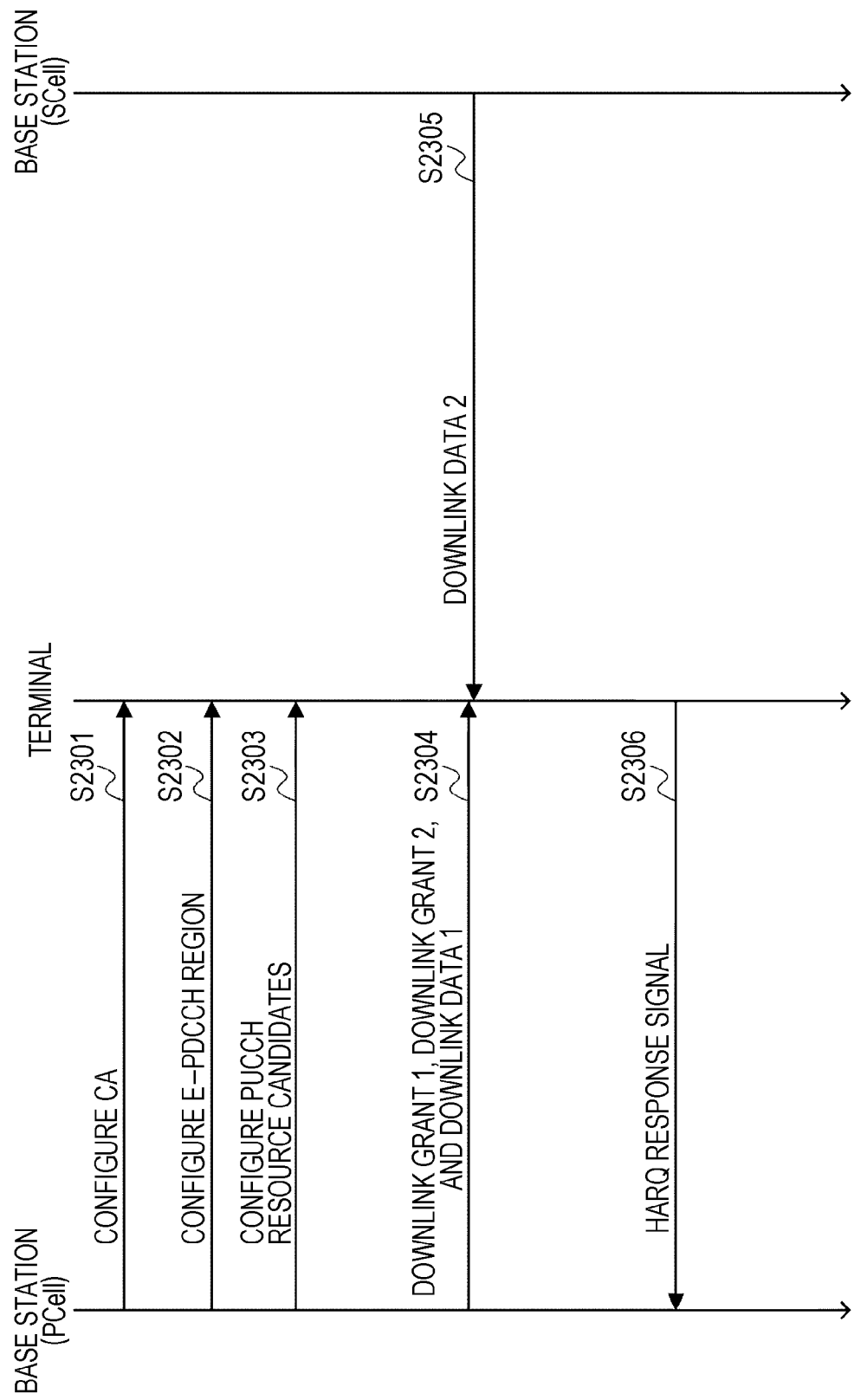
FIG. 23 is a sequence diagram illustrating an example of the procedure of reporting HARQ response information according to the second embodiment.

FIG. 23 is a sequence diagram illustrating an example of a procedure of reporting HARQ response information, At first, the base station 101 delivers control information that specifies (configures and reports) a CA to the terminal 102 by using RRC signaling, and the terminal 102 configures the CA on the basis of the control information (step S2301).

Next, the base station 101 delivers control information that specifies (configures and reports) an E-PDCCH to the terminal 102 by using RRC signaling, and the terminal 102 configures the E-PDCCH on the basis of the control information (step S2302).

In addition, the base station 101 delivers control information that indicates (configures and reports) a PUCCH resource corresponding to a PDSCH indicated by detection of a certain PDCCH or E-PDCCH to the terminal 102 by using RRC signaling, and the terminal 102 configures candidates for the PUCCH resource on the basis of the control information (step S2303). Note that a PUCCH resource may be configured for each of multiple PDCCHs or E-PDCCHs.

Note that, although an example in which the base station 101 configures an E-PDCCH region and a PUCCH resource after configuring a CA has been indicated here, the procedure is not limited to this example. For example, the base station 101 may configure a CA after configuring an E-PDCCH region and a PUCCH resource, or the base station 101 may configure a CA, an E-PDCCH region, and a PUCCH resource at the same time.

Next, the base station 101 transmits to the terminal 102 a downlink grant 1 and a downlink grant 2 using a PDCCH or an E-PDCCH in the PCell, and transmits downlink transmit data 1 corresponding to the downlink grant 1 using a PDSCH in the PCell, and the terminal 102 receives the downlink grant 1, the downlink grant 2, and the downlink transmit data 1 (step S2304). In addition, in the same subframe, the base station 101 transmits downlink transmit data 2 corresponding to the downlink grant 2 to the terminal 102 using a PDSCH in the SCell. In the same subframe, the terminal 102 receives the downlink transmit data 2 (step S2305). In addition, the terminal 102, which has received the downlink transmit data 1 and the downlink transmit data 2, generates HARQ response information in response to each of the downlink transmit data 1 and the downlink transmit data 2.

In this manner, one (one set of) PUCCH resource(s) corresponding to the downlink transmit data 1 indicated by detection of the downlink grant 1 and one (one set of) PUCCH resource(s) corresponding to the downlink transmit data 2 indicated by detection of the downlink grant 2 are configured. Finally, in accordance with the HARQ response information in response to the downlink transmit data 1 and the HARQ response information in response to the downlink transmit data 2, the terminal 102 selects one (one set of) PUCCH resource(s) from the configured two (two sets of) PUCCH resources, and reports control information indicating the HARQ response information in response to the downlink transmit data 1 and the HARQ response information in response to the downlink transmit data 2 by using the selected PUCCH resource(s) (step S2306).

Figure 24:
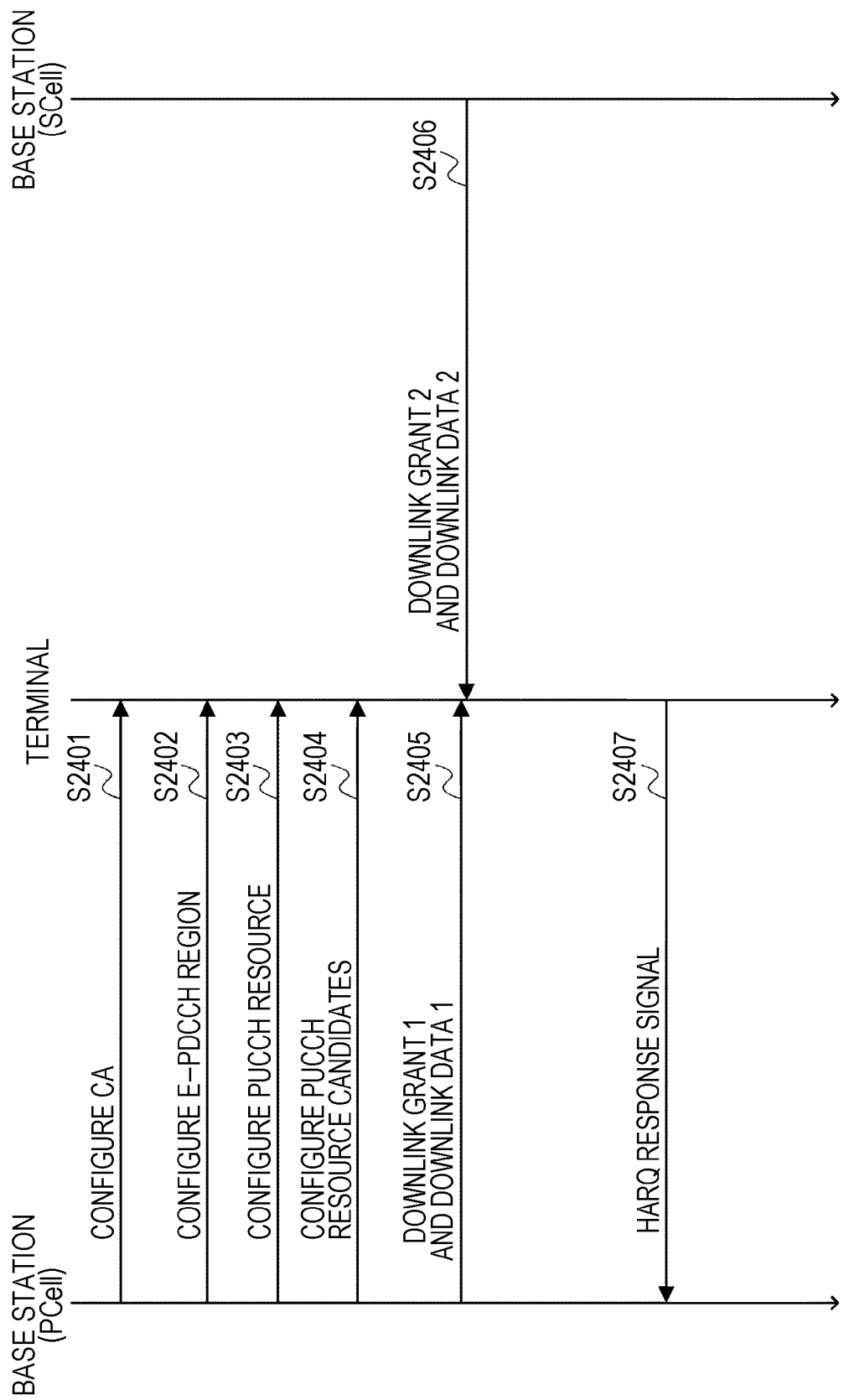
FIG. 24 is a sequence diagram illustrating an example of the procedure of reporting HARQ response information according to the second embodiment.

FIG. 24 is a sequence diagram illustrating another example of the procedure of reporting HARQ response information, At first, the base station 101 delivers control information that indicates (configures and reports) a CA to the terminal 102 by using RRC signaling, and the terminal 102 configures the CA on the basis of the control information (step S2401).

Next, the base station 101 delivers control information that indicates (configures and reports) an E-PDCCH to the terminal 102 by using RRC signaling, and the terminal 102 configures the E-PDCCH on the basis of the control information (step S2402).

In addition, the base station 101 delivers control information that indicates (configures and reports) a PUCCH resource corresponding to a PDSCH indicated by detection of a certain PDCCH or E-PDCCH to the terminal 102 by using RRC signaling, and the terminal 102 configures candidates for the PUCCH resource on the basis of the control information (step S2403). Note that a PUCCH resource may be configured for each of multiple PDCCHs or E-PDCCHs.

In addition, the base station 101 delivers control information that indicates (configures and reports) candidates for a PUCCH resource (PUCCH resource candidates) by using RRC signaling, and the terminal 102 configures the PUCCH resource candidates on the basis of the control information (step S2404). Here, the configured PUCCH resource candidates can use the configuration of the PUCCH resource candidates illustrated in FIG. 20.

Note that, although an example in which the base station 101 configures an E-PDCCH region, a PUCCH resource, and PUCCH resource candidates after configuring a CA has been indicated here, the procedure is not limited to this example. For example, the base station 101 may configure a CA after configuring an E-PDCCH region, a PUCCH resource, and PUCCH resource candidates, or the base station 101 may configure a CA, an E-PDCCH region, a PUCCH resource, and PUCCH resource candidates at the same time.

Next, the base station 101 transmits to the terminal 102 a downlink grant 1 using a PDCCH or an E-PDCCH in the PCell, and transmits downlink transmit data 1 corresponding to the downlink grant 1 using a PDSCH in the PCell. The terminal 102 receives the downlink grant 1 and the downlink transmit data 1 (step S2405). In addition, in the same subframe, the base station 101 transmits a downlink grant 2 using a PDCCH or an E-PDCCH in the SCell, and transmits downlink transmit data 2 corresponding to the downlink grant 2 using a PDSCH in the SCell to the terminal 102. In the same subframe, the terminal 102 receives the downlink grant 2 and the downlink transmit data 2 (step S2406). In addition, the terminal 102, which has received the downlink transmit data 1 and the downlink transmit data 2, generates HARQ response information in response to each of the downlink transmit data 1 and the downlink transmit data 2.

Here, in the case where the downlink grant 2 is transmitted in the PDCCH in the SCell, the base station 101 specifies one PUCCH resource among the PUCCH resource candidates by using a bit sequence indicated by a certain field (such as a TPC field) in the downlink grant 2. In the case where the downlink grant 2 has been received in the PDCCH in the SCell, the terminal 102 configures one PUCCH resource among the PUCCH resource candidates in accordance with a bit sequence indicated by a certain field (such as a TPC field) in the downlink grant 2.

In the case where the downlink grant 2 is transmitted/received in the E-PDCCH in the SCell, as with the above-described case, one PUCCH resource among the PUCCH resource candidates, which is specified using a bit sequence indicated by a certain field in the downlink grant 2, may be configured. At this time, the downlink grant 2 transmitted/received in the E-PDCCH may use another field different from the field used to indicate a PUCCH resource in the above-described PDCCH (such as a dedicated field), or may use the same field as the above-described PDCCH.

Alternatively, in the case where the downlink grant 2 is transmitted/received in the E-PDCCH in the SCell, a PUCCH resource determined on the basis of resource information of the downlink grant 2 may be configured.

In this manner, one (one set of) PUCCH resource(s) corresponding to the downlink transmit data 1 indicated by detection of the downlink grant 1 and one (one set of) PUCCH resource(s) corresponding to the downlink transmit data 2 indicated by detection of the downlink grant 2 are configured. Finally, in accordance with the HARQ response information in response to the downlink transmit data 1 and the HARQ response information in response to the downlink transmit data 2, the terminal 102 selects one (one set of) PUCCH resource(s) from the configured two (two sets of) PUCCH resources, and reports control information indicating the HARQ response information in response to the downlink transmit data 1 and the HARQ response information in response to the downlink transmit data 2 by using the selected PUCCH resource(s) (step S2407).

As has been described above, in relation to a downlink grant in a PDCCH region, when transmitting downlink transmit data in the first cell, the base station 101 allocates the downlink grant to a PDCCH resource corresponding to an uplink control channel resource used to report HARQ response information corresponding to this downlink transmit data. Preferably, a certain value is added to the index of an element with the smallest index, among elements constructing a PDCCH resource. A PUCCH resource with an index equivalent to a value after the addition is a PUCCH resource corresponding to this E-PDCCH resource. In addition, in relation to a downlink grant in an E-PDCCH region, when transmitting downlink transmit data in the first cell, the base station 101 semi-statically allocates a PUCCH resource. In addition, in the same subframe, in relation to a downlink grant in a PDCCH region or an E-PDCCH region, when transmitting downlink transmit data in the second cell, the base station 101 allocates the downlink grant to a PDCCH resource or an E-PDCCH resource corresponding to an uplink control channel resource used to report HARQ response information corresponding to this downlink transmit data. Alternatively, in relation to a downlink grant in a PDCCH region or an E-PDCCH region, when transmitting downlink transmit data in the second cell, the base station 101 specifies one (one set of) uplink control channel resource(s) among uplink control channel resource candidates used to report HARQ response information by using a certain field in this downlink grant. Further, the base station 101 monitors these uplink control channel resources and extracts HARQ response information.

In addition, in the case where the terminal 102 detects a downlink grant in a PDCCH region, the terminal 102 configures, as a PUCCH resource used to report HARQ response information in response to downlink transmit data in the first cell related to this downlink grant, a PUCCH resource corresponding to a PDCCH resource where the downlink grant has been detected. In the case where the terminal 102 detects a downlink grant in an E-PDCCH region, the terminal 102 configures, as a PUCCH resource used to report HARQ response information in response to downlink transmit data in the first cell related to this downlink grant, a PUCCH resource that has been semi-statically allocated in advance by the base station 101. In addition, in the same subframe, in the case where the terminal 102 detects a downlink grant in a PDCCH region or an E-PDCCH region, the terminal 102 configures, as a PUCCH resource used to report HARQ response information in response to downlink transmit data in the second cell related to this downlink grant, a PUCCH resource corresponding to a PDCCH resource or an E-PDCCH resource where the downlink grant has been detected. Alternatively, in the case where the terminal 102 detects a downlink grant in a PDCCH region or an E-PDCCH region, the terminal 102 configures, as a PUCCH resource used to report HARQ response information in response to downlink transmit data in the second cell related to this downlink grant, one (one set of) uplink control channel resource(s) specified using a certain field in this downlink grant.

Further, in accordance with HARQ response information in response to downlink transmit data in the first cell and HARQ response information in response to downlink transmit data in the second cell, the terminal 102 selects one (one set of) PUCCH resource(s) from the configured two (two sets of) PUCCH resources, and reports control information indicating the HARQ response information in response to the downlink transmit data in the first cell and the HARQ response information in response to the downlink transmit data in the second cell by using the selected PUCCH resource(s).

Accordingly, even in the case where a downlink grant is transmitted/received using an E-PDCCH at the time of configuring a CA, an uplink control channel can be efficiently allocated to the terminal. Therefore, it becomes possible to efficiently use an uplink control channel.

(Third Embodiment)

In the first embodiment described above, the case in which an uplink control channel is dynamically allocated to the terminal has been described. Hereinafter, in a third embodiment of the present invention, the case in which, among semi-statically configured uplink control channels, a dynamically-specified uplink control channel is allocated to the terminal will be described. A communication system in this embodiment can use a configuration that is the same as or similar to that of the communication system illustrated in FIG. 1. In addition, the block configurations of the base station 101 and the terminal 102 in this embodiment can use configurations that are the same as or similar to the block configurations illustrated in FIG. 4 and FIG. 5.

Figure 25:
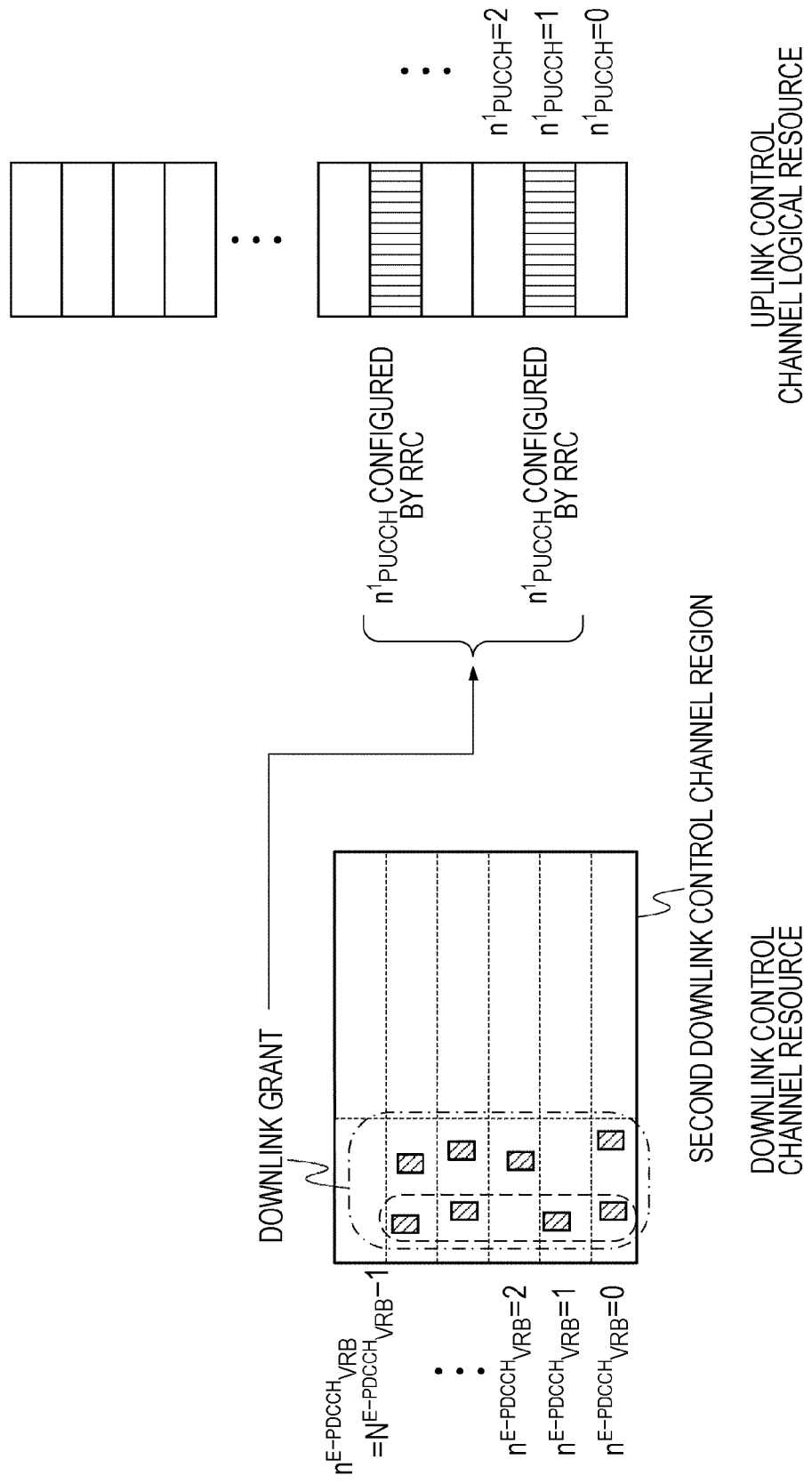
FIG. 25 is a diagram illustrating the configuration of the E-PDCCH and allocation of the PUCCH resources according to a third embodiment of the present invention.

FIG. 25 is a diagram illustrating the configuration of an E-PDCCH and allocation of PUCCH resources. Note that an E-PDCCH illustrated in FIG. 25 illustrates the configuration of an E-PDCCH and allocation of PUCCH resources in the case where cross interleaving is adopted. The configuration of the E-PDCCH is the same as that of FIG. 13. Meanwhile, an index $n^1_{PUCCH}$ indicating a PUCCH resource allocated to HARQ response information of downlink transmit data indicated by detection of this E-PDCCH is configured using a downlink grant. Note that, if multiple PUCCH resources are necessary, a set of indices $n^1_{PUCCH}$ each indicating a PUCCH resource is specified.

Figure 26:
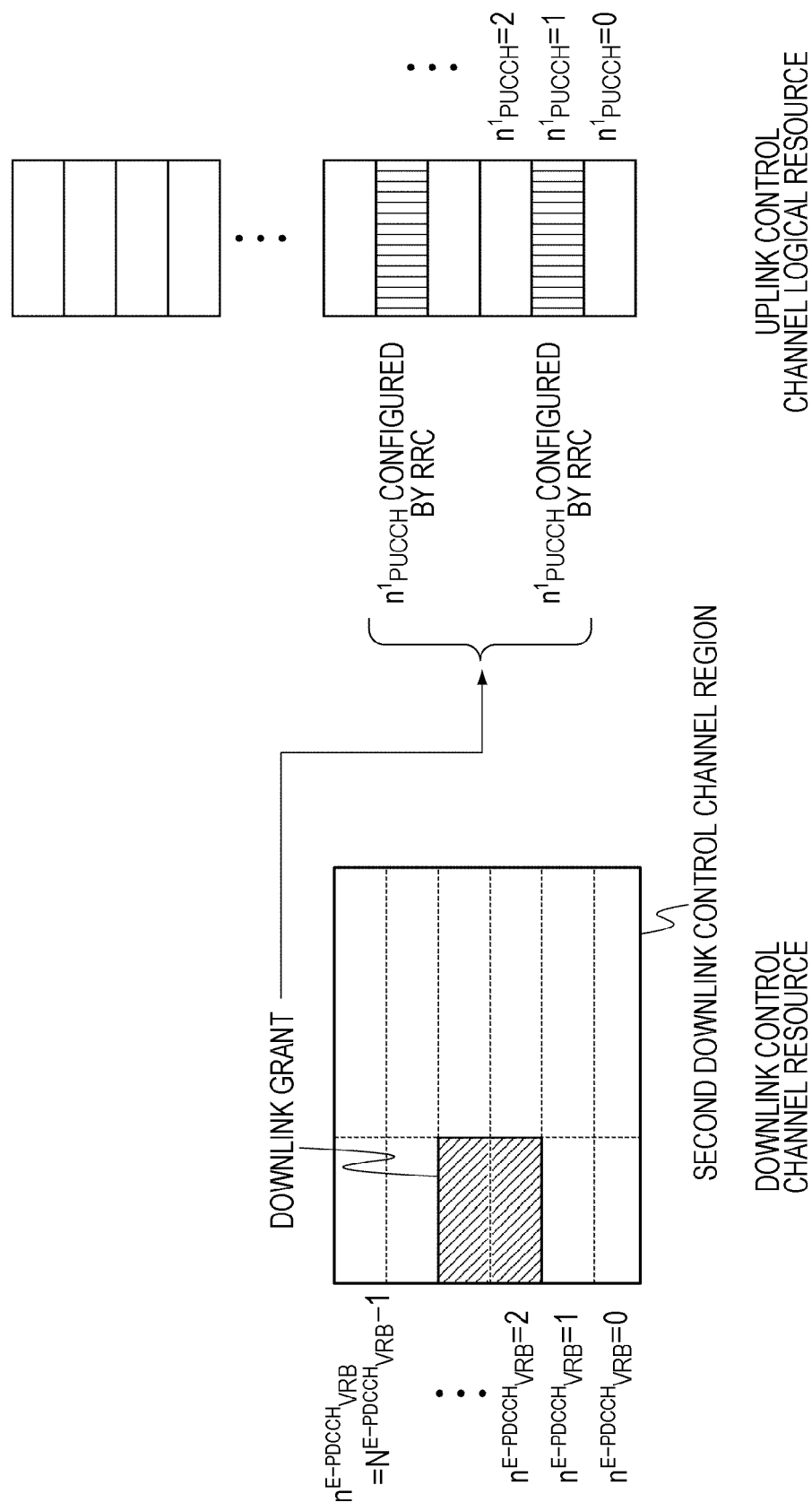
FIG. 26 is a diagram illustrating the configuration of the E-PDCCH and allocation of the PUCCH resources according to the third embodiment.

FIG. 26 is a diagram illustrating another example of the configuration of an E-PDCCH and allocation of PUCCH resources. Note that an E-PDCCH illustrated in FIG. 26 indicates the configuration of an E-PDCCH and allocation of PUCCH resources in the case where cross interleaving is not adopted. The configuration of the E-PDCCH is the same as that of FIG. 14. Meanwhile, an index $n^1_{PUCCH}$ indicating a PUCCH resource allocated to HARQ response information of downlink transmit data indicated by detection of this E-PDCCH is configured using a downlink grant. Note that, if multiple PUCCH resources are necessary, a set of indices $n^1_{PUCCH}$ each indicating a PUCCH resource is specified.

Figure 27:
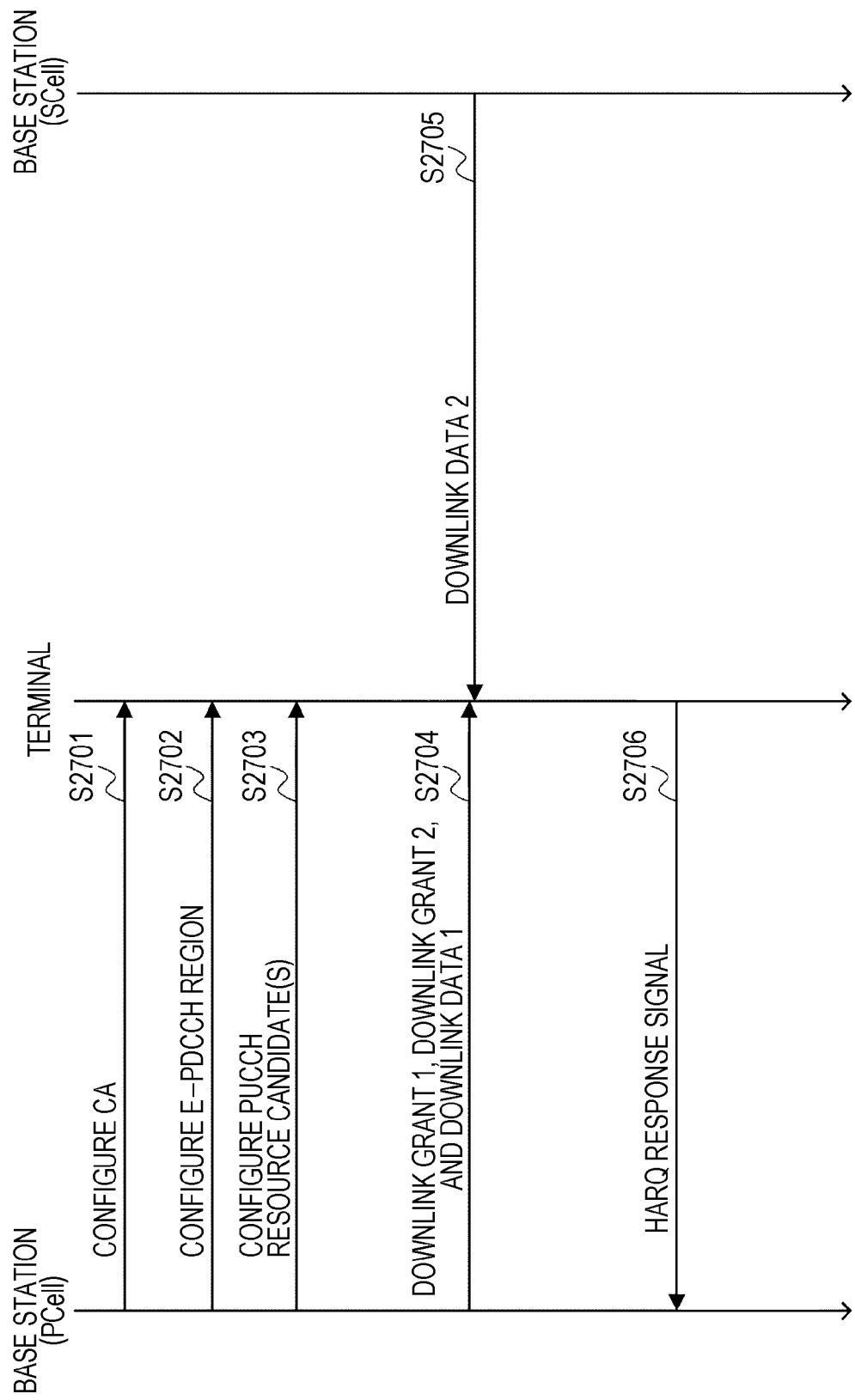
FIG. 27 is a sequence diagram illustrating an example of the procedure of reporting HARQ response information according to the third embodiment.

FIG. 27 is a sequence diagram illustrating an example of a procedure of reporting HARQ response information, At first, the base station 101 delivers control information that indicates (configures and reports) a CA to the terminal 102 by using RRC signaling, and the terminal 102 configures the CA on the basis of the control information (step S2701).

Next, the base station 101 delivers control information that indicates (configures and reports) an E-PDCCH to the terminal 102 by using RRC signaling, and the terminal 102 configures the E-PDCCH on the basis of the control information (step S2702).

In addition, the base station 101 delivers control information that indicates (configures and reports) a PUCCH resource corresponding to a PDSCH indicated by detection of a certain PDCCH or E-PDCCH to the terminal 102 by using RRC signaling, and the terminal 102 configures candidates for the PUCCH resource on the basis of the control information (step S2703). Note that a PUCCH resource may be configured for each of multiple PDCCHs or E-PDCCHs. Note that details regarding the PUCCH resource candidates are the same as or similar to the PUCCH resource candidates described in the first embodiment.

Note that, although an example in which the base station 101 configures an E-PDCCH region and PUCCH resource candidates after configuring a CA has been indicated here, the procedure is not limited to this example. For example, the base station 101 may configure a CA after configuring an E-PDCCH region and PUCCH resource candidates, or the base station 101 may configure a CA, an E-PDCCH region, and PUCCH resource candidates at the same time.

Next, the base station 101 transmits to the terminal 102 a downlink grant 1 and a downlink grant 2 using a PDCCH or an E-PDCCH in the PCell, and transmits downlink transmit data 1 corresponding to the downlink grant 1 using a PDSCH in the PCell. The terminal 102 receives the downlink grant 1, the downlink grant 2, and the downlink transmit data 1 (step S2704). In addition, in the same subframe, the base station 101 transmits downlink transmit data 2 corresponding to the downlink grant 2 to the terminal 102 using a PDSCH in the SCell. In the same subframe, the terminal 102 receives the downlink transmit data 2 (step S2705). In addition, the terminal 102, which has received the downlink transmit data 1 and the downlink transmit data 2, generates HARQ response information in response to each of the downlink transmit data 1 and the downlink transmit data 2.

Here, in the case where the downlink grant 1 relates to the PDSCH in the PCell, the base station 101 specifies one PUCCH resource among the PUCCH resource candidates by using a bit sequence indicated by a certain field in the downlink grant 1. Note that the certain field is preferably a field other than a TPC field.

In the case where the downlink grant 2 relates to the PDSCH in the SCell, the base station 101 specifies one PUCCH resource among the PUCCH resource candidates by using a bit sequence indicated by a certain field (such as a TPC field) in the downlink grant 2. In the case where the downlink grant 2 is received in the PDCCH in the SCell, the terminal 102 configures one PUCCH resource among the PUCCH resource candidates in accordance with a bit sequence indicated by a certain field (such as a TPC field) in the downlink grant 2. Alternatively, the terminal 102 may configure one PUCCH resource among the PUCCH resource candidates, which is specified using a bit sequence indicated by a certain field in the downlink grant 2. At this time, the downlink grant 2 transmitted/received in the E-PDCCH may use another field different from the field used to indicate a PUCCH resource in the above-described PDCCH (such as a dedicated field), or may use the same field as the above-described PDCCH.

Alternatively, in the case where the downlink grant 2 relates to the PDSCH in the SCell, a PUCCH resource determined on the basis of resource information of the downlink grant 2 may be configured.

Note that a PUCCH resource candidate used when the downlink grant is transmitted/received in the E-PDCCH related to the PDSCH in the PCell and a PUCCH resource candidate used when the downlink grant is transmitted/received in the E-PDCCH related to the PDSCH in the SCell may be the same PUCCH resource candidate. At this time, one PUCCH resource candidate is configured in step S2703.

Alternatively, a PUCCH resource candidate used when the downlink grant is transmitted/received in the E-PDCCH related to the PDSCH in the PCell and a PUCCH resource candidate used when the downlink grant is transmitted/received in the E-PDCCH related to the PDSCH in the SCell may be individual PUCCH resource candidates. At this time, multiple PUCCH resource candidates are configured (on a cell-by-cell basis) in step S2703.

In this manner, one (one set of) PUCCH resource(s) corresponding to the downlink transmit data 1 indicated by detection of the downlink grant 1 and one (one set of) PUCCH resource(s) corresponding to the downlink transmit data 2 indicated by detection of the downlink grant 2 are configured. Finally, in accordance with the HARQ response information in response to the downlink transmit data 1 and the HARQ response information in response to the downlink transmit data 2, the terminal 102 selects one (one set of) PUCCH resource(s) from the configured two (two sets of) PUCCH resources, and reports control information indicating the HARQ response information in response to the downlink transmit data 1 and the HARQ response information in response to the downlink transmit data 2 by using the selected PUCCH resource(s) (step S2706).

Figure 28:
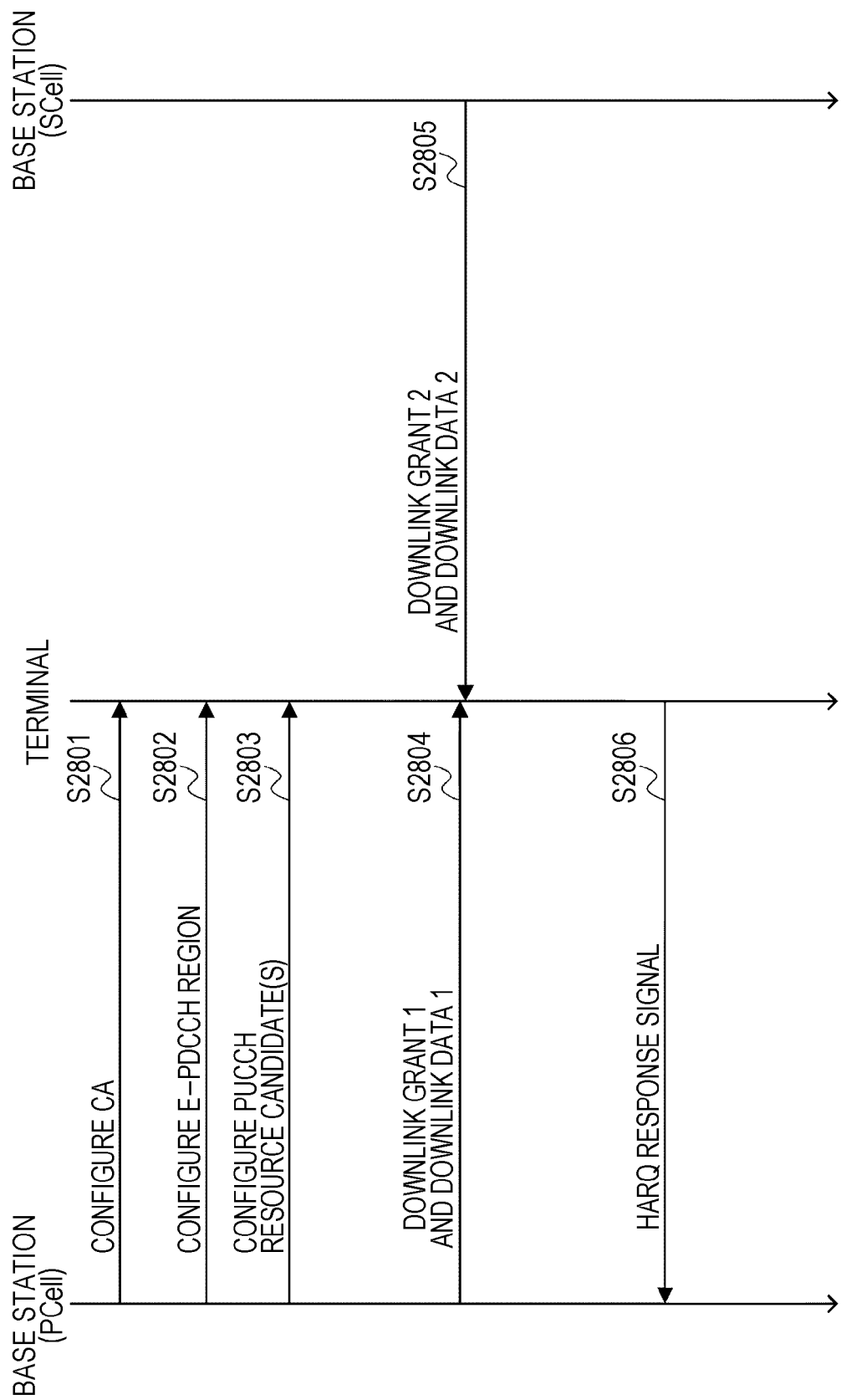
FIG. 28 is a sequence diagram illustrating an example of the procedure of reporting HARQ response information according to the third embodiment.
Figure 29:
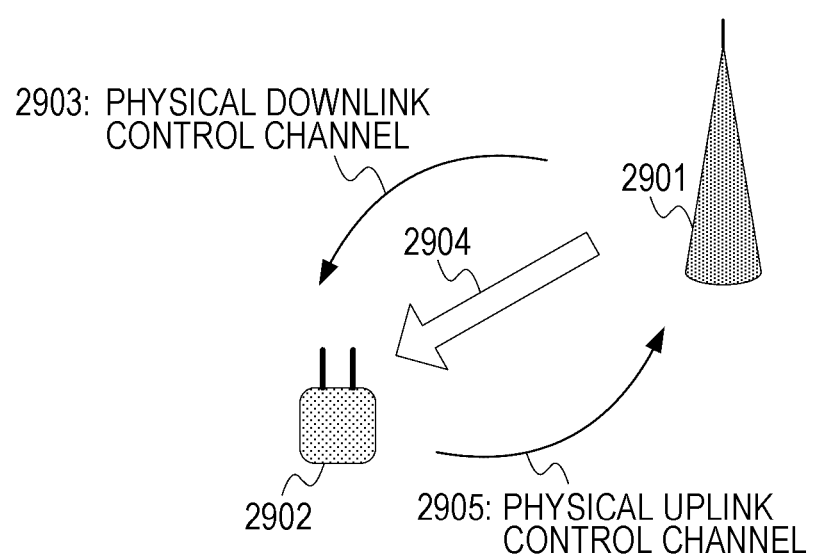
FIG. 29 is a diagram illustrating an example of the configuration of a communication system.

FIG. 28 is a sequence diagram illustrating another example of the procedure of reporting HARQ response information, At first, the base station 101 delivers control information that indicates (configures and reports) a CA to the terminal 102 by using RRC signaling, and the terminal 102 configures the CA on the basis of the control information (step S2801).

Next, the base station 101 delivers control information that indicates (configures and reports) an E-PDCCH to the terminal 102 by using RRC signaling, and the terminal 102 configures the E-PDCCH on the basis of the control information (step S2802).

In addition, the base station 101 delivers control information that indicates (configures and reports) a PUCCH resource corresponding to a PDSCH indicated by detection of a certain PDCCH or E-PDCCH to the terminal 102 by using RRC signaling, and the terminal 102 configures candidates for the PUCCH resource on the basis of the control information (step S2803). Note that a PUCCH resource may be configured for each of multiple PDCCHs or E-PDCCHs. Note that details regarding the PUCCH resource candidates are the same as or similar to the PUCCH resource candidates described in the first embodiment.

Note that, although an example in which the base station 101 configures an E-PDCCH region and PUCCH resource candidates after configuring a CA has been indicated here, the procedure is not limited to this example. For example, the base station 101 may configure a CA after configuring an E-PDCCH region and PUCCH resource candidates, or the base station 101 may configure a CA, an E-PDCCH region, and PUCCH resource candidates at the same time.

Next, the base station 101 transmits to the terminal 102 a downlink grant 1 using a PDCCH or an E-PDCCH in the PCell and transmits downlink transmit data 1 corresponding to the downlink grant 1 using a PDSCH in the PCell, and the terminal 102 receives the downlink grant 1 and the downlink transmit data 1 (step S2804). In addition, in the same subframe, the base station 101 transmits a downlink grant 2 using a PDCCH or an E-PDCCH in the SCell, and transmits downlink transmit data 2 corresponding to the downlink grant 2 to the terminal 102 using a PDSCH in the SCell. In the same subframe, the terminal 102 receives the downlink grant 2 and the downlink transmit data 2 (step S2805). In addition, the terminal 102, which has received the downlink transmit data 1 and the downlink transmit data 2, generates HARQ response information in response to each of the downlink transmit data 1 and the downlink transmit data 2.

Here, in the case where the downlink grant 1 is transmitted in the E-PDCCH in the PCell, the base station 101 specifies one PUCCH resource among the PUCCH resource candidates by using a bit sequence indicated by a certain field in the downlink grant 1. Note that the certain field is preferably a field other than a TPC field.

In the case where the downlink grant 2 is transmitted in the PDCCH in the SCell, the base station 101 specifies one PUCCH resource among the PUCCH resource candidates by using a bit sequence indicated by a certain field (such as a TPC field) in the downlink grant 2. In the case where the downlink grant 2 is received in the PDCCH in the SCell, the terminal 102 configures one PUCCH resource among the PUCCH resource candidates in accordance with a bit sequence indicated by a certain field (such as a TPC field) in the downlink grant 2.

In the case where the downlink grant 2 is transmitted/received in the E-PDCCH in the SCell, as with the above-described case, one PUCCH resource among the PUCCH resource candidates, which is specified using a bit sequence indicated by a certain field in the downlink grant 2, may be configured. At this time, the downlink grant 2 transmitted/received in the E-PDCCH may use another field different from the field used to indicate a PUCCH resource in the above-described PDCCH (such as a dedicated field), or may use the same field as the above-described PDCCH.

Alternatively, in the case where the downlink grant 2 is transmitted/received in the E-PDCCH in the SCell, a PUCCH resource determined on the basis of resource information of the downlink grant 2 may be configured.

Note that a PUCCH resource candidate used when the downlink grant is transmitted/received in the E-PDCCH in the PCell and a PUCCH resource candidate used when the downlink grant is transmitted/received in the E-PDCCH in the SCell may be the same PUCCH resource candidate. At this time, one PUCCH resource candidate is configured in step S2803.

Alternatively, a PUCCH resource candidate used when the downlink grant is transmitted/received in the E-PDCCH in the PCell and a PUCCH resource candidate used when the downlink grant is transmitted/received in the E-PDCCH in the SCell may be individual PUCCH resource candidates. At this time, multiple PUCCH resource candidates are configured (on a cell-by-cell basis) in step S2803.

In this manner, one (one set of) PUCCH resource(s) corresponding to the downlink transmit data 1 indicated by detection of the downlink grant 1 and one (one set of) PUCCH resource(s) corresponding to the downlink transmit data 2 indicated by detection of the downlink grant 2 are configured. Finally, in accordance with the HARQ response information in response to the downlink transmit data 1 and the HARQ response information in response to the downlink transmit data 2, the terminal 102 selects one (one set of) PUCCH resource(s) from the configured two (two sets of) PUCCH resources, and reports control information indicating the HARQ response information in response to the downlink transmit data 1 and the HARQ response information in response to the downlink transmit data 2 by using the selected PUCCH resource(s) (step S2806).

As has been described above, in relation to a downlink grant in a PDCCH region, when transmitting downlink transmit data in the first cell, the base station 101 allocates the downlink grant to a PDCCH resource corresponding to an uplink control channel resource used to report HARQ response information corresponding to this downlink transmit data. Preferably, a certain value is added to the index of an element with the smallest index, among elements constructing a PDCCH resource. A PUCCH resource with an index equivalent to a value after the addition is a PUCCH resource corresponding to this PDCCH resource. In addition, in relation to a downlink grant in an E-PDCCH region, when transmitting downlink transmit data in the first cell, the base station 101 specifies one (one set of) uplink control channel resource(s) among uplink control channel resource candidates used to report the HARQ response information by using a certain field in this downlink grant. In addition, in the same subframe, in relation to a downlink grant in a PDCCH region or an E-PDCCH region, the base station 101 allocates the downlink grant to a PDCCH resource or an E-PDCCH resource corresponding to an uplink control channel resource used to report HARQ response information corresponding to this downlink transmit data. Alternatively, in relation to a downlink grant in a PDCCH region or an E-PDCCH region, when transmitting downlink transmit data in the second cell, the base station 101 specifies one (one set of) uplink control channel resource(s) among uplink control channel resource candidates used to report HARQ response information by using a certain field in this downlink grant. Further, the base station 101 monitors these uplink control channel resources and extracts HARQ response information.

In addition, in the case where the terminal 102 detects a downlink grant in a PDCCH region, the terminal 102 configures, as a PUCCH resource used to report HARQ response information in response to downlink transmit data in the first cell related to this downlink grant, a PUCCH resource corresponding to a PDCCH resource where the downlink grant has been detected. In the case where the terminal 102 detects a downlink grant in an E-PDCCH region, the terminal 102 configures, as a PUCCH resource used to report HARQ response information in response to downlink transmit data in the first cell related to this downlink grant, one (one set of) uplink control channel resource(s) specified using a certain field in this downlink grant. In addition, in the same subframe, in the case where the terminal 102 detects a downlink grant in a PDCCH region or an E-PDCCH region, the terminal 102 configures, as a PUCCH resource used to report HARQ response information in response to downlink transmit data in the second cell related to this downlink grant, a PUCCH resource corresponding to a PDCCH resource or an E-PDCCH resource where the downlink grant has been detected. Alternatively, in the case where the terminal 102 detects a downlink grant in a PDCCH region or an E-PDCCH region, the terminal 102 configures, as a PUCCH resource used to report HARQ response information in response to downlink transmit data in the second cell related to this downlink grant, one (one set of) uplink control channel resource(s) specified using a certain field in this downlink grant.

Further, in accordance with HARQ response information in response to downlink transmit data in the first cell and HARQ response information in response to downlink transmit data in the second cell, the terminal 102 selects one (one set of) PUCCH resource(s) from the configured two (two sets of) PUCCH resources, and reports control information indicating the HARQ response information in response to the downlink transmit data in the first cell and the HARQ response information in response to the downlink transmit data in the second cell by using the selected PUCCH resource(s).

Accordingly, even in the case where a downlink grant is transmitted/received using an E-PDCCH at the time of configuring a CA, an uplink control channel can be dynamically allocated to the terminal. Therefore, it becomes possible to efficiently use an uplink control channel.

(Fourth Embodiment)

In the first to third embodiments described above, various methods of allocating an uplink control channel resource used for channel selection have been described. Hereinafter, in a fourth embodiment of the present invention, combinations of the various methods of allocating an uplink control channel resource, described in the above-mentioned first to third embodiments, will be described. Note that, although only some of these combinations will be described in this embodiment, it is needless to say that other combinations may be used as well.

<First Combination>

The terminal 102 performs channel selection using two (two sets of) PUCCH resources configured by methods indicated in (1-1) to (1-3) described below. The base station 101 monitors the two (two sets of) PUCCH resources configured by the methods described below and extracts HARQ response information in response to PDSCH transmission.

(1-1) A PUCCH resource configured for PDSCH transmission indicated by detection of an associated PDCCH or an associated E-PDCCH in a certain subframe (such as a subframe (subframe n-4) four before a subframe (subframe n) for reporting HARQ response information, or the like) on the PCell, or for a PDCCH or an E-PDCCH indicating an SPS (Semi Persistent Scheduling) release in a certain subframe (such as the subframe n-4) on the PCell, is $n^1_{PUCCH} = N_{1st} + N^1 (+N^D)$. Here, $n_{CCE,1st}$ is the number (index) of the first element (CCE or VRB) constructing the PDCCH or the E-PDCCH.

(1-2) A PUCCH resource configured for PDSCH transmission on the PCell in the case where there is no associated PDCCH or no associated E-PDCCH in a certain subframe (such as the subframe n-4) is $n^1_{PUCCH}$ configured by a higher layer.

(1-3) For PDSCH transmission indicated by an associated PDCCH or an associated E-PDCCH in a certain subframe (such as the subframe n-4) on the SCell, candidates $n^1_{PUCCH,RRC}$ for a PUCCH resource to be configured are configured by a higher layer. Further, a TPC field in the DCI format of an associated PDCCH or a certain field (such as a TPC field or a dedicated field) in the DCI format of an associated E-PDCCH is used to determine one PUCCH resource $n^1_{PUCCH}$ among the PUCCH resource candidates configured by the higher layer.

That is, a PUCCH resource is calculated from the first CCE (VRB) index for a PDCCH or an E-PDCCH in the PCell, and one PUCCH resource is dynamically specified among four PUCCH resources, which are semi-statically configured by RRC signaling, for a PDCCH or an E-PDCCH in the SCell.

Here, SPS is a scheduling method that periodically allocates a PDSCH. For PDSCH transmission for the first time, a PDCCH or an E-PDCCH indicating the start of SPS (SPS activate) is arranged in the same subframe, as with the case of normal scheduling. Meanwhile, for PDSCH transmission for the second time onward, a PDSCH can be allocated without an associated PDCCH or an associated E-PDCCH in the same subframe. In addition, after the last PDSCH transmission, a PDCCH or an E-PDCCH indicating the end of SPS (SPS release) is transmitted. The PDSCH described in (1-2) means PDSCH transmission for the second time onward by SPS.

<Second Combination>

The terminal 102 performs channel selection using two (two sets of) PUCCH resources configured by methods indicated in (2-1) to (2-3) described below. The base station 101 monitors the two (two sets of) PUCCH resources configured by the methods described below and extracts HARQ response information in response to PDSCH transmission.

(2-1) A PUCCH resource configured for PDSCH transmission indicated by detection of an associated PDCCH in a certain subframe (such as the subframe n-4) on the PCell or for a PDCCH or an E-PDCCH indicating an SPS release in a certain subframe (such as a subframe n-4) on the PCell is $n^1_{PUCCH}=N_{1st}+N^1 (+N^D)$.

(2-2) A PUCCH resource configured for PDSCH transmission on the PCell in the case where there is no associated PDCCH or no associated E-PDCCH in a certain subframe (such as the subframe n-4) or for PDSCH transmission on the PCell indicated by detection of an associated E-PDCCH in a certain subframe (such as the subframe n-4) is configured by a higher layer.

(2-3) For PDSCH transmission indicated by an associated PDCCH or an associated E-PDCCH in a certain subframe (such as the subframe n-4) on the SCell, candidates $n^1_{PUCCH,RRC}$ for a PUCCH resource to be configured are configured by a higher layer. Further, a TPC field in the DCI format of an associated PDCCH or a certain field (such as a TPC field or a dedicated field) in the DCI format of an associated E-PDCCH is used to determine one PUCCH resource $n^1_{PUCCH}$ among the PUCCH resource candidates configured by the higher layer.

That is, a PUCCH resource is calculated from the first CCE (VRB) index for a PDCCH in the PCell, a PUCCH resource is semi-statically configured by RRC signaling for an E-PDCCH in the PCell, and one PUCCH resource is dynamically specified among four PUCCH resources, which are semi-statically configured by RRC signaling, for a PDCCH or an E-PDCCH in the SCell.

Here, PDSCH transmission in the PCell in the case where there is no associated PDCCH or no associated E-PDCCH in a certain subframe, which is described in (2-2), means PDSCH transmission for the second time onward by SPS. A PUCCH resource configured by RRC signaling for PDSCH transmission for the second time onward and a PUCCH resource configured by RRC signaling for PDSCH transmission in the PCell, which is indicated by detection of an associated E-PDCCH in a certain subframe (such as the subframe n-4), can use the same resource. In other words, one PUCCH resource can be configured for both of these PDSCH transmissions.

Alternatively, a PUCCH resource configured by RRC signaling for PDSCH transmission for the second time onward by SPS and a PUCCH resource configured by RRC signaling for PDSCH transmission in the PCell, which is indicated by detection of an associated E-PDCCH in a certain subframe (such as the subframe n-4), may use individual resources. In other words, one PUCCH resource may be configured for each of these PDSCH transmissions.

<Third Combination>

The terminal 102 performs channel selection using two (two sets of) PUCCH resources configured by methods indicated in (3-1) to (3-3) described below. The base station 101 monitors the two (two sets of) PUCCH resources configured by the methods described below and extracts HARQ response information in response to PDSCH transmission.

(3-1) A PUCCH resource configured for PDSCH transmission indicated by detection of an associated PDCCH in a certain subframe (such as the subframe n-4) in the PCell or for a PDCCH or an E-PDCCH indicating an SPS release in a certain subframe (such as a subframe n-4) in the PCell is $n^1_{PUCCH}=N_{1st}+N^1 (+N^D)$.

(3-2) A PUCCH resource configured for PDSCH transmission in the PCell in the case where there is no associated PDCCH or no associated E-PDCCH in a certain subframe (such as the subframe n-4) is $n^1_{PUCCH}$ configured by a higher layer.

(3-3) For PDSCH transmission indicated by an associated PDCCH in a certain subframe (such as the subframe n-4) in the SCell or for PDSCH transmission indicated by an associated E-PDCCH in a certain subframe (such as the subframe n-4), candidates $n^1_{PUCCH,RRC}$ for a PUCCH resource to be configured are configured by a higher layer. Further, a TPC field in the DCI format of an associated PDCCH is used to determine one PUCCH resource $n^1_{PUCCH}$ among the PUCCH resource candidates configured by the higher layer. Alternatively, a certain field (such as a dedicated field) in the DCI format of an associated E-PDCCH is used to determine one PUCCH resource $n_{PUCCH}$ among the PUCCH resource candidates configured by the higher layer.

That is, a PUCCH resource is calculated from the first CCE (VRB) index for a PDCCH in the PCell, and one PUCCH resource is dynamically specified among four PUCCH resources, which are semi-statically configured by RRC signaling, for an E-PDCCH in the PCell or for a PDCCH or an E-PDCCH in the SCell.

Here, a PUCCH resource candidate configured by RRC signaling for PDSCH transmission indicated by an associated PDCCH in a certain subframe (such as the subframe n-4) in the SCell and a PUCCH resource candidate configured by RRC signaling for PDSCH transmission indicated by detection of an associated E-PDCCH in the PCell can use the same PUCCH resource candidate. In other words, one PUCCH resource candidate can be configured for both of these PDSCH transmissions.

<Fourth Combination>

The terminal 102 performs channel selection using two (two sets of) PUCCH resources configured by methods indicated in (4-1) to (4-4) described below. The base station 101 monitors the two (two sets of) PUCCH resources configured by the methods described below and extracts HARQ response information in response to PDSCH transmission.

(4-1) A PUCCH resource configured for PDSCH transmission indicated by detection of an associated PDCCH in a certain subframe (such as the subframe n-4) in the PCell or for a PDCCH or an E-PDCCH indicating an SPS release in a certain subframe (such as a subframe n-4) in the PCell is $n^1_{PUCCH}=N_{1st}+N_1 (+N^D)$.

(4-2) A PUCCH resource configured for PDSCH transmission in the PCell in the case where there is no associated PDCCH or no associated E-PDCCH in a certain subframe (such as the subframe n-4) is $n^1_{PUCCH}$ configured by a higher layer.

(4-3) For PDSCH transmission indicated by an associated E-PDCCH in a certain subframe (such as the subframe n-4) in the PCell, candidates $n^1_{PUCCH,RRC}$ for a PUCCH resource to be configured are configured by a higher layer. Further, a certain field (such as a TPC field or a dedicated field) in the DCI format of an associated PDCCH is used to determine one PUCCH resource $n^1_{PUCCH}$ among the PUCCH resource candidates configured by the higher layer.

(4-4) For PDSCH transmission indicated by an associated PDCCH in a certain subframe (such as the subframe n-4) in the SCell, candidates $n^1_{PUCCH,RRC}$ for a PUCCH resource to be configured are configured by a higher layer. Further, a TPC field in the DCI format of an associated E-PDCCH is used to determine one PUCCH resource $n\text{-}_{PUCCH}$ among the PUCCH resource candidates configured by the higher layer.

That is, a PUCCH resource is calculated from the first CCE (VRB) index for a PDCCH in the PCell, and one PUCCH resource is dynamically specified among four PUCCH resources, which are semi-statically configured by RRC signaling, for an E-PDCCH in the PCell or for a PDCCH or an E-PDCCH in the SCell.

Here, a PUCCH resource candidate configured by RRC signaling for PDSCH transmission indicated by a related PDCCH in a certain subframe (such as the subframe n-4) in the SCell and a PUCCH resource candidate configured by RRC signaling for PDSCH transmission indicated by detection of a related E-PDCCH in the PCell may use individual PUCCH resource candidates. In other words, one PUCCH resource candidate may be configured for each of these PDSCH transmissions.

As has been described above, by combining the various methods of allocating an uplink control channel resource, described in the above-mentioned first to third embodiments, even in the case where a downlink grant is transmitted/received using an E-PDCCH at the time of configuring a CA, an uplink control channel can be efficiently allocated to the terminal. Therefore, it becomes possible to efficiently use an uplink control channel.

Note that, although the case in which one PUCCH resource is configured for one PDCCH or E-PDCCH has been mainly described in the above-described embodiments, the above-described embodiments are not limited to this case. One set of PUCCH resources (a set of multiple PUCCH resources) may be configured for one PDCCH or E-PDCCH.

Note that, although the case in which a PDSCH is allocated to two cells at the time of a CA has been described in the above-described embodiments, the above-described embodiments are not limited to this case. For example, in the case where a PDSCH is allocated to one cell at the time of a CA, channel selection is performed using a PUCCH resource corresponding to that PDSCH and a PUCCH resource in the case where a PDSCH is virtually allocated to the other cell. In this case, it is only necessary to configure the relationship between HARQ response information and PUCCH resources so that a PUCCH resource corresponding to an actually transmitted PDSCH will be selected. Alternatively, in the case where the base station is configured not to perform channel selection for the terminal (transmit HARQ response information in response to a PDSCH in multiple cells using a certain PUCCH resource (a PUCCH resource different from a PUCCH resource used for channel selection)), HARQ response information can be reported using a PUCCH resource corresponding to an actually transmitted PDSCH. That is, in the case where the base station is configured to perform channel selection for the terminal, the terminal can transmit HARQ response information in response to a PDSCH in multiple cells by using a PUCCH resource configuring method, as has been described in the above-described embodiments; in the case where the base station is configured not to perform channel selection for the terminal, the terminal can transmit HARQ response information in response to a PDSCH in multiple cells by using a certain PUCCH resource (a PUCCH resource different from a PUCCH resource used for channel selection).

Note that, although resource elements and resource blocks are used as mapping units for data channels, control channels, PDSCHs, PDCCHs, and reference signals, and subframes and wireless frames are used as transmission units in the time direction in the above-described embodiments, the above-described embodiments are not limited thereto. Similar advantages can be achieved by using, in place of these, regions and time units constituted of arbitrary frequencies and times. In addition, a PDCCH related to a PDSCH (related PDCCH) or an E-PDCCH related to a PDSCH (related E-PDCCH) may be a PDCCH or an E-PDCCH indicating allocation of the PDSCH in the same subframe. In contrast, a PDSCH related to a PDCCH or an E-PDCCH may be a PDSCH for which allocation is indicated by a PDCCH or an E-PDCCH in the same subframe.

In addition, although the enhanced physical downlink control channel 103 arranged in a PDSCH region has been referred to as an E-PDCCH, which has been distinctively described from a conventional physical downlink control channel (PDCCH) in the above-described embodiments, an E-PDCCH and a PDCCH are not limited thereto. Even in the case where both are referred to as PDCCHs, if an enhanced physical downlink control channel arranged in a PDSCH region and a conventional physical downlink control channel arranged in a PDCCH region operate differently, this is substantially the same as the above-described embodiments in which an E-PDCCH and a PDCCH are distinguished.

A program operating in the base station and the terminal according to the present invention is a program that controls a CPU or the like (a program that causes a computer to function) in order to realize the functions of the above-described embodiments according to the present invention. Information handled by these apparatuses is temporarily accumulated in a RAM (Random Access Memory) at the time of processing, thereafter stored in various types of ROMs (Read Only Memory) or an HDD (Hard Disk Drive), and read and modified/written by the CPU as needed. A recording medium that stores the program may be any of a semiconductor medium (such as a ROM, a non-volatile memory card, or the like), a magneto-optical medium (such as a DVD (Digital Versatile Disc), MO (Magneto-Optical disc), MD (Mini-Disc), CD (Compact Disc), BD (Blue-ray Disc), or the like), a magnetic recording medium (such as a magnetic tape, a flexible disk, or the like), and the like. In addition, besides the case in which the functions of the above-described embodiments are realized by executing the loaded program, the functions of the present invention may be realized by performing processing together with an operating system, another application program, or the like on the basis of instructions of the program.

In addition, in order to circulate the program in the market, the program may be stored on a portable recording medium and circulated, or the program may be transferred to a server computer connected via a network such as the Internet. In this case, a storage device of the server computer is also included in the present invention. In addition, part or all of the base station and the terminal in the above-described embodiments may also be typically realized as an LSI (Large Scale Integration) that is an integrated circuit. The respective function blocks of the base station and the terminal may be realized as individual chips, or part or all thereof may be integrated into a single chip. In addition, the circuit integration methodology is not limited to LSI and may also be realized with dedicated circuits or general processors. In addition, if progress in semiconductor technology yields integrated circuit technology that may substitute for LSI, an integrated circuit according to that technology may also be used.

Although the embodiments of the present invention have been described in detail with reference to the drawings, specific configurations are not limited to these embodiments, and various design changes and the like can be made within a scope that does not depart from the gist of the present invention. In addition, various changes can be made to the present invention within a scope indicated in the claims, and the technical scope of the present invention also encompasses embodiments obtained by appropriately combining technical means disclosed in the different embodiments. In addition, the technical scope of the present invention also encompasses a configuration obtained by exchanging elements described in the above-described embodiments with elements that have the same or similar advantages.

INDUSTRIAL APPLICABILITY

The present invention is suitable to be used in, for example, a wireless base station device, a wireless terminal device, a wireless communication system, and a wireless communication method.

REFERENCE SIGNS LIST 101, 2901 base stations, 102, 2902 terminals, 103-1 physical downlink control channel and/or enhanced physical downlink control channel, 103-1 enhanced physical downlink control channel, 104-1, 104-2 downlink transmit data, 105 physical uplink control channel, 401 codeword generation unit, 402 downlink subframe generation unit, 403 physical downlink control channel generation unit, 404 OFDM signal transmission unit, 405, 511 transmit antennas, 406, 501 receive antennas, 407 SC-FDMA signal reception unit, 408 uplink subframe processing unit, 409 physical uplink control channel extracting unit, 410, 506 higher layers, 502 OFDM signal reception unit, 503 downlink subframe processing unit, 504 physical downlink control channel extracting unit, 505 codeword extracting unit, 507 response information generation unit, 508 uplink subframe generation unit, 509 physical uplink control channel generation unit, 510 SC-FDMA signal transmission unit, 2903 physical downlink control channel, 2904 downlink transmit data, 2905 physical uplink control channel

The invention claimed is:
1. A terminal apparatus that is configured to and/or programmed to communicate with a base station apparatus by using a primary cell and a secondary cell, the terminal apparatus comprising:
a downlink control channel detection unit configured to and/or programmed to monitor a Physical Downlink Control CHannel (PDCCH) and an Enhanced Physical Downlink Control CHannel (EPDCCH), and
a response transmission unit configured to and/or programmed to transmit information indicating Hybrid Automatic Repeat reQuest (HARQ) response information, using a Physical Uplink Control CHannel (PUCCH) resource which is selected from a plurality of PUCCH resource candidates,
downlink control information transmitted in the PDCCH comprising at least a field for downlink resource block assignment and a field for Transmission Power Control (TPC) command,
downlink control information transmitted in the EPDCCH comprising, in addition to a field for downlink resource block assignment and a field for TPC command, at least a field for determining one of the plurality of PUCCH resource candidates,
wherein the plurality of PUCCH resource candidates comprise a second PUCCH resource related to the EPDCCH on the primary cell and a third PUCCH resource related to the PDCCH or the EPDCCH on the secondary cell.

2. The terminal apparatus according to claim 1, wherein, the plurality of PUCCH resource candidates comprise a first PUCCH resource which is determined, for a Physical Downlink Shared CHannel (PDSCH) related to the PDCCH on the primary cell, on the basis of at least (i) an index of the first element of one or a plurality of elements that construct the PDCCH and (ii) a value which is common in a cell.

3. The terminal apparatus according to claim 1, wherein, the plurality of PUCCH resource candidates comprise a second PUCCH resource which is determined, for a Physical Downlink Shared CHannel (PDSCH) related to the EPDCCH on the primary cell, on the basis of at least the field for determining one of the plurality of PUCCH resource candidates.

4. The terminal apparatus according to claim 1, wherein, the plurality of PUCCH resource candidates comprise a third PUCCH resource which is determined, for a Physical Downlink Shared CHannel (PDSCH) related to the PDCCH or the EPDCCH on the secondary cell, on the basis of at least the field for TPC command.

5. A base station apparatus that is configured to and/or programmed to communicate with a terminal apparatus by using a primary cell and a secondary cell, the terminal apparatus comprising:
a physical control information delivering unit configured to and/or programmed to transmit a Physical Downlink Control CHannel (PDCCH) and an Enhanced Physical Downlink Control CHannel (EPDCCH), and
a response information reception unit configured to and/or programmed to receive information indicating Hybrid Automatic Repeat reQuest (HARQ) response information, which is transmitted using a Physical Uplink Control CHannel (PUCCH) resource which is selected from a plurality of PUCCH resource candidates,
downlink control information transmitted in the PDCCH comprising at least a field for downlink resource block assignment and a field for Transmission Power Control (TPC) command,
downlink control information transmitted in the EPDCCH comprising, in addition to a field for downlink resource block assignment and a field for TPC command, at least a field for determining one of the plurality of PUCCH resource candidates,
wherein the plurality of PUCCH resource candidates comprise a second PUCCH resource related to the EPDCCH on the primary cell and a third PUCCH resource related to the PDCCH or the EPDCCH on the secondary cell.

6. The base station apparatus according to claim 5, wherein,
the plurality of PUCCH resource candidates comprise a first PUCCH resource which is determined, for a Physical Downlink Shared CHannel (PDSCH) related to the PDCCH on the primary cell, on the basis of at least (i) an index of the first element of one or a plurality of elements that construct the PDCCH and (ii) a value which is common in a cell.

7. The base station apparatus according to claim 5, wherein,
the plurality of PUCCH resource candidates comprise a second PUCCH resource which is determined, for a Physical Downlink Shared CHannel (PDSCH) related to the EPDCCH on the primary cell, on the basis of at least the field for determining one of the plurality of PUCCH resource candidates.

8. The base station apparatus according to claim 5, wherein,
the plurality of PUCCH resource candidates comprise a third PUCCH resource which is determined, for a Physical Downlink Shared CHannel (PDSCH) related to the PDCCH or the EPDCCH on the secondary cell, on the basis of at least the field for TPC command.

9. A communication method used by a terminal apparatus that is configured to and/or programmed to communicate with a base station apparatus by using a primary cell and a secondary cell, the communication method comprising:
monitoring a Physical Downlink Control CHannel (PDCCH) and an Enhanced Physical Downlink Control CHannel (EPDCCH), and
transmitting information indicating Hybrid Automatic Repeat reQuest (HARQ) response information, using a Physical Uplink Control CHannel (PUCCH) resource which is selected from a plurality of PUCCH resource candidates,
downlink control information transmitted in the PDCCH comprising at least a field for downlink resource block assignment and a field for Transmission Power Control (TPC) command,
downlink control information transmitted in the EPDCCH comprising, in addition to a field for downlink resource block assignment and a field for TPC command, at least a field for determining one of the plurality of PUCCH resource candidates,
wherein the plurality of PUCCH resource candidates comprise a second PUCCH resource related to the EPDCCH on the primary cell and a third PUCCH resource related to the PDCCH or the EPDCCH on the secondary cell.

10. The communication method according to claim 9, wherein
the plurality of PUCCH resource candidates comprise a first PUCCH resource which is determined, for a Physical Downlink Shared CHannel (PDSCH) related to the EPDCCH on the primary cell, on the basis of at least the field for determining one of the plurality of PUCCH resource candidates.

11. A communication method used by a base station apparatus that is configured to and/or programmed to communicate with a terminal apparatus by using a primary cell and a secondary cell, the communication method comprising:
transmitting either one of a Physical Downlink Control CHannel (PDCCH) and an Enhanced Physical Downlink Control CHannel (EPDCCH), and
receiving information indicating Hybrid Automatic Repeat reQuest (HARQ) response information, which is transmitted using a Physical Uplink Control CHannel (PUCCH) resource which is selected from a plurality of PUCCH resource candidates,
downlink control information transmitted in the PDCCH comprising at least a field for downlink resource block assignment and a field for Transmission Power Control (TPC) command,
downlink control information transmitted in the EPDCCH comprising, in addition to a field for downlink resource block assignment and a field for TPC command, at least a field for determining one of the plurality of PUCCH resource candidates,
wherein the plurality of PUCCH resource candidates comprise a second PUCCH resource related to the EPDCCH on the primary cell and a third PUCCH resource related to the PDCCH or the EPDCCH on the secondary cell.

12. The communication method according to claim 11, wherein
the plurality of PUCCH resource candidates comprise a first PUCCH resource which is determined, for a Physical Downlink Shared CHannel (PDSCH) related to the EPDCCH on the primary cell, on the basis of at least the field for determining one of the plurality of PUCCH resource candidates.

* * * * *